United States Patent
Jang et al.

(10) Patent No.: US 12,516,290 B2
(45) Date of Patent: *Jan. 6, 2026

(54) MEDIUM COMPOSITION FOR CULTURING T CELLS AND METHOD FOR CULTURING T CELLS USING SAME

(71) Applicant: GI CELL, INC., Gyeonggi-do (KR)

(72) Inventors: Myoung Ho Jang, Seoul (KR); Chun-Pyo Hong, Gyeonggi-do (KR); Young Joo Choi, Gyeonggi-do (KR); June Sub Lee, Gyeonggi-do (KR)

(73) Assignee: GI CELL, INC., Gyeonggi-Do (KR)

( * ) Notice: Subject to any disclaimer, the term of this patent is extended or adjusted under 35 U.S.C. 154(b) by 724 days.

This patent is subject to a terminal disclaimer.

(21) Appl. No.: 17/777,746

(22) PCT Filed: Nov. 19, 2020

(86) PCT No.: PCT/KR2020/016379
§ 371 (c)(1),
(2) Date: May 18, 2022

(87) PCT Pub. No.: WO2021/101271
PCT Pub. Date: May 27, 2021

(65) Prior Publication Data
US 2023/0015408 A1    Jan. 19, 2023

(30) Foreign Application Priority Data

Nov. 20, 2019 (KR) .......................... 10-2019-0149779

(51) Int. Cl.
*C12N 5/0783* (2010.01)

(52) U.S. Cl.
CPC .... *C12N 5/0636* (2013.01); *C12N 2501/2302* (2013.01); *C12N 2501/51* (2013.01); *C12N 2506/115* (2013.01)

(58) Field of Classification Search
None
See application file for complete search history.

(56) References Cited

U.S. PATENT DOCUMENTS

| | | | |
|---|---|---|---|
| 5,229,109 A | 7/1993 | Grimm et al. | |
| 6,955,807 B1 | 10/2005 | Shanafelt et al. | |
| 9,499,629 B2 | 11/2016 | June et al. | |
| 11,492,384 B2 * | 11/2022 | Jang | C07K 14/705 |
| 11,702,633 B2 * | 7/2023 | Jang | C12N 5/0637 |
| | | | 424/85.2 |

FOREIGN PATENT DOCUMENTS

| | | | | |
|---|---|---|---|---|
| CN | 103667189 A | 3/2014 | | |
| CN | 107857819 A | 3/2018 | | |
| CN | 108883124 A | 11/2018 | | |
| CN | 109328074 A | 2/2019 | | |
| CN | 110114369 A | 8/2019 | | |
| CN | 110204619 A | 9/2019 | | |
| JP | 2014522846 A | 9/2014 | | |
| KR | 101667096 B1 | 10/2016 | | |
| KR | 1020180069903 A | 6/2018 | | |
| KR | 1020180100110 A | 9/2018 | | |
| KR | 1020189100110 A | 9/2018 | | |
| KR | 102201086 B1 | 1/2021 | | |
| RU | 2312677 C2 | 12/2007 | | |
| WO | 1986000334 A1 | 1/1986 | | |
| WO | 2008023874 A1 | 2/2008 | | |
| WO | WO-2015137724 A1 * | 9/2015 | .......... | C12N 5/0636 |
| WO | 2016025642 A1 | 2/2016 | | |
| WO | 2017220989 A1 | 12/2017 | | |
| WO | 2018170026 A2 | 9/2018 | | |
| WO | 2018184964 A1 | 10/2018 | | |
| WO | WO-2019079520 A2 * | 4/2019 | ............. | A61K 35/54 |

OTHER PUBLICATIONS

Marianayagam, et al. "The power of two: protein dimerization in biology." Trends in Biochemical Sciences. vol. 29 No. 11 Nov. 2004 (Year: 2004).*
Park, et al. "GI101, a novel triple-targeting bispecific CD80-IgG4-IL2 variant fusion protein, elicits synergistic anti-tumour effects in preclinical models." Immunotherapy of Cancer. vol. 30 No. 5 Oct. 2019 (Year: 2019).*
Pant, et al. CD4+ and CD8+ regulatory T cells in chronic rhinosinusitis mucosa. American Journal of Rhinology & Allergy. (28)83-89; 2014. (Year: 2014).*
Chen, et al. Fusion protein linkers: Property, design, and functionality. Advanced Drug Delivery Reviews. 65(10):1357-69. Oct. 15, 2013.*
Interleukin-2, *Homo sapiens*. GenBank Accession No. AAH66254.1 (2002).*
CD80, *Homo sapiens*. NCBI Reference Sequence: NP_005182.1 (1995).*
Martin and Badovinac. Defining memory CD8 T cell. Frontiers In Immunlogy. 2018; 9:1-10. (Year: 2018).*

(Continued)

*Primary Examiner* — Allison M Fox
*Assistant Examiner* — Gina Pronzati
(74) *Attorney, Agent, or Firm* — HULTQUIST, PLLC; Steven J. Hultquist

(57) ABSTRACT

The present invention relates to a composition for proliferating a T cells, containing a fusion protein dimer comprising IL-2 protein or a variant thereof and CD80 protein or a fragment thereof, and to a method for culturing T cells using same. The T cells cultured according to the present invention increase the proliferation and activity of T cells even without using CD3/CD28 antibody-bound magnetic beads and proliferate T cells by culturing a patient's own peripheral blood mononuclear cells and are not likely to cause side effects in the human body, and thus will be widely used as a novel T cell therapeutic agent. Furthermore, in the case of CD8+ T cells cultured as described above, the activity thereof increases, and thus, the CD8+ T cells can be used as a more effective therapeutic agent.

9 Claims, 44 Drawing Sheets
Specification includes a Sequence Listing.

(56) References Cited

OTHER PUBLICATIONS

Master, A., et al., "T Cell Media: A Comprehensive Guide to Key Components", Biologics, 2018, https://www.med.upenn.edu/cci/, Publisher: Center for Cellular Immunotherapies.

Office Action Cited in counterpart Russian Patent Application No. 2022113338 on Mar. 6, 2023.

English translation of Office Action cited in counterpart Russian Patent Application No. 2022113338 on Mar. 6, 2023.

Search Report Issued in counterpart Russian Patent Application No. 2022113338 on Mar. 6, 2023.

Chan, L., et al., "IL2/B7.1 (CD80) Fusagene Transduction of AML Blasts by a Self-Inactivating Lentiviral Vector Stimulates T Cell Responses a Strategy to Generate Whole Cell Vaccines for AML", Molecular Therapy, 2005, Page(s) DOI: 10.1016/j.ymthe.2004.09.006, vol. 11, No. 1, Publisher: The American Society of Gene Therapy.

Davis, Z.B., et al., "Natural Killer Cell AdoptiveTransfer Therapy—Exploiting the First Line of Defense Against Cancer", Cancer J., 2015, pp. 486-491, vol. 21, No. 6, Publisher: HHS Public Access.

Ingram, W., et al., "Human CD80/IL2 lentivirus transduced acute myeloid leukaemia cells enhance cytolytic activity in vitro in spite of an increase in regulatory CD4 T cells in a subset of cultures", Cancer Immunol Immunother, 2009, pp. 1679-1690; DOI 10.1007/s00262-009-0679-6, vol. 58, Publisher: Springer.

Ingram, W., et al., "Human CD80/IL2 lentivirus-transduced acute myeloid leukaemia (AML) cells promote natural killer (NK) cell activation and cytolytic activity: implications for a phase I clinical study", British Journal of Haematology, 2009, pp. 749-760, vol. 145, Publisher: Blackwell Publishing Ltd.

Lifshitz, G.V., et al., "Ex vivo expanded regulatory T cells CD4+CD25+FoxP3+CD127LOW develope strong immunosuppressive activity in patients with remitting-relapsing multiple sclerosis", Autoimmunity, 2016, pp. 388-396, vol. 49, No. 6, Publisher: Taylor & Francis.

Nam, S., "GI-101, which showed potential for new immunotherapy, will be confirmed in clinical trials next year", Youth Doctor Newsletter, 2019, Page(s) Eng Trans.

Nam, S., "GI-101, which showed potential for new immunotherapy, will be confirmed in clinical trials next year", Youth Doctor Newsletter, 2019.

Park, J.C., et al., "GI-101, a novel bispecific CD80-LGg4-IL2 variant fusion protein, elicits robust anti-tumor effects in preclinical models", ESMO Contress 2019, Barcelona, Spain, Sep. 27, 2019.

Park, C.P., "3190-GI101, a novel triple-targeting bispecific CD80-IgG4-IL2variant fusion protein, elicits synergistic anti-tumor effects in preclinical models", ESMO 2019 Congress, Sep. 30, 2019, vol. Abst 3190.

Tang, A., et al., "The challenges and molecular approaches surrounding interleukin-2-based therapeuutics in cancer", Cytokine X, 2019, pp. 100001; http://doi.org.10.1016/j.cytox.2018.100001, vol. 1, No. 1, Publisher: Elsevier.

Office Action Issued in Japanese Patent Application No. 2022-529599 on Jun. 23, 2023.

English Translation of Office Action Issued in Japanese Patent Application No. 2022-529599 on Jun. 23, 2023.

Park, J.C., et al., "GI101, a novel triple-targeting bispecific CD80-IgG4-IL2variant fusion protein, elicits synergistic anti-tumour effects in preclinical models", Annals of Oncology, 2019, pp. v475-v532; 10.1093/annonc/mdz253, vol. 30, No. 5.

Examination Report issued on Feb. 23, 2024 for Australian Patent Application 2020389422.

English translation of Search Report issued on Jan. 11, 2024 for the Chinese Patent Application 202080087825.5.

Office Action issued on Jan. 22, 2024 for Chinese Patent Application 2020800878255.

Search Report issued on Jan. 11, 2024 for Chinese Patent Application 202080087825.5.

Dong J., et al., "Research progress of cytotoxic T cells in leukemia", Immunology, 2004, pp. 339-342, vol. 27, No. 6, Publisher: China Academic Journal Electronic Publishing House.

Dong, J., et al., English translation of "Research progress of cytotoxic T cells in leukemia", Immunology, 2004, pp. 339-342, vol. 27, No. 6, Publisher: China Academic Journal Electronic Publishing House.

Search Report issued on Dec. 14, 2023 for European Patent Application 20890984.6.

Kanegane, H., et al., "Activation of Naive and Memory T Cells by Interleukin-15", Blood, 1996, pp. 230-235, vol. 88, No. 1, Publisher: American Society of Hematology.

Kong, L., et al., "Expression of fusiion IL2-B7.1 (IgV+C) and effects on T lymphocytes", Biochem Cell Biol, 2007, pp. 685-695, vol. 85, Publisher: NRC Canada.

Roth, M. D., "Interleukin 2 Induces the Expression of CD45RO and the Memory Phenotype by CD45RA+ Peripheral Blood Lymphocytes", J. Exp. Med., 1994, pp. 857-864, vol. 179, Publisher: The Rockefeller University Press.

Office Action issued on Jan. 26, 2024 for the Russian patent application No. 2022113338.

English translation of Office Action issued on Jan. 26, 2024 for the Russian patent application No. 2022113338.

Sauve, K., et al., "Localization in human interleukin 2 of the binding site to the chain (p55) of the interleukin 2 receptor", Immunology, 1991, pp. 4636-4640, vol. 88, Publisher: Proc. Natl. Acad. Sci USA.

Turner, J., et al., "Stimulation of human peripheral blood mononuclear cells with live Mycobacterium bovis BCG activates cytolytic CD8+ T cells in vitro", Immunology, 1996, pp. 339-342, vol. 87, Publisher: Blackwell Science Ltd.

Haile, S.T., et al., "Soluble CD80 Restores T Cell Activation and Overcomes Tumor Cell Programmed Death Ligand 1-Mediated Immune Suppression", J Immunol, 2013, pp. 2829-2836, vol. 191, No. 5, Publisher: American Association of Immunologists, Inc.

English Translation of Office Action issued on Mar. 6, 2025 for Korean Patent Application 10-2020-0155823.

Office Action issued on Mar. 6, 2025 for Korean Patent Application 10-2020-0155823.

Notice Of Allowance issued on Aug. 1, 2025 for Korean Patent Application 10-2020-0155823.

English Translation of Notice Of Allowance issued on Aug. 1, 2025 for the Korean Patent Application 10-2020-0155823.

* cited by examiner

Expected size (kDa)
monomer: 41.3
Dimer : 82.6

Expected size
(kDa)
monomer: 50.5
Dimer : 101

SEQUENCE LISTING

<160> NUMBER OF SEQ ID NOS: 46

<210> SEQ ID NO 1
<211> LENGTH: 25
<212> TYPE: PRT
<213> ORGANISM: Artificial Sequence
<220> FEATURE:
<223> OTHER INFORMATION: signal peptide (TPA)

<400> SEQUENCE: 1

Met Asp Ala Met Leu Arg Gly Leu Cys Cys Val Leu Leu Leu Cys Gly
1               5                   10                  15

Ala Val Phe Val Ser Pro Ser His Ala
            20                  25

<210> SEQ ID NO 2

<211> LENGTH: 208
<212> TYPE: PRT
<213> ORGANISM: Artificial Sequence
<220> FEATURE:
<223> OTHER INFORMATION: hB7-1:35-242

<400> SEQUENCE: 2

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
        50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

<210> SEQ ID NO 3
<211> LENGTH: 30
<212> TYPE: PRT
<213> ORGANISM: Artificial Sequence
<220> FEATURE:
<223> OTHER INFORMATION: hinge with linker

<400> SEQUENCE: 3

Gly Ser Gly Gly Gly Ser Gly Gly Gly Ser Gly Gly Gly
1               5                   10                  15

Ser Ala Glu Ser Lys Tyr Gly Pro Pro Cys Pro Pro Cys Pro
                20                  25                  30

<210> SEQ ID NO 4
<211> LENGTH: 216
<212> TYPE: PRT
<213> ORGANISM: Artificial Sequence
<220> FEATURE:
<223> OTHER INFORMATION: immunoglobulin fc

<400> SEQUENCE: 4

Ala Pro Glu Ala Ala Gly Gly Pro Ser Val Phe Leu Phe Pro Pro Lys
1               5                   10                  15

Pro Lys Asp Gln Leu Met Ile Ser Arg Thr Pro Glu Val Thr Cys Val
                20                  25                  30

Val Val Asp Val Ser Gln Glu Asp Pro Glu Val Gln Phe Asn Trp Tyr
        35                  40                  45

Val Asp Gly Val Glu Val His Asn Ala Lys Thr Lys Pro Arg Glu Glu
 50                  55                  60

Gln Phe Asn Ser Thr Tyr Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Gly Leu Pro Ser Ser Ile Glu Lys Thr Ile Ser Lys Ala Lys Gly Gln
            100                 105                 110

Pro Arg Glu Pro Gln Val Tyr Thr Leu Pro Pro Ser Gln Glu Glu Met
            115                 120                 125

Thr Lys Asn Gln Val Ser Leu Thr Cys Leu Val Lys Gly Phe Tyr Pro
130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Arg Leu Thr Val Asp Lys Ser Arg Trp Gln Glu Gly Asn Val
            180                 185                 190

Phe Ser Cys Ser Val Leu His Glu Ala Leu His Asn His Tyr Thr Gln
            195                 200                 205

Lys Ser Leu Ser Leu Ser Leu Gly
    210                 215

<210> SEQ ID NO 5
<211> LENGTH: 5
<212> TYPE: PRT
<213> ORGANISM: Artificial Sequence
<220> FEATURE:
<223> OTHER INFORMATION: linker

<400> SEQUENCE: 5

Gly Gly Gly Gly Ser
1               5

<210> SEQ ID NO 6
<211> LENGTH: 133
<212> TYPE: PRT
<213> ORGANISM: Artificial Sequence
<220> FEATURE:
<223> OTHER INFORMATION: hIL-2M

<400> SEQUENCE: 6

Ala Pro Thr Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Ala Met Leu Thr Ala Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

```
Thr Ile Val Glu Phe Leu Asn Arg Trp Ile Thr Phe Cys Gln Ser Ile
            115                 120                 125

Ile Ser Thr Leu Thr
        130

<210> SEQ ID NO 7
<211> LENGTH: 617
<212> TYPE: PRT
<213> ORGANISM: Artificial Sequence
<220> FEATURE:
<223> OTHER INFORMATION: fusion protein comprising variants of IL-2 and
      fragments of CD80

<400> SEQUENCE: 7

Met Asp Ala Met Leu Arg Gly Leu Cys Cys Val Leu Leu Leu Cys Gly
1               5                   10                  15

Ala Val Phe Val Ser Pro Ser His Ala Val Ile His Val Thr Lys Glu
            20                  25                  30

Val Lys Glu Val Ala Thr Leu Ser Cys Gly His Asn Val Ser Val Glu
        35                  40                  45

Glu Leu Ala Gln Thr Arg Ile Tyr Trp Gln Lys Glu Lys Lys Met Val
    50                  55                  60

Leu Thr Met Met Ser Gly Asp Met Asn Ile Trp Pro Glu Tyr Lys Asn
65                  70                  75                  80

Arg Thr Ile Phe Asp Ile Thr Asn Asn Leu Ser Ile Val Ile Leu Ala
                85                  90                  95

Leu Arg Pro Ser Asp Glu Gly Thr Tyr Glu Cys Val Val Leu Lys Tyr
            100                 105                 110

Glu Lys Asp Ala Phe Lys Arg Glu His Leu Ala Glu Val Thr Leu Ser
        115                 120                 125

Val Lys Ala Asp Phe Pro Thr Pro Ser Ile Ser Asp Phe Glu Ile Pro
    130                 135                 140

Thr Ser Asn Ile Arg Arg Ile Ile Cys Ser Thr Ser Gly Gly Phe Pro
145                 150                 155                 160

Glu Pro His Leu Ser Trp Leu Glu Asn Gly Glu Glu Leu Asn Ala Ile
                165                 170                 175

Asn Thr Thr Val Ser Gln Asp Pro Glu Thr Glu Leu Tyr Ala Val Ser
            180                 185                 190

Ser Lys Leu Asp Phe Asn Met Thr Thr Asn His Ser Phe Met Cys Leu
        195                 200                 205

Ile Lys Tyr Gly His Leu Arg Val Asn Gln Thr Phe Asn Trp Asn Thr
    210                 215                 220

Thr Lys Gln Glu His Phe Pro Asp Asn Gly Ser Gly Gly Gly Gly Ser
225                 230                 235                 240

Gly Gly Gly Gly Ser Gly Gly Gly Ser Ala Glu Ser Lys Tyr Gly
                245                 250                 255

Pro Pro Cys Pro Pro Cys Pro Ala Pro Glu Ala Ala Gly Gly Pro Ser
            260                 265                 270

Val Phe Leu Phe Pro Pro Lys Pro Lys Asp Gln Leu Met Ile Ser Arg
        275                 280                 285

Thr Pro Glu Val Thr Cys Val Val Asp Val Ser Gln Glu Asp Pro
    290                 295                 300

Glu Val Gln Phe Asn Trp Tyr Val Asp Gly Val Glu Val His Asn Ala
305                 310                 315                 320

Lys Thr Lys Pro Arg Glu Glu Gln Phe Asn Ser Thr Tyr Arg Val Val
```

325                 330                 335
Ser Val Leu Thr Val Leu His Gln Asp Trp Leu Asn Gly Lys Glu Tyr
                340                 345                 350
Lys Cys Lys Val Ser Asn Lys Gly Leu Pro Ser Ser Ile Glu Lys Thr
            355                 360                 365
Ile Ser Lys Ala Lys Gly Gln Pro Arg Glu Pro Gln Val Tyr Thr Leu
        370                 375                 380
Pro Pro Ser Gln Glu Glu Met Thr Lys Asn Gln Val Ser Leu Thr Cys
385                 390                 395                 400
Leu Val Lys Gly Phe Tyr Pro Ser Asp Ile Ala Val Glu Trp Glu Ser
                405                 410                 415
Asn Gly Gln Pro Glu Asn Asn Tyr Lys Thr Thr Pro Pro Val Leu Asp
                420                 425                 430
Ser Asp Gly Ser Phe Phe Leu Tyr Ser Arg Leu Thr Val Asp Lys Ser
            435                 440                 445
Arg Trp Gln Glu Gly Asn Val Phe Ser Cys Ser Val Leu His Glu Ala
        450                 455                 460
Leu His Asn His Tyr Thr Gln Lys Ser Leu Ser Leu Ser Leu Gly Gly
465                 470                 475                 480
Gly Gly Gly Ser Ala Pro Thr Ser Ser Ser Thr Lys Lys Thr Gln Leu
                485                 490                 495
Gln Leu Glu His Leu Leu Leu Asp Leu Gln Met Ile Leu Asn Gly Ile
            500                 505                 510
Asn Asn Tyr Lys Asn Pro Lys Leu Thr Ala Met Leu Thr Ala Lys Phe
        515                 520                 525
Tyr Met Pro Lys Lys Ala Thr Glu Leu Lys His Leu Gln Cys Leu Glu
    530                 535                 540
Glu Glu Leu Lys Pro Leu Glu Glu Val Leu Asn Leu Ala Gln Ser Lys
545                 550                 555                 560
Asn Phe His Leu Arg Pro Arg Asp Leu Ile Ser Asn Ile Asn Val Ile
                565                 570                 575
Val Leu Glu Leu Lys Gly Ser Glu Thr Thr Phe Met Cys Glu Tyr Ala
            580                 585                 590
Asp Glu Thr Ala Thr Ile Val Glu Phe Leu Asn Arg Trp Ile Thr Phe
        595                 600                 605
Cys Gln Ser Ile Ile Ser Thr Leu Thr
    610                 615

<210> SEQ ID NO 8
<211> LENGTH: 1857
<212> TYPE: DNA
<213> ORGANISM: Artificial Sequence
<220> FEATURE:
<223> OTHER INFORMATION: nucleotides coding fusion protein (GI101)

<400> SEQUENCE: 8
atggatgcta tgctgagagg cctgtgttgc gtgctgctgc tgtgtggcgc tgtgttcgtg     60
tctccttctc acgctgtgat ccacgtgacc aaagaagtga agaggtcgc cacactgtcc    120 tgcggccaca cgtttcagt ggaagaactg gcccagacca ggatctactg cagaaagaa    180 aagaaaatgg tgctgaccat gatgtccggc gacatgaaca tctggcctga gtacaagaac    240
cggaccatct tcgacatcac caacaacctg tccatcgtga ttctggccct gaggccttct    300
gatgagggca cctatgagtg cgtggtgctg aagtacgaga ggacgccctt caagcgcgag    360 caccctggctg aagtgacact gtccgtgaag gccgactttc ccacaccttc catctccgac    420

```
ttcgagatcc ctacctccaa catccggcgg atcatctgtt ctacctctgg cggctttcct    480
gagcctcacc tgtcttggct ggaaaacggc gaggaactga acgccatcaa caccaccgtg    540
tctcaggacc ccgaaaccga gctgtacgct gtgtcctcca agctggactt caacatgacc    600
accaaccaca gcttcatgtg cctgattaag tacggccacc tgagagtgaa ccagaccttc    660
aactggaaca ccaccaagca agagcacttc cctgacaatg gatctggcgg cggaggttct    720
ggcggaggtg aagcggagg cggaggatct gctgagtcta gtatggccc tccttgtcct    780
ccatgtcctg ctccagaagc tgctggcgga ccctctgtgt tcctgtttcc tccaaagcct    840
aaggaccagc tcatgatctc tcggacaccc gaagtgacct gcgtggtggt ggatgtgtct    900
caagaggacc ctgaggtgca gttcaattgg tacgtggacg gcgtggaagt gcacaacgcc    960
aagaccaagc ctagagagga acagttcaac tccacctaca gagtggtgtc cgtgctgacc   1020
gtgctgcacc aggattggct gaacggcaaa gagtacaagt gcaaggtgtc caacaagggc   1080
ctgcccttcca gcatcgaaaa gaccatctcc aaggctaagg ccagcctag gaaccccag    1140
gtttacaccc tgcctccaag ccaagaggaa atgaccaaga accaggtgtc cctgacctgc   1200
ctggtcaagg gcttctaccc ttccgacatt gccgtggaat gggagtccaa tggccagcct   1260
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgcccctac cagctcctct accaagaaaa cccagctcca gttggagcat   1500
ctgctgctgg acctccagat gattctgaac gggatcaaca actataagaa ccccaagctg   1560
accgccatgc tgaccgctaa gttctacatg cccaagaagg ccaccgagct gaagcacctc   1620
cagtgcctgg aagaagaact gaagcccctg aagaggtgc tgaatctggc ccagtccaag   1680
aacttccacc tgaggccacg ggacctgatc agcaacatca cgtgatcgt gctggaactg   1740
aagggctccg agacaacctt tatgtgcgag tacgccgacg agacagccac catcgtggaa   1800
tttctgaacc ggtggatcac cttctgccag agcatcatct ccacactgac ctgatga      1857
```

<210> SEQ ID NO 9
<211> LENGTH: 592
<212> TYPE: PRT
<213> ORGANISM: Artificial Sequence
<220> FEATURE:
<223> OTHER INFORMATION: fusion protein (GI101)

<400> SEQUENCE: 9

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110
```

```
Ile Ser Asp Phe Glu Ile Pro Thr Ser Asn Ile Arg Arg Ile Ile Cys
            115                 120                 125

Ser Thr Ser Gly Gly Phe Pro Glu Pro His Leu Ser Trp Leu Glu Asn
        130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Ser Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
        275                 280                 285

Gly Val Glu Val His Asn Ala Lys Thr Lys Pro Arg Glu Glu Gln Phe
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
        355                 360                 365

Asn Gln Val Ser Leu Thr Cys Leu Val Lys Gly Phe Tyr Pro Ser Asp
    370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser
            420                 425                 430

Cys Ser Val Leu His Glu Ala Leu His Asn His Tyr Thr Gln Lys Ser
        435                 440                 445

Leu Ser Leu Ser Leu Gly Gly Gly Gly Ser Ala Pro Thr Ser Ser
    450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Ala Met Leu Thr Ala Lys Phe Tyr Met Pro Lys Lys Ala Thr Glu Leu
            500                 505                 510

Lys His Leu Gln Cys Leu Glu Glu Glu Leu Lys Pro Leu Glu Glu Val
        515                 520                 525
```

```
Leu Asn Leu Ala Gln Ser Lys Asn Phe His Leu Arg Pro Arg Asp Leu
        530                 535                 540
Ile Ser Asn Ile Asn Val Ile Val Leu Glu Leu Lys Gly Ser Glu Thr
545                 550                 555                 560
Thr Phe Met Cys Glu Tyr Ala Asp Glu Thr Ala Thr Ile Val Glu Phe
                565                 570                 575
Leu Asn Arg Trp Ile Thr Phe Cys Gln Ser Ile Ile Ser Thr Leu Thr
                580                 585                 590

<210> SEQ ID NO 10
<211> LENGTH: 133
<212> TYPE: PRT
<213> ORGANISM: Artificial Sequence
<220> FEATURE:
<223> OTHER INFORMATION: hIL-2

<400> SEQUENCE: 10

Ala Pro Thr Ser Ser Ser Thr Lys Lys Thr Gln Leu Gln Leu Glu His
1               5                   10                  15
Leu Leu Leu Asp Leu Gln Met Ile Leu Asn Gly Ile Asn Asn Tyr Lys
            20                  25                  30
Asn Pro Lys Leu Thr Arg Met Leu Thr Phe Lys Phe Tyr Met Pro Lys
        35                  40                  45
Lys Ala Thr Glu Leu Lys His Leu Gln Cys Leu Glu Glu Glu Leu Lys
    50                  55                  60
Pro Leu Glu Glu Val Leu Asn Leu Ala Gln Ser Lys Asn Phe His Leu
65                  70                  75                  80
Arg Pro Arg Asp Leu Ile Ser Asn Ile Asn Val Ile Val Leu Glu Leu
                85                  90                  95
Lys Gly Ser Glu Thr Thr Phe Met Cys Glu Tyr Ala Asp Glu Thr Ala
            100                 105                 110
Thr Ile Val Glu Phe Leu Asn Arg Trp Ile Thr Phe Cys Gln Ser Ile
        115                 120                 125
Ile Ser Thr Leu Thr
    130

<210> SEQ ID NO 11
<211> LENGTH: 288
<212> TYPE: PRT
<213> ORGANISM: Artificial Sequence
<220> FEATURE:
<223> OTHER INFORMATION: CD80

<400> SEQUENCE: 11

Met Gly His Thr Arg Arg Gln Gly Thr Ser Pro Ser Lys Cys Pro Tyr
1               5                   10                  15
Leu Asn Phe Phe Gln Leu Leu Val Leu Ala Gly Leu Ser His Phe Cys
            20                  25                  30
Ser Gly Val Ile His Val Thr Lys Glu Val Lys Glu Val Ala Thr Leu
        35                  40                  45
Ser Cys Gly His Asn Val Ser Val Glu Glu Leu Ala Gln Thr Arg Ile
    50                  55                  60
Tyr Trp Gln Lys Glu Lys Lys Met Val Leu Thr Met Met Ser Gly Asp
65                  70                  75                  80
Met Asn Ile Trp Pro Glu Tyr Lys Asn Arg Thr Ile Phe Asp Ile Thr
                85                  90                  95
Asn Asn Leu Ser Ile Val Ile Leu Ala Leu Arg Pro Ser Asp Glu Gly
            100                 105                 110
```

```
Thr Tyr Glu Cys Val Val Leu Lys Tyr Glu Lys Asp Ala Phe Lys Arg
        115                 120                 125

Glu His Leu Ala Glu Val Thr Leu Ser Val Lys Ala Asp Phe Pro Thr
    130                 135                 140

Pro Ser Ile Ser Asp Phe Glu Ile Pro Thr Ser Asn Ile Arg Arg Ile
145                 150                 155                 160

Ile Cys Ser Thr Ser Gly Gly Phe Pro Glu Pro His Leu Ser Trp Leu
                165                 170                 175

Glu Asn Gly Glu Glu Leu Asn Ala Ile Asn Thr Thr Val Ser Gln Asp
            180                 185                 190

Pro Glu Thr Glu Leu Tyr Ala Val Ser Ser Lys Leu Asp Phe Asn Met
        195                 200                 205

Thr Thr Asn His Ser Phe Met Cys Leu Ile Lys Tyr Gly His Leu Arg
    210                 215                 220

Val Asn Gln Thr Phe Asn Trp Asn Thr Thr Lys Gln Glu His Phe Pro
225                 230                 235                 240

Asp Asn Leu Leu Pro Ser Trp Ala Ile Thr Leu Ile Ser Val Asn Gly
                245                 250                 255

Ile Phe Val Ile Cys Cys Leu Thr Tyr Cys Phe Ala Pro Arg Cys Arg
            260                 265                 270

Glu Arg Arg Arg Asn Glu Arg Leu Arg Arg Glu Ser Val Arg Pro Val
        275                 280                 285

<210> SEQ ID NO 12
<211> LENGTH: 215
<212> TYPE: PRT
<213> ORGANISM: Artificial Sequence
<220> FEATURE:
<223> OTHER INFORMATION: modified Fc

<400> SEQUENCE: 12

Ser His Thr Gln Pro Leu Gly Val Phe Leu Phe Pro Pro Lys Pro Lys
1               5                   10                  15

Asp Thr Leu Met Ile Ser Arg Thr Pro Glu Val Thr Cys Val Val Val
            20                  25                  30

Asp Val Ser Gln Glu Asp Pro Glu Val Gln Phe Asn Trp Tyr Val Asp
        35                  40                  45

Gly Val Glu Val His Asn Ala Lys Thr Lys Pro Arg Glu Glu Gln Phe
    50                  55                  60

Asn Ser Thr Tyr Arg Val Val Ser Val Leu Thr Val Leu His Gln Asp
65                  70                  75                  80

Trp Leu Asn Gly Lys Glu Tyr Lys Cys Lys Val Ser Asn Lys Gly Leu
                85                  90                  95

Pro Ser Ser Ile Glu Lys Thr Ile Ser Lys Ala Lys Gly Gln Pro Arg
            100                 105                 110

Glu Pro Gln Val Tyr Thr Leu Pro Pro Ser Gln Glu Glu Met Thr Lys
        115                 120                 125

Asn Gln Val Ser Leu Thr Cys Leu Val Lys Gly Phe Tyr Pro Ser Asp
    130                 135                 140

Ile Ala Val Glu Trp Glu Ser Asn Gly Gln Pro Glu Asn Asn Tyr Lys
145                 150                 155                 160

Thr Thr Pro Pro Val Leu Asp Ser Asp Gly Ser Phe Phe Leu Tyr Ser
                165                 170                 175

Arg Leu Thr Val Asp Lys Ser Arg Trp Gln Glu Gly Asn Val Phe Ser
            180                 185                 190
```

```
Cys Ser Val Met His Glu Ala Leu His Asn His Tyr Thr Gln Lys Ser
        195                 200                 205
Leu Ser Leu Ser Leu Gly Lys
    210             215

<210> SEQ ID NO 13
<211> LENGTH: 306
<212> TYPE: PRT
<213> ORGANISM: Artificial Sequence
<220> FEATURE:
<223> OTHER INFORMATION: mCD80

<400> SEQUENCE: 13

Met Ala Cys Asn Cys Gln Leu Met Gln Asp Thr Pro Leu Leu Lys Phe
1               5                   10                  15
Pro Cys Pro Arg Leu Ile Leu Leu Phe Val Leu Leu Ile Arg Leu Ser
            20                  25                  30
Gln Val Ser Ser Asp Val Asp Glu Gln Leu Ser Lys Ser Val Lys Asp
        35                  40                  45
Lys Val Leu Leu Pro Cys Arg Tyr Asn Ser Pro His Glu Asp Glu Ser
    50                  55                  60
Glu Asp Arg Ile Tyr Trp Gln Lys His Asp Lys Val Val Leu Ser Val
65                  70                  75                  80
Ile Ala Gly Lys Leu Lys Val Trp Pro Glu Tyr Lys Asn Arg Thr Leu
                85                  90                  95
Tyr Asp Asn Thr Thr Tyr Ser Leu Ile Ile Leu Gly Leu Val Leu Ser
            100                 105                 110
Asp Arg Gly Thr Tyr Ser Cys Val Val Gln Lys Lys Glu Arg Gly Thr
        115                 120                 125
Tyr Glu Val Lys His Leu Ala Leu Val Lys Leu Ser Ile Lys Ala Asp
    130                 135                 140
Phe Ser Thr Pro Asn Ile Thr Glu Ser Gly Asn Pro Ser Ala Asp Thr
145                 150                 155                 160
Lys Arg Ile Thr Cys Phe Ala Ser Gly Gly Phe Pro Lys Pro Arg Phe
                165                 170                 175
Ser Trp Leu Glu Asn Gly Arg Glu Leu Pro Gly Ile Asn Thr Thr Ile
            180                 185                 190
Ser Gln Asp Pro Glu Ser Glu Leu Tyr Thr Ile Ser Ser Gln Leu Asp
        195                 200                 205
Phe Asn Thr Thr Arg Asn His Thr Ile Lys Cys Leu Ile Lys Tyr Gly
    210                 215                 220
Asp Ala His Val Ser Glu Asp Phe Thr Trp Glu Lys Pro Pro Glu Asp
225                 230                 235                 240
Pro Pro Asp Ser Lys Asn Thr Leu Val Leu Phe Gly Ala Gly Phe Gly
                245                 250                 255
Ala Val Ile Thr Val Val Val Ile Val Val Ile Ile Lys Cys Phe Cys
            260                 265                 270
Lys His Arg Ser Cys Phe Arg Arg Asn Glu Ala Ser Arg Glu Thr Asn
        275                 280                 285
Asn Ser Leu Thr Phe Gly Pro Glu Glu Ala Leu Ala Glu Gln Thr Val
    290                 295                 300
Phe Leu
305

<210> SEQ ID NO 14
```

<211> LENGTH: 1848
<212> TYPE: DNA
<213> ORGANISM: Artificial Sequence
<220> FEATURE:
<223> OTHER INFORMATION: nucleotides coding fusion protein (mGI101)

<400> SEQUENCE: 14

| | | | | | |
|---|---|---|---|---|---|
| atggatgcta | tgctgagagg | cctgtgttgc | gtgctgctgc | tgtgtggcgc | tgtgttcgtg | 60 |
| tctccttctc | acgctgtgga | cgagcagctc | tccaagtccg | tgaaggataa | ggtcctgctg | 120 |
| ccttgccggt | acaactctcc | tcacgaggac | gagtctgagg | accggatcta | ctggcagaaa | 180 |
| cacgacaagg | tggtgctgtc | cgtgatcgcc | ggaaagctga | agtgtggcc | tgagtacaag | 240 |
| aacaggaccc | tgtacgacaa | caccacctac | agcctgatca | tcctgggcct | cgtgctgagc | 300 |
| gatagaggca | cctattcttg | cgtggtgcag | aagaaagagc | ggggcaccta | cgaagtgaag | 360 |
| cacctggctc | tggtcaagct | gtccatcaag | gccgacttca | gcacccctaa | catcaccgag | 420 |
| tctggcaacc | cttccgccga | caccaagaga | atcacctgtt | tcgcctctgg | cggcttccct | 480 |
| aagcctcggt | tctcttggct | ggaaaacggc | agagagctgc | ccggcatcaa | taccaccatt | 540 |
| tctcaggacc | cagagtccga | gctgtacacc | atctccagcc | agctcgactt | aacaccacc | 600 |
| agaaaccaca | ccatcaagtg | cctgattaag | tacggcgacg | cccacgtgtc | cgaggacttt | 660 |
| acttgggaga | acctcctga | ggaccctcct | gactctggat | ctggcggcgg | aggttctggc | 720 |
| ggaggtggaa | gcggaggcgg | aggatctgct | gagtctaagt | atggccctcc | ttgtcctcca | 780 |
| tgtcctgctc | cagaagctgc | tggcggaccc | tctgtgttcc | tgtttcctcc | aaagcctaag | 840 |
| gaccagctca | tgatctctcg | gacccctgaa | gtgacctgcg | tggtggtgga | tgtgtctcaa | 900 |
| gaggaccctg | aggtgcagtt | caattggtac | gtggacggcg | tggaagtgca | caacgccaag | 960 |
| accaagccta | gagaggaaca | gttcaactcc | acctatagag | tggtgtccgt | gctgaccgtg | 1020 |
| ctgcaccagg | attggctgaa | cggcaaagag | tacaagtgca | aggtgtccaa | caagggcctg | 1080 |
| ccttccagca | tcgaaaagac | catcagcaag | gctaagggcc | agcctaggga | accccaggtt | 1140 |
| tacaccctgc | ctccaagcca | gaggaaatg | accaagaacc | aggtgtccct | gacctgcctg | 1200 |
| gtcaagggct | tctacccttc | cgacattgcc | gtggaatggg | agtccaatgg | ccagcctgag | 1260 |
| aacaactaca | agaccacacc | tcctgtgctg | gactccgacg | gctccttctt | tctgtactct | 1320 |
| cgcctgaccg | tggacaagtc | taggtggcaa | gagggcaacg | tgttctcctg | ctctgtgctg | 1380 |
| cacgaggctc | tgcacaacca | ctacacccag | aagtccctgt | ctctgtctct | tggaggtggt | 1440 |
| ggcggttctg | cccctacctc | cagctctacc | aagaaaaccc | agctccagtt | ggagcatctg | 1500 |
| ctgctggacc | tccagatgat | cctgaatggc | atcaacaatt | acaagaaccc | caagctgacc | 1560 |
| gccatgctga | ccgctaagtt | ctacatgccc | aagaaggcca | ccgagctgaa | gcacttgcag | 1620 |
| tgcctggaag | aggaactgaa | gccctggaa | gaagtgctga | atctggccca | gtccaagaac | 1680 |
| ttccacctga | ggcctaggga | cctgatctcc | aacatcaacg | tgatcgtgct | ggaactgaaa | 1740 |
| ggctccgaga | caaccttcat | gtgcgagtac | gccgacgaga | cagccaccat | cgtggaattt | 1800 |
| ctgaaccggt | ggatcacctt | ctgccagagc | atcatctcca | cactgacc | | 1848 |

<210> SEQ ID NO 15
<211> LENGTH: 616
<212> TYPE: PRT
<213> ORGANISM: Artificial Sequence
<220> FEATURE:
<223> OTHER INFORMATION: fusion protein (mGI101)

<400> SEQUENCE: 15

```
Met Asp Ala Met Leu Arg Gly Leu Cys Cys Val Leu Leu Cys Gly
1               5                   10                  15

Ala Val Phe Val Ser Pro Ser His Ala Val Asp Glu Gln Leu Ser Lys
            20                  25                  30

Ser Val Lys Asp Lys Val Leu Leu Pro Cys Arg Tyr Asn Ser Pro His
            35                  40                  45

Glu Asp Glu Ser Glu Asp Arg Ile Tyr Trp Gln Lys His Asp Lys Val
        50                  55                  60

Val Leu Ser Val Ile Ala Gly Lys Leu Lys Val Trp Pro Glu Tyr Lys
65                  70                  75                  80

Asn Arg Thr Leu Tyr Asp Asn Thr Thr Tyr Ser Leu Ile Ile Leu Gly
                85                  90                  95

Leu Val Leu Ser Asp Arg Gly Thr Tyr Ser Cys Val Val Gln Lys Lys
            100                 105                 110

Glu Arg Gly Thr Tyr Glu Val Lys His Leu Ala Leu Val Lys Leu Ser
        115                 120                 125

Ile Lys Ala Asp Phe Ser Thr Pro Asn Ile Thr Glu Ser Gly Asn Pro
    130                 135                 140

Ser Ala Asp Thr Lys Arg Ile Thr Cys Phe Ala Ser Gly Gly Phe Pro
145                 150                 155                 160

Lys Pro Arg Phe Ser Trp Leu Glu Asn Gly Arg Glu Leu Pro Gly Ile
            165                 170                 175

Asn Thr Thr Ile Ser Gln Asp Pro Glu Ser Glu Leu Tyr Thr Ile Ser
            180                 185                 190

Ser Gln Leu Asp Phe Asn Thr Thr Arg Asn His Thr Ile Lys Cys Leu
    195                 200                 205

Ile Lys Tyr Gly Asp Ala His Val Ser Glu Asp Phe Thr Trp Glu Lys
    210                 215                 220

Pro Pro Glu Asp Pro Pro Asp Ser Gly Ser Gly Gly Gly Ser Gly
225                 230                 235                 240

Gly Gly Gly Ser Gly Gly Gly Ser Ala Glu Ser Lys Tyr Gly Pro
                245                 250                 255

Pro Cys Pro Pro Cys Pro Ala Pro Glu Ala Ala Gly Gly Pro Ser Val
        260                 265                 270

Phe Leu Phe Pro Pro Lys Pro Lys Asp Gln Leu Met Ile Ser Arg Thr
    275                 280                 285

Pro Glu Val Thr Cys Val Val Val Asp Val Ser Gln Glu Asp Pro Glu
    290                 295                 300

Val Gln Phe Asn Trp Tyr Val Asp Gly Val Glu Val His Asn Ala Lys
305                 310                 315                 320

Thr Lys Pro Arg Glu Glu Gln Phe Asn Ser Thr Tyr Arg Val Val Ser
            325                 330                 335

Val Leu Thr Val Leu His Gln Asp Trp Leu Asn Gly Lys Glu Tyr Lys
            340                 345                 350

Cys Lys Val Ser Asn Lys Gly Leu Pro Ser Ser Ile Glu Lys Thr Ile
        355                 360                 365

Ser Lys Ala Lys Gly Gln Pro Arg Glu Pro Gln Val Tyr Thr Leu Pro
    370                 375                 380

Pro Ser Gln Glu Glu Met Thr Lys Asn Gln Val Ser Leu Thr Cys Leu
385                 390                 395                 400

Val Lys Gly Phe Tyr Pro Ser Asp Ile Ala Val Glu Trp Glu Ser Asn
            405                 410                 415
```

Gly Gln Pro Glu Asn Asn Tyr Lys Thr Thr Pro Val Leu Asp Ser
                420                 425             430

Asp Gly Ser Phe Phe Leu Tyr Ser Arg Leu Thr Val Asp Lys Ser Arg
            435                 440             445

Trp Gln Glu Gly Asn Val Phe Ser Cys Ser Val Leu His Glu Ala Leu
        450                 455             460

His Asn His Tyr Thr Gln Lys Ser Leu Ser Leu Ser Leu Gly Gly Gly
465                 470             475                 480

Gly Gly Ser Ala Pro Thr Ser Ser Ser Thr Lys Lys Thr Gln Leu Gln
            485                 490             495

Leu Glu His Leu Leu Leu Asp Leu Gln Met Ile Leu Asn Gly Ile Asn
        500                 505             510

Asn Tyr Lys Asn Pro Lys Leu Thr Ala Met Leu Thr Ala Lys Phe Tyr
    515                 520             525

Met Pro Lys Lys Ala Thr Glu Leu Lys His Leu Gln Cys Leu Glu Glu
530                 535             540

Glu Leu Lys Pro Leu Glu Glu Val Leu Asn Leu Ala Gln Ser Lys Asn
545                 550             555             560

Phe His Leu Arg Pro Arg Asp Leu Ile Ser Asn Ile Asn Val Ile Val
                565             570             575

Leu Glu Leu Lys Gly Ser Glu Thr Thr Phe Met Cys Glu Tyr Ala Asp
            580                 585             590

Glu Thr Ala Thr Ile Val Glu Phe Leu Asn Arg Trp Ile Thr Phe Cys
        595                 600             605

Gln Ser Ile Ile Ser Thr Leu Thr
    610                 615

<210> SEQ ID NO 16
<211> LENGTH: 1437
<212> TYPE: DNA
<213> ORGANISM: Artificial Sequence
<220> FEATURE:
<223> OTHER INFORMATION: nucleotides coding fusion protein (GI101C1)

<400> SEQUENCE: 16
atggatgcta tgctgagagg cctgtgttgc gtgctgctgc tgtgtggcgc tgtgttcgtg     60
tctccttctc acgctgtgat ccacgtgacc aaagaagtga agaggtcgc cacactgtcc    120 tgcggccaca cgtttcagt ggaagaactg gcccagacca ggatctactg cagaaagaa    180 aagaaaatgg tgctgaccat gatgtccggc gacatgaaca tctggcctga gtacaagaac    240
cggaccatct cgacatcac caacaacctg tccatcgtga ttctggccct gaggccttct    300
gatgagggca cctatgagtg cgtggtgctg aagtacgaga aggacgcctt caagcgcgag    360
cacctggctg aagtgacact gtccgtgaag gccgactttc ccacaccttc catctccgac    420
ttcgagatcc ctacctccaa catccggcgg atcatctgtt ctacctctgg cggctttcct    480
gagcctcacc tgtcttggct ggaaaacggc gaggaactga cgccatcaa caccaccgtg    540 tctcaggacc ccgaaaccga gctgtacgct gtgtcctcca gctggactt caacatgacc    600 accaaccaca gcttcatgtg cctgattaag tacggccacc tgagagtgaa ccagaccttc    660
aactggaaca ccaccaagca agagcacttc cctgacaatg gatctggcgg cggaggttct    720
ggcggaggtg gaagcggagg cggaggatct gctgagtcta gtatggcccc tccttgtcct    780
ccatgtcctg ctccagaagc tgctggcgga ccctctgtgt tcctgtttcc tccaaagcct    840
aaggaccagc tcatgatctc tcggacaccc gaagtgacct gcgtggtggt ggatgtgtct    900

| | | |
|---|---|---|
| caagaggacc ctgaggtgca gttcaattgg tacgtggacg gcgtggaagt gcacaacgcc | 960 | |
| aagaccaagc ctagagagga acagttcaac tccacctaca gagtggtgtc cgtgctgacc | 1020 | |
| gtgctgcacc aggattggct gaacggcaaa gagtacaagt gcaaggtgtc caacaagggc | 1080 | |
| ctgcctttcca gcatcgaaaa gaccatctcc aaggctaagg ccagcctag ggaaccccag | 1140 | |
| gtttacaccc tgcctccaag ccaagaggaa atgaccaaga accaggtgtc cctgacctgc | 1200 | |
| ctggtcaagg gcttctaccc ttccgacatt gccgtggaat gggagtccaa tggccagcct | 1260 | |
| gagaacaact acaagaccac acctcctgtg ctggactccg acggctcctt ctttctgtac | 1320 | |
| tctcgcctga ccgtggacaa gtctaggtgg caagagggca acgtgttctc ctgctctgtg | 1380 | |
| ctgcacgagg ccctgcacaa tcactacacc cagaagtccc tgtctctgtc cctgggc | 1437 | |

<210> SEQ ID NO 17
<211> LENGTH: 454
<212> TYPE: PRT
<213> ORGANISM: Artificial Sequence
<220> FEATURE:
<223> OTHER INFORMATION: fusion protein (GI101C1)

<400> SEQUENCE: 17

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
        50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Gly Ser Gly Gly Gly Gly Ser Gly Gly Gly Gly
210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270
```

-continued

Asp Val Ser Gln Glu Asp Pro Glu Val Gln Phe Asn Trp Tyr Val Asp
            275                 280                 285
Gly Val Glu Val His Asn Ala Lys Thr Lys Pro Arg Glu Glu Gln Phe
        290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Gly Leu
                325                 330                 335
Pro Ser Ser Ile Glu Lys Thr Ile Ser Lys Ala Lys Gly Gln Pro Arg
            340                 345                 350
Glu Pro Gln Val Tyr Thr Leu Pro Pro Ser Gln Glu Glu Met Thr Lys
        355                 360                 365
Asn Gln Val Ser Leu Thr Cys Leu Val Lys Gly Phe Tyr Pro Ser Asp
370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                405                 410                 415
Arg Leu Thr Val Asp Lys Ser Arg Trp Gln Glu Gly Asn Val Phe Ser
            420                 425                 430
Cys Ser Val Leu His Glu Ala Leu His Asn His Tyr Thr Gln Lys Ser
        435                 440                 445
Leu Ser Leu Ser Leu Gly
    450

<210> SEQ ID NO 18
<211> LENGTH: 1176
<212> TYPE: DNA
<213> ORGANISM: Artificial Sequence
<220> FEATURE:
<223> OTHER INFORMATION: nucleotides coding fusion protein (GI101C2)

<400> SEQUENCE: 18

| | | |
|---|---|---|
| atggatgcta tgctgagagg cctgtgttgc gtgctgctgc tgtgtggcgc tgtgttcgtg | 60 |
| tctccatctc acgccgctga gtctaagtac ggccctcctt gtcctccatg tcctgctcca | 120 |
| gaagctgctg gcggaccctc tgtgttcctg tttcctccaa agcctaagga ccagctcatg | 180 |
| atctctcgga cccctgaagt gacctgcgtg gtggtggatg tgtctcaaga ggaccctgag | 240 |
| gtgcagttca attggtacgt ggacggcgtg gaagtgcaca acgccaagac caagcctaga | 300 |
| gaggaacagt tcaactccac ctacagagtg gtgtccgtgc tgaccgtgct gcaccaggat | 360 |
| tggctgaacg gcaaagagta caagtgcaag gtgtccaaca agggcctgcc ttccagcatc | 420 |
| gaaaagacca tctccaaggc taagggccag cctagggaac cccaggttta caccctgcct | 480 |
| ccaagccaag aggaaatgac caagaaccag gtgtccctga cctgcctggt caagggcttc | 540 |
| tacccttccg acattgccgt ggaatgggag tccaatggcc agcctgagaa caactacaag | 600 |
| accacacctc ctgtgctgga ctccgacggc tccttctttc tgtactctcg cctgaccgtg | 660 |
| gacaagtcta ggtggcaaga gggcaacgtg ttctcctgct ctgtgctgca cgaggccctg | 720 |
| cacaatcact acacccagaa gtccctgtct ctgtctcttg gcggaggcgg aggatctgct | 780 |
| cctacctcca gctccaccaa gaaaacccag ctccagttgg agcatctgct gctggaccte | 840 |
| cagatgatcc tgaatggcat caacaattac aagaacccca agctgaccgc catgctgacc | 900 |
| gctaagttct acatgcccaa gaaggccacc gagctgaagc acctccagtg cctggaagag | 960 |
| gaactgaagc ccctggaaga agtgctgaat ctggcccagt ccaagaactt ccacctgagg | 1020 |

```
cctagggacc tgatctccaa catcaacgtg atcgtgctgg aactgaaagg ctccgagaca    1080
accttcatgt gcgagtacgc cgacgagaca gccaccatcg tggaatttct gaaccggtgg    1140
atcaccttct gccagtccat catctccaca ctgacc                              1176
```

<210> SEQ ID NO 19
<211> LENGTH: 367
<212> TYPE: PRT
<213> ORGANISM: Artificial Sequence
<220> FEATURE:
<223> OTHER INFORMATION: fusion protein (GI101C2)

<400> SEQUENCE: 19

```
Ala Glu Ser Lys Tyr Gly Pro Pro Cys Pro Pro Cys Pro Ala Pro Glu
1               5                   10                  15

Ala Ala Gly Gly Pro Ser Val Phe Leu Phe Pro Pro Lys Pro Lys Asp
            20                  25                  30

Gln Leu Met Ile Ser Arg Thr Pro Glu Val Thr Cys Val Val Val Asp
        35                  40                  45

Val Ser Gln Glu Asp Pro Glu Val Gln Phe Asn Trp Tyr Val Asp Gly
    50                  55                  60

Val Glu Val His Asn Ala Lys Thr Lys Pro Arg Glu Glu Gln Phe Asn
65                  70                  75                  80

Ser Thr Tyr Arg Val Val Ser Val Leu Thr Val Leu His Gln Asp Trp
                85                  90                  95

Leu Asn Gly Lys Glu Tyr Lys Cys Lys Val Ser Asn Lys Gly Leu Pro
            100                 105                 110

Ser Ser Ile Glu Lys Thr Ile Ser Lys Ala Lys Gly Gln Pro Arg Glu
        115                 120                 125

Pro Gln Val Tyr Thr Leu Pro Pro Ser Gln Glu Glu Met Thr Lys Asn
    130                 135                 140

Gln Val Ser Leu Thr Cys Leu Val Lys Gly Phe Tyr Pro Ser Asp Ile
145                 150                 155                 160

Ala Val Glu Trp Glu Ser Asn Gly Gln Pro Glu Asn Asn Tyr Lys Thr
                165                 170                 175

Thr Pro Pro Val Leu Asp Ser Asp Gly Ser Phe Phe Leu Tyr Ser Arg
            180                 185                 190

Leu Thr Val Asp Lys Ser Arg Trp Gln Glu Gly Asn Val Phe Ser Cys
        195                 200                 205

Ser Val Leu His Glu Ala Leu His Asn His Tyr Thr Gln Lys Ser Leu
    210                 215                 220

Ser Leu Ser Leu Gly Gly Gly Gly Ser Ala Pro Thr Ser Ser Ser
225                 230                 235                 240

Thr Lys Lys Thr Gln Leu Gln Leu Glu His Leu Leu Leu Asp Leu Gln
                245                 250                 255

Met Ile Leu Asn Gly Ile Asn Asn Tyr Lys Asn Pro Lys Leu Thr Ala
            260                 265                 270

Met Leu Thr Ala Lys Phe Tyr Met Pro Lys Lys Ala Thr Glu Leu Lys
        275                 280                 285

His Leu Gln Cys Leu Glu Glu Glu Leu Lys Pro Leu Glu Glu Val Leu
    290                 295                 300

Asn Leu Ala Gln Ser Lys Asn Phe His Leu Arg Pro Arg Asp Leu Ile
305                 310                 315                 320

Ser Asn Ile Asn Val Ile Val Leu Glu Leu Lys Gly Ser Glu Thr Thr
                325                 330                 335
```

```
Phe Met Cys Glu Tyr Ala Asp Glu Thr Ala Thr Ile Val Glu Phe Leu
        340                 345                 350

Asn Arg Trp Ile Thr Phe Cys Gln Ser Ile Ile Ser Thr Leu Thr
            355                 360                 365
```

<210> SEQ ID NO 20
<211> LENGTH: 1434
<212> TYPE: DNA
<213> ORGANISM: Artificial Sequence
<220> FEATURE:
<223> OTHER INFORMATION: nucleotides coding fusion protein (mGI101C1)

<400> SEQUENCE: 20

```
atggatgcta tgctgagagg cctgtgttgc gtgctgctgc tgtgtggcgc tgtgttcgtg      60
tctccttctc acgctgtgga cgagcagctc tccaagtccg tgaaggataa ggtcctgctg     120
ccttgccggt acaactctcc tcacgaggac gagtctgagg accggatcta ctggcagaaa     180
cacgacaagg tggtgctgtc cgtgatcgcc ggaaagctga agtgtggcc tgagtacaag     240
aacaggaccc tgtacgacaa caccacctac agcctgatca tcctgggcct cgtgctgagc     300
gatagaggca cctattcttg cgtggtgcag aagaaagagc ggggcaccta cgaagtgaag     360
cacctggctc tggtcaagct gtccatcaag gccgacttca gcacccctaa catcaccgag     420
tctggcaacc cttccgccga caccaagaga atcacctgtt cgcctctgg cggcttccct     480
aagcctcggt tctcttggct ggaaaacggc agagagctgc ccggcatcaa taccaccatt     540
tctcaggacc cagagtccga gctgtacacc atctccagcc agctcgactt taacaccacc     600
agaaaccaca ccatcaagtg cctgattaag tacggcgacg cccacgtgtc cgaggacttt     660
acttgggaga aacctcctga ggaccctcct gactctggat ctggcggcgg aggttctggc     720
ggaggtggaa gcggaggcgg aggatctgct gagtctaagt atggccctcc ttgtcctcca     780
tgtcctgctc cagaagctgc tggcggaccc tctgtgttcc tgtttcctcc aaagcctaag     840
gaccagctca tgatctctcg gacccctgaa gtgacctgcg tggtggtgga tgtgtctcaa     900
gaggaccctg aggtgcagtt caattggtac gtggacggcg tggaagtgca aacgccaag     960
accaagccta gaggaacag ttcaactcc acctatagag tggtgtccgt gctgaccgtg    1020
ctgcaccagg attggctgaa cggcaaagag tacaagtgca aggtgtccaa caagggcctg    1080
ccttccagca tcgaaaagac catcagcaag gctaagggcc agcctaggga acccccaggtt    1140
tacaccctgc ctccaagcca agaggaaatg accaagaacc aggtgtccct gacctgcctg    1200
gtcaagggct ctaccccttc cgacattgcc gtggaatggg agtccaatgg ccagcctgag    1260
aacaactaca agaccacacc tcctgtgctg gactccgacg gctccttctt tctgtactct    1320
cgcctgaccg tggacaagtc taggtggcaa gagggcaacg tgttctcctg ctctgtgctg    1380
cacgaggctc tgcacaacca ctacacccag aagtccctgt ctctgtccct gggc         1434
```

<210> SEQ ID NO 21
<211> LENGTH: 478
<212> TYPE: PRT
<213> ORGANISM: Artificial Sequence
<220> FEATURE:
<223> OTHER INFORMATION: fusion protein (mGI101C1)

<400> SEQUENCE: 21

```
Met Asp Ala Met Leu Arg Gly Leu Cys Cys Val Leu Leu Leu Cys Gly
1               5                   10                  15

Ala Val Phe Val Ser Pro Ser His Ala Val Asp Glu Gln Leu Ser Lys
```

```
                    20                  25                  30
Ser Val Lys Asp Lys Val Leu Leu Pro Cys Arg Tyr Asn Ser Pro His
             35                  40                  45
Glu Asp Glu Ser Glu Asp Arg Ile Tyr Trp Gln Lys His Asp Lys Val
 50                  55                  60
Val Leu Ser Val Ile Ala Gly Lys Leu Lys Val Trp Pro Glu Tyr Lys
 65                  70                  75                  80
Asn Arg Thr Leu Tyr Asp Asn Thr Thr Tyr Ser Leu Ile Ile Leu Gly
                 85                  90                  95
Leu Val Leu Ser Asp Arg Gly Thr Tyr Ser Cys Val Val Gln Lys Lys
                100                 105                 110
Glu Arg Gly Thr Tyr Glu Val Lys His Leu Ala Leu Val Lys Leu Ser
            115                 120                 125
Ile Lys Ala Asp Phe Ser Thr Pro Asn Ile Thr Glu Ser Gly Asn Pro
130                 135                 140
Ser Ala Asp Thr Lys Arg Ile Thr Cys Phe Ala Ser Gly Gly Phe Pro
145                 150                 155                 160
Lys Pro Arg Phe Ser Trp Leu Glu Asn Gly Arg Glu Leu Pro Gly Ile
                165                 170                 175
Asn Thr Thr Ile Ser Gln Asp Pro Glu Ser Glu Leu Tyr Thr Ile Ser
                180                 185                 190
Ser Gln Leu Asp Phe Asn Thr Thr Arg Asn His Thr Ile Lys Cys Leu
            195                 200                 205
Ile Lys Tyr Gly Asp Ala His Val Ser Glu Asp Phe Thr Trp Glu Lys
            210                 215                 220
Pro Pro Glu Asp Pro Pro Asp Ser Gly Ser Gly Gly Gly Ser Gly
225                 230                 235                 240
Gly Gly Gly Ser Gly Gly Gly Ser Ala Glu Ser Lys Tyr Gly Pro
                245                 250                 255
Pro Cys Pro Pro Cys Pro Ala Pro Glu Ala Ala Gly Gly Pro Ser Val
                260                 265                 270
Phe Leu Phe Pro Pro Lys Pro Lys Asp Gln Leu Met Ile Ser Arg Thr
            275                 280                 285
Pro Glu Val Thr Cys Val Val Val Asp Val Ser Gln Glu Asp Pro Glu
            290                 295                 300
Val Gln Phe Asn Trp Tyr Val Asp Gly Val Glu Val His Asn Ala Lys
305                 310                 315                 320
Thr Lys Pro Arg Glu Glu Gln Phe Asn Ser Thr Tyr Arg Val Val Ser
                325                 330                 335
Val Leu Thr Val Leu His Gln Asp Trp Leu Asn Gly Lys Glu Tyr Lys
            340                 345                 350
Cys Lys Val Ser Asn Lys Gly Leu Pro Ser Ser Ile Glu Lys Thr Ile
            355                 360                 365
Ser Lys Ala Lys Gly Gln Pro Arg Glu Pro Gln Val Tyr Thr Leu Pro
            370                 375                 380
Pro Ser Gln Glu Glu Met Thr Lys Asn Gln Val Ser Leu Thr Cys Leu
385                 390                 395                 400
Val Lys Gly Phe Tyr Pro Ser Asp Ile Ala Val Glu Trp Glu Ser Asn
                405                 410                 415
Gly Gln Pro Glu Asn Asn Tyr Lys Thr Thr Pro Pro Val Leu Asp Ser
            420                 425                 430
Asp Gly Ser Phe Phe Leu Tyr Ser Arg Leu Thr Val Asp Lys Ser Arg
            435                 440                 445
```

```
Trp Gln Glu Gly Asn Val Phe Ser Cys Ser Val Leu His Glu Ala Leu
        450                 455                 460
His Asn His Tyr Thr Gln Lys Ser Leu Ser Leu Gly
465                 470                 475
```

<210> SEQ ID NO 22
<211> LENGTH: 133
<212> TYPE: PRT
<213> ORGANISM: Artificial Sequence
<220> FEATURE:
<223> OTHER INFORMATION: variants of IL-2 (3M, M45)

<400> SEQUENCE: 22

```
Ala Pro Thr Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Ala Met Pro Lys
            35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130
```

<210> SEQ ID NO 23
<211> LENGTH: 133
<212> TYPE: PRT
<213> ORGANISM: Artificial Sequence
<220> FEATURE:
<223> OTHER INFORMATION: variants of IL-2 (3M, M61)

<400> SEQUENCE: 23

```
Ala Pro Thr Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Tyr Met Pro Lys
            35                  40                  45

Lys Ala Thr Glu Leu Lys His Leu Gln Cys Leu Glu Arg Glu Leu Lys
50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
```

<210> SEQ ID NO 24
<211> LENGTH: 133
<212> TYPE: PRT
<213> ORGANISM: Artificial Sequence
<220> FEATURE:
<223> OTHER INFORMATION: variants of IL-2 (3M, M72)

<400> SEQUENCE: 24

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Ala Met Leu Thr Ala Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Gly Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130
```

<210> SEQ ID NO 25
<211> LENGTH: 1851
<212> TYPE: DNA
<213> ORGANISM: Artificial Sequence
<220> FEATURE:
<223> OTHER INFORMATION: nucleotides coding fusion protein (GI102-M45)

<400> SEQUENCE: 25

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120 tgcggccaca cgtttcagt ggaagaactg gcccagacca ggatctactg cagaaagaa      180 aagaaaatgg tgctgaccat gatgtccggc gacatgaaca tctggcctga gtacaagaac      240
cggaccatct tcgacatcac caacaacctg tccatcgtga ttctggccct gaggccttct      300
gatgagggca cctatgagtg cgtggtgctg aagtacgaga aggacgcctt caagcgcgag      360
cacctggctg aagtgacact gtccgtgaag gccgactttc ccacaccttc catctccgac      420
ttcgagatcc ctacctccaa catccggcgg atcatctgtt ctacctctgg cggctttcct      480
gagcctcacc tgtcttggct ggaaaacggc gaggaactga cgccatcaa caccaccgtg      540 tctcaggacc ccgaaaccga gctgtacgct gtgtcctcca gctggactt caacatgacc      600 accaaccaca gcttcatgtg cctgattaag tacggccacc tgagagtgaa ccagaccttc      660
aactggaaca ccaccaagca agagcacttc cctgacaatg gatctggcgg cggaggttct      720
ggcggaggtg gaagcggagg cggaggatct gctgagtcta gtatggcccc tccttgtcct      780
ccatgtcctg ctccagaagc tgctggcgga ccctctgtgt tcctgtttcc tccaaagcct      840
aaggaccagc tcatgatctc tcggacaccc gaagtgacct gcgtggtggt ggatgtgtct      900
```

```
caagaggacc ctgaggtgca gttcaattgg tacgtggacg gcgtggaagt gcacaacgcc    960
aagaccaagc ctagagagga acagttcaac tccacctaca gagtggtgtc cgtgctgacc   1020
gtgctgcacc aggattggct gaacggcaaa gagtacaagt gcaaggtgtc caacaagggc   1080
ctgcccttcca gcatcgaaaa gaccatctcc aaggctaagg gccagcctag gaaccccag   1140
gtttacaccc tgcctccaag ccaagaggaa atgaccaaga accaggtgtc cctgacctgc   1200
ctggtcaagg gcttctaccc ttccgacatt gccgtggaat gggagtccaa tggccagcct   1260
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgcccctac cagctcctct accaagaaaa cccagctcca gttggagcat   1500
ctgctgctgg acctccagat gattctgaac gggatcaaca actataagaa cccccaagctg   1560
accgccatgc tgaccgctaa gttcgccatg cccaagaagg ccaccgagct gaagcacctc   1620
cagtgcctgg aagaagaact gaagcccctg aagaggtgc tgaatctggc ccagtccaag   1680
aacttccacc tgaggccacg ggacctgatc agcaacatca cgtgatcgt gctggaactg   1740
aagggctccg acaaccttt atgtgcgag tacgccgacg acagccac catcgtggaa   1800
tttctgaacc ggtggatcac cttctgccag agcatcatct ccacactgac c           1851
```

<210> SEQ ID NO 26
<211> LENGTH: 592
<212> TYPE: PRT
<213> ORGANISM: Artificial Sequence
<220> FEATURE:
<223> OTHER INFORMATION: fusion protein (GI102-M45)

<400> SEQUENCE: 26

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
    130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
```

```
                195                 200                 205
Gly Ser Gly Gly Gly Ser Gly Gly Gly Ser Gly Gly Gly
    210                 215                 220
Ser Ala Glu Ser Lys Tyr Gly Pro Cys Pro Cys Pro Ala Pro
225                 230                 235                 240
Glu Ala Ala Gly Gly Pro Ser Val Phe Leu Phe Pro Pro Lys Pro Lys
                245                 250                 255
Asp Gln Leu Met Ile Ser Arg Thr Pro Glu Val Thr Cys Val Val Val
                260                 265                 270
Asp Val Ser Gln Glu Asp Pro Glu Val Gln Phe Asn Trp Tyr Val Asp
            275                 280                 285
Gly Val Glu Val His Asn Ala Lys Thr Lys Pro Arg Glu Glu Gln Phe
        290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Gly Leu
                325                 330                 335
Pro Ser Ser Ile Glu Lys Thr Ile Ser Lys Ala Lys Gly Gln Pro Arg
                340                 345                 350
Glu Pro Gln Val Tyr Thr Leu Pro Pro Ser Gln Glu Glu Met Thr Lys
            355                 360                 365
Asn Gln Val Ser Leu Thr Cys Leu Val Lys Gly Phe Tyr Pro Ser Asp
370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                405                 410                 415
Arg Leu Thr Val Asp Lys Ser Arg Trp Gln Glu Gly Asn Val Phe Ser
                420                 425                 430
Cys Ser Val Leu His Glu Ala Leu His Asn His Tyr Thr Gln Lys Ser
            435                 440                 445
Leu Ser Leu Ser Leu Gly Gly Gly Gly Ser Ala Pro Thr Ser Ser
450                 455                 460
Ser Thr Lys Lys Thr Gln Leu Gln Leu Glu His Leu Leu Leu Asp Leu
465                 470                 475                 480
Gln Met Ile Leu Asn Gly Ile Asn Asn Tyr Lys Asn Pro Lys Leu Thr
                485                 490                 495
Ala Met Leu Thr Ala Lys Phe Ala Met Pro Lys Lys Ala Thr Glu Leu
            500                 505                 510
Lys His Leu Gln Cys Leu Glu Glu Glu Leu Lys Pro Leu Glu Glu Val
        515                 520                 525
Leu Asn Leu Ala Gln Ser Lys Asn Phe His Leu Arg Pro Arg Asp Leu
        530                 535                 540
Ile Ser Asn Ile Asn Val Ile Val Leu Glu Leu Lys Gly Ser Glu Thr
545                 550                 555                 560
Thr Phe Met Cys Glu Tyr Ala Asp Glu Thr Ala Thr Ile Val Glu Phe
                565                 570                 575
Leu Asn Arg Trp Ile Thr Phe Cys Gln Ser Ile Ile Ser Thr Leu Thr
            580                 585                 590

<210> SEQ ID NO 27
<211> LENGTH: 1851
<212> TYPE: DNA
<213> ORGANISM: Artificial Sequence
```

<220> FEATURE:
<223> OTHER INFORMATION: nucleotides coding fusion protein (GI102-M61)

<400> SEQUENCE: 27

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120
tgcggccaca acgtttcagt ggaagaactg cccagacca ggatctactg cagaaagaa      180
aagaaaatgg tgctgaccat gatgtccggc acatgaaca tctggcctga gtacaagaac      240
cggaccatct tcgacatcac caacaacctg tccatcgtga ttctggccct gaggccttct      300
gatgagggca cctatgagtg cgtggtgctg aagtacgaga aggacgcctt caagcgcgag      360
cacctggctg aagtgacact gtccgtgaag ccgactttc ccacaccttc catctccgac      420
ttcgagatcc ctacctccaa catccggcgg atcatctgtt ctacctctgg cggctttcct      480
gagcctcacc tgtcttggct ggaaaacggc gaggaactga acgccatcaa caccaccgtg      540
tctcaggacc ccgaaaccga gctgtacgct gtgtcctcca agctggactt caacatgacc      600
accaaccaca gcttcatgtg cctgattaag tacggccacc tgagagtgaa ccagaccttc      660
aactggaaca ccaccaagca agagcacttc cctgacaatg gatctggcgg cggaggttct      720
ggcggaggtg aagcggagg cggaggatct gctgagtcta agtatggccc ccttgtcct      780
ccatgtcctg ctccagaagc tgctggcgga ccctctgtgt tcctgttcc tccaaagcct      840
aaggaccagc tcatgatctc tcggacaccc gaagtgacct gcgtggtggt ggatgtgtct      900
caagaggacc ctgaggtgca gttcaattgg tacgtgacg gcgtggaagt gcacaacgcc      960
aagaccaagc tagagagga acagttcaac tccacctaca gagtggtgtc cgtgctgacc      1020
gtgctgcacc aggattggct gaacggcaaa gagtacaagt gcaaggtgtc caacaagggc      1080
ctgccttcca gcatcgaaaa gaccatctcc aaggctaagg ccagcctag gaaccccag      1140
gtttacaccc tgcctccaag ccaagaggaa atgaccaaga accaggtgtc cctgacctgc      1200
ctggtcaagg gcttctaccc ttccgacatt gccgtggaat gggagtccaa tggccagcct      1260
gagaacaact acaagaccac acctcctgtg ctggactccg acggctcctt ctttctgtac      1320
tctcgcctga ccgtggacaa gtctagatgg caagagggca cgtgttctc ctgctctgtg      1380
ctgcacgagg ccctgcacaa tcactacacc cagaagtccc tgtctctgtc tcttggaggt      1440
ggtggcggtt ctgccctac cagctcctct accaagaaa cccagctcca gttggagcat      1500
ctgctgctgg acctccagat gattctgaac gggatcaaca actataagaa ccccaagctg      1560
accgccatgc tgaccgctaa gttctacatg cccaagaagg ccaccgagct gaagcacctc      1620
cagtgcctgg aaagggaact gaagcccctg aagaggtgc tgaatctggc ccagtccaag      1680
aacttccacc tgaggccacg ggacctgatc agcaacatca cgtgatcgt gctggaactg      1740
aagggctccg agacaacctt tatgtgcgag tacgccgacg agacagccac catcgtggaa      1800
tttctgaacc ggtggatcac cttctgccag agcatcatct ccacactgac c      1851
```

<210> SEQ ID NO 28
<211> LENGTH: 592
<212> TYPE: PRT
<213> ORGANISM: Artificial Sequence
<220> FEATURE:
<223> OTHER INFORMATION: fusion protein (GI102-M61)

<400> SEQUENCE: 28

```
Val Ile His Val Thr Lys Glu Val Lys Glu Val Ala Thr Leu Ser Cys
1               5                   10                  15
```

-continued

```
Gly His Asn Val Ser Val Glu Glu Leu Ala Gln Thr Arg Ile Tyr Trp
         20                  25                  30
Gln Lys Glu Lys Lys Met Val Leu Thr Met Met Ser Gly Asp Met Asn
             35                  40                  45
Ile Trp Pro Glu Tyr Lys Asn Arg Thr Ile Phe Asp Ile Thr Asn Asn
 50                  55                  60
Leu Ser Ile Val Ile Leu Ala Leu Arg Pro Ser Asp Glu Gly Thr Tyr
 65                  70                  75                  80
Glu Cys Val Val Leu Lys Tyr Glu Lys Asp Ala Phe Lys Arg Glu His
                 85                  90                  95
Leu Ala Glu Val Thr Leu Ser Val Lys Ala Asp Phe Pro Thr Pro Ser
             100                 105                 110
Ile Ser Asp Phe Glu Ile Pro Thr Ser Asn Ile Arg Arg Ile Ile Cys
         115                 120                 125
Ser Thr Ser Gly Gly Phe Pro Glu Pro His Leu Ser Trp Leu Glu Asn
130                 135                 140
Gly Glu Glu Leu Asn Ala Ile Asn Thr Thr Val Ser Gln Asp Pro Glu
145                 150                 155                 160
Thr Glu Leu Tyr Ala Val Ser Ser Lys Leu Asp Phe Asn Met Thr Thr
                 165                 170                 175
Asn His Ser Phe Met Cys Leu Ile Lys Tyr Gly His Leu Arg Val Asn
             180                 185                 190
Gln Thr Phe Asn Trp Asn Thr Thr Lys Gln Glu His Phe Pro Asp Asn
         195                 200                 205
Gly Ser Gly Gly Gly Ser Gly Gly Gly Ser Gly Gly Gly Gly
         210                 215                 220
Ser Ala Glu Ser Lys Tyr Gly Pro Pro Cys Pro Pro Cys Pro Ala Pro
225                 230                 235                 240
Glu Ala Ala Gly Gly Pro Ser Val Phe Leu Phe Pro Pro Lys Pro Lys
                 245                 250                 255
Asp Gln Leu Met Ile Ser Arg Thr Pro Glu Val Thr Cys Val Val Val
             260                 265                 270
Asp Val Ser Gln Glu Asp Pro Glu Val Gln Phe Asn Trp Tyr Val Asp
         275                 280                 285
Gly Val Glu Val His Asn Ala Lys Thr Lys Pro Arg Glu Glu Gln Phe
290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Gly Leu
                 325                 330                 335
Pro Ser Ser Ile Glu Lys Thr Ile Ser Lys Ala Lys Gly Gln Pro Arg
             340                 345                 350
Glu Pro Gln Val Tyr Thr Leu Pro Pro Ser Gln Glu Glu Met Thr Lys
         355                 360                 365
Asn Gln Val Ser Leu Thr Cys Leu Val Lys Gly Phe Tyr Pro Ser Asp
370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                 405                 410                 415
Arg Leu Thr Val Asp Lys Ser Arg Trp Gln Glu Gly Asn Val Phe Ser
             420                 425                 430
```

```
Cys Ser Val Leu His Glu Ala Leu His Asn His Tyr Thr Gln Lys Ser
        435                 440                 445
Leu Ser Leu Ser Leu Gly Gly Gly Gly Ser Ala Pro Thr Ser Ser
    450                 455                 460
Ser Thr Lys Lys Thr Gln Leu Gln Leu Glu His Leu Leu Asp Leu
465                 470                 475                 480
Gln Met Ile Leu Asn Gly Ile Asn Asn Tyr Lys Asn Pro Lys Leu Thr
                485                 490                 495
Ala Met Leu Thr Ala Lys Phe Tyr Met Pro Lys Lys Ala Thr Glu Leu
            500                 505                 510
Lys His Leu Gln Cys Leu Glu Arg Glu Leu Lys Pro Leu Glu Glu Val
        515                 520                 525
Leu Asn Leu Ala Gln Ser Lys Asn Phe His Leu Arg Pro Arg Asp Leu
    530                 535                 540
Ile Ser Asn Ile Asn Val Ile Val Leu Glu Leu Lys Gly Ser Glu Thr
545                 550                 555                 560
Thr Phe Met Cys Glu Tyr Ala Asp Glu Thr Ala Thr Ile Val Glu Phe
                565                 570                 575
Leu Asn Arg Trp Ile Thr Phe Cys Gln Ser Ile Ile Ser Thr Leu Thr
            580                 585                 590
```

<210> SEQ ID NO 29
<211> LENGTH: 1857
<212> TYPE: DNA
<213> ORGANISM: Artificial Sequence
<220> FEATURE:
<223> OTHER INFORMATION: nucleotides coding fusion protein (GI102-M72)

<400> SEQUENCE: 29

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc     120
tgcggccaca acgtttcagt ggaagaactg gcccagacca ggatctactg cagaaagaa     180
aagaaaatgg tgctgaccat gatgtccggc gacatgaaca tctggcctga gtacaagaac     240
cggaccatct tcgacatcac caacaacctg tccatcgtga ttctggccct gaggccttct     300
gatgagggca cctatgagtg cgtggtgctg aagtacgaga aggacgcctt caagcgcgag     360
cacctggctg aagtgacact gtccgtgaag gccgactttc ccacaccttc catctccgac     420
ttcgagatcc ctacctccaa catccggcgg atcatctgtt ctacctctgg cggctttcct     480
gagcctcacc tgtcttggct ggaaaacggc gaggaactga acgccatcaa caccaccgtg     540
tctcaggacc ccgaaaccga gctgtacgct gtgtcctcca gctggactt caacatgacc     600
accaaccaca gcttcatgtg cctgattaag tacggccacc tgagagtgaa ccagaccttc     660
aactggaaca ccaccaagca agagcacttc cctgacaatg gatctggcgg cggaggttct     720
ggcggaggtg aagcggagg cggaggatct gctgagtcta gtatggccc tccttgtcct     780
ccatgtcctg ctccagaagc tgctggcgga ccctctgtgt tcctgtttcc tccaaagcct     840
aaggaccagc tcatgatctc tcggacaccc gaagtgacct gcgtggtggt ggatgtgtct     900
caagaggacc ctgaggtgca gttcaattgg tacgtggacg gcgtggaagt gcacaacgcc     960
aagaccaagc ctagagagga acagttcaac tccacctaca gtggtggtc cgtgctgacc    1020
gtgctgcacc aggattggct gaacggcaaa gagtacaagt gcaaggtgtc caacaagggc    1080
ctgccttcca gcatcgaaaa gaccatctcc aaggctaagg ccagcctag ggaaccccag    1140
gtttacaccc tgcctccaag ccaagaggaa atgaccaaga ccaggtgtc cctgacctgc    1200
```

-continued

```
ctggtcaagg gcttctaccc ttccgacatt gccgtggaat gggagtccaa tggccagcct    1260
gagaacaact acaagaccac acctcctgtg ctggactccg acggctcctt ctttctgtac    1320
tctcgcctga ccgtggacaa gtctagatgg caagagggca acgtgttctc ctgctctgtg    1380
ctgcacgagg ccctgcacaa tcactacacc cagaagtccc tgtctctgtc tcttggaggt    1440
ggtggcggtt ctgcccctac cagctcctct accaagaaaa cccagctcca gttggagcat    1500
ctgctgctgg acctccagat gattctgaac gggatcaaca actataagaa ccccaagctg    1560
accgccatgc tgaccgctaa gttctacatg cccaagaagg ccaccgagct gaagcacctc    1620
cagtgcctga agaagaact gaagcccctg aagaggtgc tgaatggggc ccagtccaag    1680
aacttccacc tgaggccacg ggacctgatc agcaacatca acgtgatcgt gctggaactg    1740
aagggctccg acaaccttt atgtgcgag tacgccgacg agacagccac catcgtggaa    1800
tttctgaacc ggtggatcac cttctgccag agcatcatct ccacactgac ctgatga      1857
```

<210> SEQ ID NO 30
<211> LENGTH: 592
<212> TYPE: PRT
<213> ORGANISM: Artificial Sequence
<220> FEATURE:
<223> OTHER INFORMATION: fusion protein (GI102-M72)

<400> SEQUENCE: 30

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
    130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Gly Ser Gly Gly Gly Ser Gly Gly Gly Gly
    210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
```

```
                        245                 250                 255
Asp Gln Leu Met Ile Ser Arg Thr Pro Glu Val Thr Cys Val Val Val
                260                 265                 270

Asp Val Ser Gln Glu Asp Pro Glu Val Gln Phe Asn Trp Tyr Val Asp
            275                 280                 285

Gly Val Glu Val His Asn Ala Lys Thr Lys Pro Arg Glu Glu Gln Phe
        290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
        355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser
            420                 425                 430

Cys Ser Val Leu His Glu Ala Leu His Asn His Tyr Thr Gln Lys Ser
        435                 440                 445

Leu Ser Leu Ser Leu Gly Gly Gly Gly Ser Ala Pro Thr Ser Ser
450                 455                 460

Ser Thr Lys Lys Thr Gln Leu Gln Leu Glu His Leu Leu Leu Asp Leu
465                 470                 475                 480

Gln Met Ile Leu Asn Gly Ile Asn Asn Tyr Lys Asn Pro Lys Leu Thr
                485                 490                 495

Ala Met Leu Thr Ala Lys Phe Tyr Met Pro Lys Lys Ala Thr Glu Leu
            500                 505                 510

Lys His Leu Gln Cys Leu Glu Glu Glu Leu Lys Pro Leu Glu Glu Val
        515                 520                 525

Leu Asn Gly Ala Gln Ser Lys Asn Phe His Leu Arg Pro Arg Asp Leu
        530                 535                 540

Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
                565                 570                 575

Leu Asn Arg Trp Ile Thr Phe Cys Gln Ser Ile Ile Ser Thr Leu Thr
            580                 585                 590
```

<210> SEQ ID NO 31
<211> LENGTH: 1851
<212> TYPE: DNA
<213> ORGANISM: Artificial Sequence
<220> FEATURE:
<223> OTHER INFORMATION: nucleotides coding fusion protein (GI101w)

<400> SEQUENCE: 31
atggatgcta tgctgagagg cctgtgttgc gtgctgctgc tgtgtggcgc tgtgttcgtg     60
tctccttctc acgctgtgat ccacgtgacc aaagaagtga agaggtcgc cacactgtcc    120

|  |  |
|---|---|
| tgcggccaca acgtttcagt ggaagaactg gcccagacca ggatctactg cagaaagaa | 180 |
| aagaaaatgg tgctgaccat gatgtccggc gacatgaaca tctggcctga gtacaagaac | 240 |
| cggaccatct tcgacatcac caacaacctg tccatcgtga ttctggccct gaggccttct | 300 |
| gatgagggca cctatgagtg cgtggtgctg aagtacgaga aggacgcctt caagcgcgag | 360 |
| cacctggctg aagtgacact gtccgtgaag gccgactttc ccacaccttc catctccgac | 420 |
| ttcgagatcc ctacctccaa catccggcgg atcatctgtt ctacctctgg cggctttcct | 480 |
| gagcctcacc tgtcttggct ggaaaacggc gaggaactga acgccatcaa caccaccgtg | 540 |
| tctcaggacc ccgaaaccga gctgtacgct gtgtcctcca agctggactt caacatgacc | 600 |
| accaaccaca gcttcatgtg cctgattaag tacggccacc tgagagtgaa ccagaccttc | 660 |
| aactggaaca ccaccaagca agagcacttc cctgacaatg gatctggcgg cggaggttct | 720 |
| ggcggaggtg aagcggagg cggaggatct gctgagtcta agtatggccc tccttgtcct | 780 |
| ccatgtcctg ctccagaagc tgctggcgga ccctctgtgt tcctgtttcc tccaaagcct | 840 |
| aaggaccagc tcatgatctc tcggacaccc gaagtgacct gcgtggtggt ggatgtgtct | 900 |
| caagaggacc ctgaggtgca gttcaattgg tacgtggacg gcgtggaagt gcacaacgcc | 960 |
| aagaccaagc tagagagga acagttcaac tccacctaca gagtggtgtc cgtgctgacc | 1020 |
| gtgctgcacc aggattggct gaacggcaaa gagtacaagt gcaaggtgtc caacaagggc | 1080 |
| ctgccttcca gcatcgaaaa gaccatctcc aaggctaagg gccagcctag gaacccccag | 1140 |
| gtttacaccc tgcctccaag ccaagaggaa atgaccaaga accaggtgtc cctgacctgc | 1200 |
| ctggtcaagg cttctacccc ttccgacatt gccgtggaat gggagtccaa tggccagcct | 1260 |
| gagaacaact acaagaccac acctcctgtg ctggactccg acggctcctt ctttctgtac | 1320 |
| tctcgcctga ccgtggacaa gtctagatgg caagagggca acgtgttctc ctgctctgtg | 1380 |
| ctgcacgagg ccctgcacaa tcactacacc cagaagtccc tgtctctgtc tcttggaggt | 1440 |
| ggtggcggtt ctgccccta cagctcctct accaagaaaa cccagctcca gttggagcat | 1500 |
| ctgctgctgg acctccagat gattctgaac gggatcaaca actataagaa ccccaagctg | 1560 |
| acccgcatgc tgacctttaa gttctacatg cccaagaagg ccaccgagct gaagcacctc | 1620 |
| cagtgcctgg aagaagaact gaagcccctg gaagaggtgc tgaatctggc ccagtccaag | 1680 |
| aacttccacc tgaggccacg ggacctgatc agcaacatca acgtgatcgt gctggaactg | 1740 |
| aagggctccg agacaacctt tatgtgcgag tacgccgacg agacagccac catcgtggaa | 1800 |
| tttctgaacc ggtggatcac cttctgccag agcatcatct ccacactgac c | 1851 |

<210> SEQ ID NO 32
<211> LENGTH: 592
<212> TYPE: PRT
<213> ORGANISM: Artificial Sequence
<220> FEATURE:
<223> OTHER INFORMATION: fusion protein (GI101w)

<400> SEQUENCE: 32

```
Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60
```

```
Leu Ser Ile Val Ile Leu Ala Leu Arg Pro Ser Asp Glu Gly Thr Tyr
 65                  70                  75                  80

Glu Cys Val Val Leu Lys Tyr Glu Lys Asp Ala Phe Lys Arg Glu His
                 85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
        115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
        195                 200                 205

Gly Ser Gly Gly Gly Ser Gly Gly Gly Ser Gly Gly Gly Gly
210                 215                 220

Ser Ala Glu Ser Lys Tyr Gly Pro Pro Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Gln Leu Met Ile Ser Arg Thr Pro Glu Val Thr Cys Val Val Val
            260                 265                 270

Asp Val Ser Gln Glu Asp Pro Glu Val Gln Phe Asn Trp Tyr Val Asp
        275                 280                 285

Gly Val Glu Val His Asn Ala Lys Thr Lys Pro Arg Glu Glu Gln Phe
290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Gly Leu
                325                 330                 335

Pro Ser Ser Ile Glu Lys Thr Ile Ser Lys Ala Lys Gly Gln Pro Arg
            340                 345                 350

Glu Pro Gln Val Tyr Thr Leu Pro Pro Ser Gln Glu Glu Met Thr Lys
        355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Arg Leu Thr Val Asp Lys Ser Arg Trp Gln Glu Gly Asn Val Phe Ser
            420                 425                 430

Cys Ser Val Leu His Glu Ala Leu His Asn His Tyr Thr Gln Lys Ser
        435                 440                 445

Leu Ser Leu Ser Leu Gly Gly Gly Gly Ser Ala Pro Thr Ser Ser
450                 455                 460

Ser Thr Lys Lys Thr Gln Leu Gln Leu Glu His Leu Leu Leu Asp Leu
465                 470                 475                 480
```

```
Gln Met Ile Leu Asn Gly Ile Asn Asn Tyr Lys Asn Pro Lys Leu Thr
                485                 490                 495
Arg Met Leu Thr Phe Lys Phe Tyr Met Pro Lys Ala Thr Glu Leu
        500                 505                 510
Lys His Leu Gln Cys Leu Glu Glu Glu Leu Lys Pro Leu Glu Glu Val
        515                 520                 525
Leu Asn Leu Ala Gln Ser Lys Asn Phe His Leu Arg Pro Arg Asp Leu
        530                 535                 540
Ile Ser Asn Ile Asn Val Ile Val Leu Glu Leu Lys Gly Ser Glu Thr
545                 550                 555                 560
Thr Phe Met Cys Glu Tyr Ala Asp Glu Thr Ala Thr Ile Val Glu Phe
                565                 570                 575
Leu Asn Arg Trp Ile Thr Phe Cys Gln Ser Ile Ile Ser Thr Leu Thr
                580                 585                 590

<210> SEQ ID NO 33
<211> LENGTH: 1848
<212> TYPE: DNA
<213> ORGANISM: Artificial Sequence
<220> FEATURE:
<223> OTHER INFORMATION: nucleotides coding fusion protein (mGI102-M61)

<400> SEQUENCE: 33
atggatgcta tgctgagagg cctgtgttgc gtgctgctgc tgtgtggcgc tgtgttcgtg      60
tctccttctc acgctgtgga cgagcagctc tccaagtccg tgaaggataa ggtcctgctg     120
ccttgccggt acaactctcc tcacgaggac gagtctgagg accggatcta ctggcagaaa     180
cacgacaagg tggtgctgtc cgtgatcgcc ggaaagctga agtgtggcc tgagtacaag      240 aacaggaccc tgtacgacaa caccacctac agcctgatca tcctgggcct cgtgctgagc     300
gatagaggca cctattcttg cgtggtgcag aagaaagagc ggggcaccta cgaagtgaag     360
cacctggctc tggtcaagct gtccatcaag gccgacttca gcaccctaa catcaccgag      420 tctggcaacc cttccgccga caccaagaga atcacctgtt tcgcctctgg cggcttccct     480
aagcctcggt tctcttggct ggaaaacggc agagagctgc ccggcatcaa taccaccatt     540
tctcaggacc cagagtccga gctgtacacc atctccagcc agctcgactt taacaccacc     600
agaaaccaca ccatcaagtg cctgattaag tacggcgacg cccacgtgtc cgaggacttt     660
acttgggaga aacctcctga ggaccctcct gactctggat ctggcggcgg aggttctggc     720
ggaggtggaa gcggaggcgg aggatctgct gagtctaagt atggccctcc ttgtcctcca     780
tgtcctgctc cagaagctgc tggcggaccc tctgtgttcc tgtttcctcc aaagcctaag     840
gaccagctca tgatctctcg gacccctgaa gtgacctgcg tggtggtgga tgtgtctcaa     900
gaggaccctg aggtgcagtt caattggtac gtggacggcg tggaagtgca caacgccaag     960
accaagccta gagaggaaca gttcaactcc acctatagag tggtgtccgt gctgaccgtg    1020
ctgcaccagg attggctgaa cggcaaagag tacaagtgca aggtgtccaa caagggcctg    1080
ccttccagca tcgaaaagac catcagcaag gctaagggcc agcctaggga accccaggtt    1140
tacaccctgc ctccaagcca agaggaaatg accaagaacc aggtgtccct gacctgcctg    1200
gtcaagggct ctaccccttc cgacattgcc gtggaatggg agtccaatgg ccagcctgag    1260
aacaactaca agaccacacc tcctgtgctg gactccgacg gctccttctt tctgtactct    1320
cgcctgaccg tggacaagtc taggtggcaa gagggcaacg tgttctcctg ctctgtgctg    1380
cacgaggctc tgcacaacca ctacacccag aagtccctgt ctctgtctct ggaggtggt    1440
```

```
ggcggttctg ccctacctc cagctctacc aagaaaccc agctccagtt ggagcatctg    1500
ctgctggacc tccagatgat cctgaatggc atcaacaatt acaagaaccc caagctgacc    1560
gccatgctga ccgctaagtt ctacatgccc aagaaggcca ccgagctgaa gcacttgcag    1620
tgcctggaaa gggaactgaa gcccctggaa gaagtgctga atctggccca gtccaagaac    1680
ttccacctga ggcctaggga cctgatctcc aacatcaacg tgatcgtgct ggaactgaaa    1740
ggctccgaga caaccttcat gtgcgagtac gccgacgaga cagccaccat cgtggaattt    1800
ctgaaccggt ggatcacctt ctgccagagc atcatctcca cactgacc                1848
```

<210> SEQ ID NO 34
<211> LENGTH: 616
<212> TYPE: PRT
<213> ORGANISM: Artificial Sequence
<220> FEATURE:
<223> OTHER INFORMATION: fusion protein (mGI102-M61)

<400> SEQUENCE: 34

```
Met Asp Ala Met Leu Arg Gly Leu Cys Cys Val Leu Leu Cys Gly
1               5                   10                  15

Ala Val Phe Val Ser Pro Ser His Ala Val Asp Glu Gln Leu Ser Lys
            20                  25                  30

Ser Val Lys Asp Lys Val Leu Leu Pro Cys Arg Tyr Asn Ser Pro His
        35                  40                  45

Glu Asp Glu Ser Glu Asp Arg Ile Tyr Trp Gln Lys His Asp Lys Val
    50                  55                  60

Val Leu Ser Val Ile Ala Gly Lys Leu Lys Val Trp Pro Glu Tyr Lys
65                  70                  75                  80

Asn Arg Thr Leu Tyr Asp Asn Thr Thr Tyr Ser Leu Ile Ile Leu Gly
                85                  90                  95

Leu Val Leu Ser Asp Arg Gly Thr Tyr Ser Cys Val Val Gln Lys Lys
            100                 105                 110

Glu Arg Gly Thr Tyr Glu Val Lys His Leu Ala Leu Val Lys Leu Ser
        115                 120                 125

Ile Lys Ala Asp Phe Ser Thr Pro Asn Ile Thr Glu Ser Gly Asn Pro
    130                 135                 140

Ser Ala Asp Thr Lys Arg Ile Thr Cys Phe Ala Ser Gly Gly Phe Pro
145                 150                 155                 160

Lys Pro Arg Phe Ser Trp Leu Glu Asn Gly Arg Glu Leu Pro Gly Ile
                165                 170                 175

Asn Thr Thr Ile Ser Gln Asp Pro Glu Ser Glu Leu Tyr Thr Ile Ser
            180                 185                 190

Ser Gln Leu Asp Phe Asn Thr Thr Arg Asn His Thr Ile Lys Cys Leu
        195                 200                 205

Ile Lys Tyr Gly Asp Ala His Val Ser Glu Asp Phe Thr Trp Glu Lys
    210                 215                 220

Pro Pro Glu Asp Pro Asp Ser Gly Ser Gly Gly Gly Ser Gly
225                 230                 235                 240

Gly Gly Ser Gly Gly Gly Ser Ala Glu Ser Lys Tyr Gly Pro
                245                 250                 255

Pro Cys Pro Pro Cys Pro Ala Pro Glu Ala Ala Gly Gly Pro Ser Val
            260                 265                 270

Phe Leu Phe Pro Pro Lys Pro Lys Asp Gln Leu Met Ile Ser Arg Thr
        275                 280                 285

Pro Glu Val Thr Cys Val Val Val Asp Val Ser Gln Glu Asp Pro Glu
```

```
                290                 295                 300
        Val Gln Phe Asn Trp Tyr Val Asp Gly Val Glu Val His Asn Ala Lys
        305                 310                 315                 320

Thr Lys Pro Arg Glu Glu Gln Phe Asn Ser Thr Tyr Arg Val Val Ser
                        325                 330                 335

Val Leu Thr Val Leu His Gln Asp Trp Leu Asn Gly Lys Glu Tyr Lys
                    340                 345                 350

Cys Lys Val Ser Asn Lys Gly Leu Pro Ser Ser Ile Glu Lys Thr Ile
                355                 360                 365

Ser Lys Ala Lys Gly Gln Pro Arg Glu Pro Gln Val Tyr Thr Leu Pro
        370                 375                 380

Pro Ser Gln Glu Glu Met Thr Lys Asn Gln Val Ser Leu Thr Cys Leu
        385                 390                 395                 400

Val Lys Gly Phe Tyr Pro Ser Asp Ile Ala Val Glu Trp Glu Ser Asn
                        405                 410                 415

Gly Gln Pro Glu Asn Asn Tyr Lys Thr Thr Pro Pro Val Leu Asp Ser
                    420                 425                 430

Asp Gly Ser Phe Phe Leu Tyr Ser Arg Leu Thr Val Asp Lys Ser Arg
                435                 440                 445

Trp Gln Glu Gly Asn Val Phe Ser Cys Ser Val Leu His Glu Ala Leu
        450                 455                 460

His Asn His Tyr Thr Gln Lys Ser Leu Ser Leu Ser Leu Gly Gly Gly
        465                 470                 475                 480

Gly Gly Ser Ala Pro Thr Ser Ser Ser Thr Lys Lys Thr Gln Leu Gln
                        485                 490                 495

Leu Glu His Leu Leu Leu Asp Leu Gln Met Ile Leu Asn Gly Ile Asn
                    500                 505                 510

Asn Tyr Lys Asn Pro Lys Leu Thr Ala Met Leu Thr Ala Lys Phe Tyr
                515                 520                 525

Met Pro Lys Lys Ala Thr Glu Leu Lys His Leu Gln Cys Leu Glu Arg
        530                 535                 540

Glu Leu Lys Pro Leu Glu Glu Val Leu Asn Leu Ala Gln Ser Lys Asn
        545                 550                 555                 560

Phe His Leu Arg Pro Arg Asp Leu Ile Ser Asn Ile Asn Val Ile Val
                        565                 570                 575

Leu Glu Leu Lys Gly Ser Glu Thr Thr Phe Met Cys Glu Tyr Ala Asp
                    580                 585                 590

Glu Thr Ala Thr Ile Val Glu Phe Leu Asn Arg Trp Ile Thr Phe Cys
                595                 600                 605

Gln Ser Ile Ile Ser Thr Leu Thr
        610                 615

<210> SEQ ID NO 35
<211> LENGTH: 153
<212> TYPE: PRT
<213> ORGANISM: Artificial Sequence
<220> FEATURE:
<223> OTHER INFORMATION: wild type hIL-2

<400> SEQUENCE: 35

Met Tyr Arg Met Gln Leu Leu Ser Cys Ile Ala Leu Ser Leu Ala Leu
1               5                   10                  15

Val Thr Asn Ser Ala Pro Thr Ser Ser Ser Thr Lys Lys Thr Gln Leu
            20                  25                  30

Gln Leu Glu His Leu Leu Leu Asp Leu Gln Met Ile Leu Asn Gly Ile
```

```
            35                  40                  45
Asn Asn Tyr Lys Asn Pro Lys Leu Thr Arg Met Leu Thr Phe Lys Phe
 50                  55                  60

Tyr Met Pro Lys Lys Ala Thr Glu Leu Lys His Leu Gln Cys Leu Glu
 65                  70                  75                  80

Glu Glu Leu Lys Pro Leu Glu Glu Val Leu Asn Leu Ala Gln Ser Lys
                 85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr
145                 150
```

<210> SEQ ID NO 36
<211> LENGTH: 158
<212> TYPE: PRT
<213> ORGANISM: Artificial Sequence
<220> FEATURE:
<223> OTHER INFORMATION: IL-2 with signal sequence

<400> SEQUENCE: 36

```
Met Asp Ala Met Leu Arg Gly Leu Cys Cys Val Leu Leu Leu Cys Gly
 1               5                  10                  15

Ala Val Phe Val Ser Pro Ser His Ala Ala Pro Thr Ser Ser Ser Thr
                20                  25                  30

Lys Lys Thr Gln Leu Gln Leu Glu His Leu Leu Leu Asp Leu Gln Met
            35                  40                  45

Ile Leu Asn Gly Ile Asn Asn Tyr Lys Asn Pro Lys Leu Thr Arg Met
 50                  55                  60

Leu Thr Phe Lys Phe Tyr Met Pro Lys Lys Ala Thr Glu Leu Lys His
 65                  70                  75                  80

Leu Gln Cys Leu Glu Glu Glu Leu Lys Pro Leu Glu Glu Val Leu Asn
                85                  90                  95

Leu Ala Gln Ser Lys Asn Phe His Leu Arg Pro Arg Asp Leu Ile Ser
            100                 105                 110

Asn Ile Asn Val Ile Val Leu Glu Leu Lys Gly Ser Glu Thr Thr Phe
        115                 120                 125

Met Cys Glu Tyr Ala Asp Glu Thr Ala Thr Ile Val Glu Phe Leu Asn
    130                 135                 140

Arg Trp Ile Thr Phe Cys Gln Ser Ile Ile Ser Thr Leu Thr
145                 150                 155
```

<210> SEQ ID NO 37
<211> LENGTH: 474
<212> TYPE: DNA
<213> ORGANISM: Artificial Sequence
<220> FEATURE:
<223> OTHER INFORMATION: nucleotide sequence coding IL-2 with signal
      sequence

<400> SEQUENCE: 37

```
atggatgcta tgctgagagg cctgtgttgc gtgctgctgc tgtgtggcgc tgtgttcgtg      60
tctccttctc acgctgcccc taccagctcc tctaccaaga aaacccagct ccagttggag     120
catctgctgc tggacctcca gatgattctg aacgggatca caactataa gaaccccaag     180
```

```
ctgacccgca tgctgacctt taagttctac atgcccaaga aggccaccga gctgaagcac    240
ctccagtgcc tggaagaaga actgaagccc tggaagagg  tgctgaatct ggcccagtcc    300
aagaacttcc acctgaggcc acgggacctg atcagcaaca tcaacgtgat cgtgctggaa    360
ctgaagggct ccgagacaac ctttatgtgc gagtacgccg acgagacagc caccatcgtg    420
gaatttctga accggtggat caccttctgc cagagcatca tctccacact gacc           474
```

<210> SEQ ID NO 38
<211> LENGTH: 13
<212> TYPE: PRT
<213> ORGANISM: Artificial Sequence
<220> FEATURE:
<223> OTHER INFORMATION: hinge
<400> SEQUENCE: 38

```
Ala Glu Ser Lys Tyr Gly Pro Pro Cys Pro Pro Cys Pro
1               5                   10
```

<210> SEQ ID NO 39
<211> LENGTH: 1461
<212> TYPE: DNA
<213> ORGANISM: Artificial Sequence
<220> FEATURE:
<223> OTHER INFORMATION: nucleotides coding CD80-Fc protein
<400> SEQUENCE: 39

```
ggatccgcca ccatggatgc tatgctgaga ggcctgtgtt gcgtgctgct gctgtgtggc     60
gctgtgttcg tgtctccttc tcacgctgtg atccacgtga ccaaagaagt gaaagaggtc    120
gccacactgt cctgcggcca caacgtttca gtggaagaac tggcccagac caggatctac    180
tggcagaaag aaaagaaaat ggtgctgacc atgatgtccg cgacatgaa  catctggcct    240 gagtacaaga accggaccat cttcgacatc accaacaacc tgtccatcgt gattctggcc    300
ctgaggcctt ctgatgaggg cacctatgag tgcgtggtgc tgaagtacga aaggacgcc     360 ttcaagcgcg agcacctggc tgaagtgaca ctgtccgtga aggccgactt tcccacacct    420
tccatctccg acttcgagat ccctacctcc aacatccggc ggatcatctg ttctacctct    480
ggcggctttc ctgagcctca cctgtcttgg ctggaaaacg gcgaggaact gaacgccatc    540
aacaccaccg tgtctcagga ccccgaaacc gagctgtacg ctgtgtcctc caagctggac    600
ttcaacatga ccaccaacca cagcttcatg tgcctgatta agtacggcca cctgagagtg    660
aaccagacct tcaactggaa caccaccaag caagagcact ccctgacaa  tggatctggc    720 ggcggaggtt ctggcggagg tggaagcgga ggcggaggat ctgctgagtc taagtatggc    780
cctccttgtc ctccatgtcc tgctccagaa gctgctggcg acccctctgt gttcctgttt    840
cctccaaagc ctaaggacca gctcatgatc tctcggacac ccgaagtgac ctgcgtggtg    900
gtggatgtgt ctcaagagga ccctgaggtg cagttcaatt ggtacgtgga cggcgtggaa    960
gtgcacaacg ccaagaccaa gcctagagag gaacagttca ctccaccta  cagagtggtg   1020 tccgtgctga ccgtgctgca ccaggattgg ctgaacggca agagtacaa  gtgcaaggtg   1080 tccaacaagg gcctgccttc cagcatcgaa aagaccatct ccaaggctaa ggcccagcct   1140
agggaacccc aggtttacac cctgcctcca agccagagg  aaatgaccaa gaaccaggtg   1200
tccctgacct gcctggtcaa gggcttctac ccttccgaca ttgccgtgga atgggagtcc   1260
aatggccagc ctgagaacaa ctacaagacc acacctcctg tgctggactc cgacggctcc   1320
ttctttctgt actctcgcct gaccgtggac aagtctaggt ggcaagaggg caacgtgttc   1380
```

```
tcctgctctg tgctgcacga ggccctgcac aatcactaca cccagaagtc cctgtctctg    1440
tccctgggct gatgactcga g                                              1461
```

<210> SEQ ID NO 40
<211> LENGTH: 479
<212> TYPE: PRT
<213> ORGANISM: Artificial Sequence
<220> FEATURE:
<223> OTHER INFORMATION: CD80-Fc protein

<400> SEQUENCE: 40

```
Met Asp Ala Met Leu Arg Gly Leu Cys Cys Val Leu Leu Cys Gly
1               5                   10                  15

Ala Val Phe Val Ser Pro Ser His Ala Val Ile His Val Thr Lys Glu
            20                  25                  30

Val Lys Glu Val Ala Thr Leu Ser Cys Gly His Asn Val Ser Val Glu
        35                  40                  45

Glu Leu Ala Gln Thr Arg Ile Tyr Trp Gln Lys Glu Lys Lys Met Val
    50                  55                  60

Leu Thr Met Met Ser Gly Asp Met Asn Ile Trp Pro Glu Tyr Lys Asn
65                  70                  75                  80

Arg Thr Ile Phe Asp Ile Thr Asn Asn Leu Ser Ile Val Ile Leu Ala
                85                  90                  95

Leu Arg Pro Ser Asp Glu Gly Thr Tyr Glu Cys Val Val Leu Lys Tyr
            100                 105                 110

Glu Lys Asp Ala Phe Lys Arg Glu His Leu Ala Glu Val Thr Leu Ser
        115                 120                 125

Val Lys Ala Asp Phe Pro Thr Pro Ser Ile Ser Asp Phe Glu Ile Pro
    130                 135                 140

Thr Ser Asn Ile Arg Arg Ile Ile Cys Ser Thr Ser Gly Gly Phe Pro
145                 150                 155                 160

Glu Pro His Leu Ser Trp Leu Glu Asn Gly Glu Glu Leu Asn Ala Ile
                165                 170                 175

Asn Thr Thr Val Ser Gln Asp Pro Glu Thr Glu Leu Tyr Ala Val Ser
            180                 185                 190

Ser Lys Leu Asp Phe Asn Met Thr Thr Asn His Ser Phe Met Cys Leu
        195                 200                 205

Ile Lys Tyr Gly His Leu Arg Val Asn Gln Thr Phe Asn Trp Asn Thr
    210                 215                 220

Thr Lys Gln Glu His Phe Pro Asp Asn Gly Ser Gly Gly Gly Gly Ser
225                 230                 235                 240

Gly Gly Gly Gly Ser Gly Gly Gly Ser Ala Glu Ser Lys Tyr Gly
                245                 250                 255

Pro Pro Cys Pro Pro Cys Pro Ala Pro Glu Ala Ala Gly Gly Pro Ser
            260                 265                 270

Val Phe Leu Phe Pro Pro Lys Pro Lys Asp Gln Leu Met Ile Ser Arg
        275                 280                 285

Thr Pro Glu Val Thr Cys Val Val Val Asp Val Ser Gln Glu Asp Pro
    290                 295                 300

Glu Val Gln Phe Asn Trp Tyr Val Asp Gly Val Glu Val His Asn Ala
305                 310                 315                 320

Lys Thr Lys Pro Arg Glu Glu Gln Phe Asn Ser Thr Tyr Arg Val Val
                325                 330                 335

Ser Val Leu Thr Val Leu His Gln Asp Trp Leu Asn Gly Lys Glu Tyr
```

```
                340             345             350
Lys Cys Lys Val Ser Asn Lys Gly Leu Pro Ser Ser Ile Glu Lys Thr
            355                 360                 365

Ile Ser Lys Ala Lys Gly Gln Pro Arg Glu Pro Gln Val Tyr Thr Leu
    370                 375                 380

Pro Pro Ser Gln Glu Glu Met Thr Lys Asn Gln Val Ser Leu Thr Cys
385                 390                 395                 400

Leu Val Lys Gly Phe Tyr Pro Ser Asp Ile Ala Val Glu Trp Glu Ser
                405                 410                 415

Asn Gly Gln Pro Glu Asn Asn Tyr Lys Thr Thr Pro Pro Val Leu Asp
                420                 425                 430

Ser Asp Gly Ser Phe Phe Leu Tyr Ser Arg Leu Thr Val Asp Lys Ser
            435                 440                 445

Arg Trp Gln Glu Gly Asn Val Phe Ser Cys Ser Val Leu His Glu Ala
    450                 455                 460

Leu His Asn His Tyr Thr Gln Lys Ser Leu Ser Leu Ser Leu Gly
465                 470                 475
```

<210> SEQ ID NO 41
<211> LENGTH: 1851
<212> TYPE: DNA
<213> ORGANISM: Artificial Sequence
<220> FEATURE:
<223> OTHER INFORMATION: nucleotides coding fusion protein (hCD80-Fc-IL2wt)

<400> SEQUENCE: 41

```
atggatgcta tgctgagagg cctgtgttgc gtgctgctgc tgtgtggcgc tgtgttcgtg      60
tctccttctc acgctgtgat ccacgtgacc aaagaagtga agaggtcgc cacactgtcc      120
tgcggccaca acgtttcagt ggaagaactg gcccagacca ggatctactg cagaaagaa      180
aagaaaatgg tgctgaccat gatgtccggc acatgaaca tctggcctga gtacaagaac      240
cggaccatct tcgacatcac caacaacctg tccatcgtga ttctggccct gaggccttct      300
gatgagggca cctatgagtg cgtggtgctg aagtacgaga ggacgccttc aagcgcgag      360
cacctggctg aagtgacact gtccgtgaag gccgactttc ccacaccttc catctccgac      420
ttcgagatcc ctaccccaa catccggcgg atcatctgtt ctacctctgg cggctttcct      480
gagcctcacc tgtcttggct ggaaaacggc gaggaactga acgccatcaa caccaccgtg      540
tctcaggacc ccgaaaccga gctgtacgct gtgtcctcca agctggactt caacatgacc      600
accaaccaca gcttcatgtg cctgattaag tacggccacc tgagagtgaa ccagaccttc      660
aactggaaca ccaccaagca agagcacttc cctgacaatg gatctggcgg cggaggttct      720
ggcggaggtg gaagcggagg cggaggatct gctgagtcta gtatggccc tccttgtcct      780
ccatgtcctg ctccagaagc tgctggcgga ccctctgtgt tcctgttttcc tccaaagcct      840
aaggaccagc tcatgatctc tcggacaccc gaagtgacct gcgtggtggt ggatgtgtct      900
caagaggacc ctgaggtgca gttcaattgg tacgtggacg gcgtggaagt gcacaacgcc      960
aagaccaagc ctagagagga acagttcaac tccacctaca gagtggtgtc cgtgctgacc      1020
gtgctgcacc aggattggct gaacggcaaa gagtacaagt gcaaggtgtc caacaagggc      1080
ctgcctccca gcatcgaaaa gaccatctcc aaggctaagg gcagcctag ggaaccccag      1140
gtttacaccc tgcctccaag ccagaggaa atgaccaaga accaggtgtc cctgacctgc      1200
ctggtcaagg gcttctaccc ttcgacatt gccgtggaat gggagtccaa tggccagcct      1260
```

-continued

```
gagaacaact acaagaccac acctcctgtg ctggactccg acggctcctt ctttctgtac   1320
tctcgcctga ccgtggacaa gtctagatgg caagagggca acgtgttctc ctgctctgtg   1380
ctgcacgagg ccctgcacaa tcactacacc cagaagtccc tgtctctgtc tcttggaggt   1440
ggtggcggtt ctgcccctac cagctcctct accaagaaaa cccagctcca gttggagcat   1500
ctgctgctgg acctccagat gattctgaac gggatcaaca actataagaa ccccaagctg   1560
acccgcatgc tgacctttaa gttctacatg cccaagaagg ccaccgagct gaagcacctc   1620
cagtgcctgg aagaagaact gaagcccctg gaagaggtgc tgaatctggc ccagtccaag   1680
aacttccacc tgaggccacg ggacctgatc agcaacatca acgtgatcgt gctggaactg   1740
aagggctccg agacaacctt tatgtgcgag tacgccgacg agacagccac catcgtggaa   1800
tttctgaacc ggtggatcac cttctgccag agcatcatct ccacactgac c           1851
```

<210> SEQ ID NO 42
<211> LENGTH: 367
<212> TYPE: PRT
<213> ORGANISM: Artificial Sequence
<220> FEATURE:
<223> OTHER INFORMATION: Fc-IL2wt

<400> SEQUENCE: 42

```
Ala Glu Ser Lys Tyr Gly Pro Pro Cys Pro Pro Cys Pro Ala Pro Glu
1               5                   10                  15

Ala Ala Gly Gly Pro Ser Val Phe Leu Phe Pro Pro Lys Pro Lys Asp
            20                  25                  30

Gln Leu Met Ile Ser Arg Thr Pro Glu Val Thr Cys Val Val Val Asp
        35                  40                  45

Val Ser Gln Glu Asp Pro Glu Val Gln Phe Asn Trp Tyr Val Asp Gly
    50                  55                  60

Val Glu Val His Asn Ala Lys Thr Lys Pro Arg Glu Glu Gln Phe Asn
65                  70                  75                  80

Ser Thr Tyr Arg Val Val Ser Val Leu Thr Val Leu His Gln Asp Trp
                85                  90                  95

Leu Asn Gly Lys Glu Tyr Lys Cys Lys Val Ser Asn Lys Gly Leu Pro
            100                 105                 110

Ser Ser Ile Glu Lys Thr Ile Ser Lys Ala Lys Gly Gln Pro Arg Glu
        115                 120                 125

Pro Gln Val Tyr Thr Leu Pro Pro Ser Gln Glu Glu Met Thr Lys Asn
    130                 135                 140

Gln Val Ser Leu Thr Cys Leu Val Lys Gly Phe Tyr Pro Ser Asp Ile
145                 150                 155                 160

Ala Val Glu Trp Glu Ser Asn Gly Gln Pro Glu Asn Asn Tyr Lys Thr
                165                 170                 175

Thr Pro Pro Val Leu Asp Ser Asp Gly Ser Phe Phe Leu Tyr Ser Arg
            180                 185                 190

Leu Thr Val Asp Lys Ser Arg Trp Gln Glu Gly Asn Val Phe Ser Cys
        195                 200                 205

Ser Val Leu His Glu Ala Leu His Asn His Tyr Thr Gln Lys Ser Leu
    210                 215                 220

Ser Leu Ser Leu Gly Gly Gly Gly Gly Ser Ala Pro Thr Ser Ser Ser
225                 230                 235                 240

Thr Lys Lys Thr Gln Leu Gln Leu Glu His Leu Leu Leu Asp Leu Gln
                245                 250                 255

Met Ile Leu Asn Gly Ile Asn Asn Tyr Lys Asn Pro Lys Leu Thr Arg
```

```
                     260              265              270
Met Leu Thr Phe Lys Phe Tyr Met Pro Lys Lys Ala Thr Glu Leu Lys
                275              280              285

His Leu Gln Cys Leu Glu Glu Glu Leu Lys Pro Leu Glu Glu Val Leu
            290              295              300

Asn Leu Ala Gln Ser Lys Asn Phe His Leu Arg Pro Arg Asp Leu Ile
305             310              315              320

Ser Asn Ile Asn Val Ile Val Leu Glu Leu Lys Gly Ser Glu Thr Thr
                325              330              335

Phe Met Cys Glu Tyr Ala Asp Glu Thr Ala Thr Ile Val Glu Phe Leu
            340              345              350

Asn Arg Trp Ile Thr Phe Cys Gln Ser Ile Ile Ser Thr Leu Thr
            355              360              365

<210> SEQ ID NO 43
<211> LENGTH: 1176
<212> TYPE: DNA
<213> ORGANISM: Artificial Sequence
<220> FEATURE:
<223> OTHER INFORMATION: Fc-IL2wt

<400> SEQUENCE: 43
atggatgcta tgctgagagg cctgtgttgc gtgctgctgc tgtgtggcgc tgtgttcgtg    60
tctccttctc acgctgctga gtctaagtat ggccctcctt gtcctccatg tcctgctcca   120
gaagctgctg gcggaccctc tgtgttcctg tttcctccaa agcctaagga ccagctcatg   180
atctctcgga cacccgaagt gacctgcgtg gtggtggatg tgtctcaaga ggaccctgag   240
gtgcagttca attggtacgt ggacggcgtg gaagtgcaca acgccaagac caagcctaga   300
gaggaacagt tcaactccac ctacagagtg gtgtccgtgc tgaccgtgct gcaccaggat   360
tggctgaacg gcaaagagta caagtgcaag gtgtccaaca gggcctgcc ttccagcatc   420
gaaaagacca tctccaaggc taagggccag cctagggaac ccaggtttta ccctgcct    480
ccaagccaag aggaaatgac caagaaccag gtgtccctga cctgctggt caagggcttc   540
tacccttccg acattgccgt ggaatgggag tccaatggcc agcctgagaa caactacaag   600
accacacctc ctgtgctgga ctccgacggc tccttctttc tgtactctcg cctgaccgtg   660
gacaagtcta gatggcaaga gggcaacgtg ttctcctgct ctgtgctgca cgaggccctg   720
cacaatcact acacccagaa gtccctgtct ctgtctcttg gaggtggtgg cggttctgcc   780
cctaccagct cctctaccaa gaaaacccag ctccagttgg agcatctgct gctggacctc   840
cagatgattc tgaacgggat caacaactat aagaaccca agctgacccg catgctgacc   900
tttaagttct acatgcccaa gaaggccacc gagctgaagc acctccagtg cctggaagaa   960
gaactgaagc ccctggaaga ggtgctgaat ctggcccagt ccaagaactt ccacctgagg  1020
ccacgggacc tgatcagcaa catcaacgtg atcgtgctgg aactgaaggg ctccgagaca  1080
acctttatgt gcgagtacgc cgacgagaca gccaccatcg tggaatttct gaaccggtgg  1140
atcaccttct gccagagcat catctccaca ctgacc                            1176

<210> SEQ ID NO 44
<211> LENGTH: 392
<212> TYPE: PRT
<213> ORGANISM: Artificial Sequence
<220> FEATURE:
<223> OTHER INFORMATION: Fc-IL2v2

<400> SEQUENCE: 44
```

```
Met Asp Ala Met Leu Arg Gly Leu Cys Cys Val Leu Leu Cys Gly
1               5                   10                  15

Ala Val Phe Val Ser Pro Ser His Ala Ala Glu Ser Lys Tyr Gly Pro
            20                  25                  30

Pro Cys Pro Pro Cys Pro Ala Pro Glu Ala Ala Gly Gly Pro Ser Val
        35                  40                  45

Phe Leu Phe Pro Pro Lys Pro Lys Asp Gln Leu Met Ile Ser Arg Thr
    50                  55                  60

Pro Glu Val Thr Cys Val Val Asp Val Ser Gln Glu Asp Pro Glu
65                  70                  75                  80

Val Gln Phe Asn Trp Tyr Val Asp Gly Val Glu Val His Asn Ala Lys
                85                  90                  95

Thr Lys Pro Arg Glu Glu Gln Phe Asn Ser Thr Tyr Arg Val Val Ser
            100                 105                 110

Val Leu Thr Val Leu His Gln Asp Trp Leu Asn Gly Lys Glu Tyr Lys
        115                 120                 125

Cys Lys Val Ser Asn Lys Gly Leu Pro Ser Ser Ile Glu Lys Thr Ile
    130                 135                 140

Ser Lys Ala Lys Gly Gln Pro Arg Glu Pro Gln Val Tyr Thr Leu Pro
145                 150                 155                 160

Pro Ser Gln Glu Glu Met Thr Lys Asn Gln Val Ser Leu Thr Cys Leu
                165                 170                 175

Val Lys Gly Phe Tyr Pro Ser Asp Ile Ala Val Glu Trp Glu Ser Asn
            180                 185                 190

Gly Gln Pro Glu Asn Asn Tyr Lys Thr Thr Pro Pro Val Leu Asp Ser
        195                 200                 205

Asp Gly Ser Phe Phe Leu Tyr Ser Arg Leu Thr Val Asp Lys Ser Arg
    210                 215                 220

Trp Gln Glu Gly Asn Val Phe Ser Cys Ser Val Leu His Glu Ala Leu
225                 230                 235                 240

His Asn His Tyr Thr Gln Lys Ser Leu Ser Leu Ser Leu Gly Gly Gly
                245                 250                 255

Gly Gly Ser Ala Pro Thr Ser Ser Ser Thr Lys Lys Thr Gln Leu Gln
            260                 265                 270

Leu Glu His Leu Leu Leu Asp Leu Gln Met Ile Leu Asn Gly Ile Asn
        275                 280                 285

Asn Tyr Lys Asn Pro Lys Leu Thr Ala Met Leu Thr Ala Lys Phe Tyr
    290                 295                 300

Met Pro Lys Lys Ala Thr Glu Leu Lys His Leu Gln Cys Leu Glu Glu
305                 310                 315                 320

Glu Leu Lys Pro Leu Glu Glu Val Leu Asn Leu Ala Gln Ser Lys Asn
                325                 330                 335

Phe His Leu Arg Pro Arg Asp Leu Ile Ser Asn Ile Asn Val Ile Val
            340                 345                 350

Leu Glu Leu Lys Gly Ser Glu Thr Thr Phe Met Cys Glu Tyr Ala Asp
        355                 360                 365

Glu Thr Ala Thr Ile Val Glu Phe Leu Asn Arg Trp Ile Thr Phe Cys
    370                 375                 380

Gln Ser Ile Ile Ser Thr Leu Thr
385                 390
```

<210> SEQ ID NO 45
<211> LENGTH: 1200

<212> TYPE: DNA
<213> ORGANISM: Artificial Sequence
<220> FEATURE:
<223> OTHER INFORMATION: nucleotides coding Fc-IL2v2

<400> SEQUENCE: 45

```
ggatccgcca ccatggatgc tatgctgaga ggcctgtgtt cgtgctgct gctgtgtggc      60
gctgtgttcg tgtctccatc tcacgccgct gagtctaagt acggccctcc ttgtcctcca     120
tgtcctgctc cagaagctgc tggcggaccc tctgtgttcc tgtttcctcc aaagcctaag    180
gaccagctca tgatctctcg gacccctgaa gtgacctgcg tggtggtgga tgtgtctcaa    240
gaggaccctg aggtgcagtt caattggtac gtggacggcg tggaagtgca aacgccaag    300
accaagccta gagggaaca gttcaactcc acctacagag tggtgtccgt gctgaccgtg    360
ctgcaccagg attggctgaa cggcaaagag tacaagtgca aggtgtccaa caagggcctg    420
ccttccagca tcgaaaagac catctccaag gctaagggcc agcctaggga accccaggtt    480
tacaccctgc ctccaagcca agaggaaatg accaagaacc aggtgtccct gacctgcctg    540
gtcaagggct ctaccccttc cgacattgcc gtggaatggg agtccaatgg ccagcctgag    600
aacaactaca agaccacacc tcctgtgctg gactccgacg gctccttctt tctgtactct    660
cgcctgaccg tggacaagtc taggtggcaa gagggcaacg tgttctcctg ctctgtgctg    720
cacgaggccc tgcacaatca ctacacccag aagtccctgt ctctgtctct ggcggaggc    780
ggaggatctg ctcctacctc cagctccacc aagaaaaccc agctccagtt ggagcatctg    840
ctgctggacc tccagatgat cctgaatggc atcaacaatt acaagaaccc caagctgacc    900
gccatgctga ccgctaagtt ctacatgccc aagaaggcca ccgagctgaa gcacctccag    960
tgcctggaag aggaactgaa gcccctggaa gaagtgctga atctggccca gtccaagaac   1020
ttccacctga ggcctaggga cctgatctcc aacatcaacg tgatcgtgct ggaactgaaa   1080
ggctccgaga caaccttcat gtgcgagtac gccgacgaga cagccaccat cgtggaattt   1140
ctgaaccggt ggatcacctt ctgccagtcc atcatctcca cactgacctg atgactcgag   1200
```

<210> SEQ ID NO 46
<211> LENGTH: 592
<212> TYPE: PRT
<213> ORGANISM: Artificial Sequence
<220> FEATURE:
<223> OTHER INFORMATION: CD80-Fc-IL2wt

<400> SEQUENCE: 46

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
    50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys

-continued

```
            115                 120                 125
Ser Thr Ser Gly Gly Phe Pro Glu Pro His Leu Ser Trp Leu Glu Asn
        130                 135                 140
Gly Glu Glu Leu Asn Ala Ile Asn Thr Thr Val Ser Gln Asp Pro Glu
145                 150                 155                 160
Thr Glu Leu Tyr Ala Val Ser Ser Lys Leu Asp Phe Asn Met Thr Thr
                165                 170                 175
Asn His Ser Phe Met Cys Leu Ile Lys Tyr Gly His Leu Arg Val Asn
            180                 185                 190
Gln Thr Phe Asn Trp Asn Thr Thr Lys Gln Glu His Phe Pro Asp Asn
        195                 200                 205
Gly Ser Gly Gly Gly Ser Gly Gly Gly Ser Gly Gly Gly Gly
        210                 215                 220
Ser Ala Glu Ser Lys Tyr Gly Pro Pro Cys Pro Pro Cys Pro Ala Pro
225                 230                 235                 240
Glu Ala Ala Gly Gly Pro Ser Val Phe Leu Phe Pro Pro Lys Pro Lys
                245                 250                 255
Asp Gln Leu Met Ile Ser Arg Thr Pro Glu Val Thr Cys Val Val Val
            260                 265                 270
Asp Val Ser Gln Glu Asp Pro Glu Val Gln Phe Asn Trp Tyr Val Asp
        275                 280                 285
Gly Val Glu Val His Asn Ala Lys Thr Lys Pro Arg Glu Glu Gln Phe
        290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Gly Leu
                325                 330                 335
Pro Ser Ser Ile Glu Lys Thr Ile Ser Lys Ala Lys Gly Gln Pro Arg
            340                 345                 350
Glu Pro Gln Val Tyr Thr Leu Pro Pro Ser Gln Glu Glu Met Thr Lys
        355                 360                 365
Asn Gln Val Ser Leu Thr Cys Leu Val Lys Gly Phe Tyr Pro Ser Asp
370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                405                 410                 415
Arg Leu Thr Val Asp Lys Ser Arg Trp Gln Glu Gly Asn Val Phe Ser
            420                 425                 430
Cys Ser Val Leu His Glu Ala Leu His Asn His Tyr Thr Gln Lys Ser
        435                 440                 445
Leu Ser Leu Ser Leu Gly Gly Gly Gly Ser Ala Pro Thr Ser Ser
        450                 455                 460
Ser Thr Lys Lys Thr Gln Leu Gln Leu Glu His Leu Leu Leu Asp Leu
465                 470                 475                 480
Gln Met Ile Leu Asn Gly Ile Asn Asn Tyr Lys Asn Pro Lys Leu Thr
                485                 490                 495
Arg Met Leu Thr Phe Lys Phe Tyr Met Pro Lys Lys Ala Thr Glu Leu
            500                 505                 510
Lys His Leu Gln Cys Leu Glu Glu Glu Leu Lys Pro Leu Glu Glu Val
        515                 520                 525
Leu Asn Leu Ala Gln Ser Lys Asn Phe His Leu Arg Pro Arg Asp Leu
        530                 535                 540
```

```
Ile Ser Asn Ile Asn Val Ile Val Leu Glu Leu Lys Gly Ser Glu Thr
545                 550                 555                 560

Thr Phe Met Cys Glu Tyr Ala Asp Glu Thr Ala Thr Ile Val Glu Phe
                565                 570                 575

Leu Asn Arg Trp Ile Thr Phe Cys Gln Ser Ile Ile Ser Thr Leu Thr
            580                 585                 590
```

MEDIUM COMPOSITION FOR CULTURING T CELLS AND METHOD FOR CULTURING T CELLS USING SAME

JOINT RESEARCH AGREEMENT

The claimed invention hereof was made as a result of activities undertaken within the scope of a joint research agreement between GI CELL, INC. and GI INNOVATION, INC. that was in effect prior to the date the invention was made.

CROSS-REFERENCE TO RELATED APPLICATIONS

This is a United States national phase under 35 USC § 371 of International Patent Application No. PCT/KR2020/016379 filed Nov. 19, 2020, which in turn claims priority under 35 USC § 119 of Korean Patent Application No. 10-2019-0149779 filed Nov. 20, 2019. The disclosures of all such applications are hereby incorporated herein by reference in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "633_SeqListing_ST25.txt" created on May 8, 2022 and is 123,224 bytes in size. The sequence listing contained in this .txt file is part of the specification and is hereby incorporated by reference herein in its entirety.

TECHNICAL FIELD

The present disclosure relates to a culture medium for T cell composition including a fusion protein comprising a CD80 protein and IL-2 wild-type or a variant thereof, and a T cell culture method using the same.

BACKGROUND ART

Novartis' Kymriah (INN: Tisagenlecleucel, product code: CTL019), which recently granted approval for sale by the U.S. Food and Drug Administration (FDA) and the European Medicines Agency (EMA), is a gene therapeutic agent composed of genetically modified autologous T cells (U.S. Pat. No. 9,499,629). The product is produced from the patient's own T cells, which are transduced with a lentiviral vector encoding a chimeric antigen receptor (CAR) for human CD19. The T cells act antigen-dependently and specifically target and destroy CD19 positive B cells in a major histocompatibility complex (MHC)-independent manner.

A preparation process of Kymriah is as follows. T cells are proliferated through two different processes, and the proliferated T cells are stimulated by a magnetic bead bound with CD3 and CD28 antibodies, and then transduced with a CTL019 HIV-1 vector. Then, autologous T cells expressing a CAR are proliferated through culture for a period of time, and then subjected to a washing process to remove impurities such as the bead bound with CD3/CD28. However, it was recently confirmed that DYNABEADS®, a CD3/CD28 antibodies-bound magnetic bead used for T cell proliferation and activation in a preparation process of Kymriah, has the potential to cause acute toxicity.

In addition, replication-competent lentivirus (RCL) in a medicinal product is known to be infectious and may be transmitted from person to person by contact. After administrating Kymriah to a patient at risk of transmitting a new lentivirus through donation of blood, organs, tissues, or cells for transfusion or transplantation, RCL may be formed by transfer of a vector due to complementarity between provirus and host genome sequences. Therefore, there is also the possibility of generating a new HIV virus in a patient who were previously HIV positive. As such, it was thought that theoretically a potential side effect on the environment is serious because a new replication-competent lentivirus can transmit and spread into the human population.

Accordingly, there is an increasing need for a new autologous T cell therapeutic agent without such side effects.

DETAILED DESCRIPTION OF THE INVENTION

Technical Problem

The present inventors intensively tried to increase proliferation and activity of T cells without using a CD3/CD28 antibody-bound magnetic bead, and as a result, found out that proliferation and activity of T cells was increased by culturing peripheral blood mononuclear cells in a cell culture medium, in the presence of a fusion protein comprising a CD80 protein and IL-2 wild-type or a variant thereof, and have completed the present invention.

Solution to Problem

To achieve the above purpose, in accordance with an exemplary embodiment, provided is a composition or medium for culturing T cells including, as an active ingredient, a fusion protein dimer comprising an IL-2 protein or a variant thereof and a CD80 protein or a fragment thereof.

In accordance with another exemplary embodiment, provided is a T cell culture method using a fusion protein dimer comprising an IL-2 protein or a variant thereof and a CD80 protein or a fragment thereof.

In accordance with yet another exemplary embodiment, provided is a pharmaceutical composition including, as an active ingredient, T cells cultured in a medium including a fusion protein dimer comprising an IL-2 protein or a variant thereof and a CD80 protein or a fragment thereof.

Effect of the Invention

T cells cultured by a T cell culture medium composition for culturing T cell and a T cell culture method using the same for culturing T cell according to the present invention increase proliferation and activity of T cells without using a CD3/CD28 antibodies-bound magnetic bead. Therefore, T cells may be prepared more safely because impurities such as magnetic beads are not generated. In addition, patient's own peripheral blood mononuclear cells are cultured to proliferate T cells so that there is no fear of human side effects, and thus will be widely used as a new T cell therapeutic agent.

BRIEF DESCRIPTION OF DRAWINGS

Exemplary embodiments can be understood in more detail from the following description taken in conjunction with the accompanying drawings, in which.

BEST MODE FOR CARRYING OUT THE INVENTION

Figure 1:
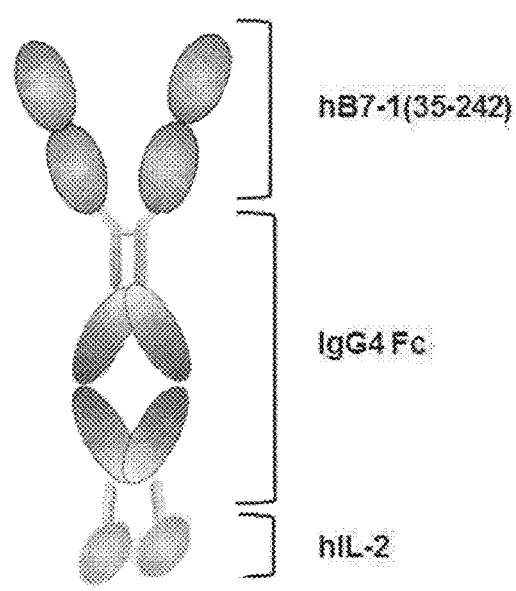
FIG. 1 is a schematic diagram of a preparation example of a fusion protein used in the present invention.

A Composition and a Medium for Proliferating T Cells

An aspect of the present invention provides a composition for proliferating a T cell including a fusion protein dimer comprising an IL-2 protein or a variant thereof and a CD80 protein or a fragment thereof. In addition, a culture medium for proliferating a T cell including the fusion protein dimer as an active ingredient is provided.

The T cell proliferation medium may be a medium in which the fusion protein dimer comprising an IL-2 protein or a variant thereof and a CD80 protein or a fragment thereof are added to a T cell culture medium. In this case, the cell culture medium may include any one selected from the group consisting of amino acids, sugars, inorganic salts, and vitamins. Preferably, the T cell culture medium may include an amino acid, a sugar, an inorganic salt, and a vitamin. In addition, the medium may further include fetal bovine serum (FBS), hydroxyethyl piperazine ethane sulfonic acid (HEPES), proteins, carbohydrates, mercaptoethanol, or growth factors.

As used herein, the term "cell culture medium" means a medium used for culturing cells, specifically T cells, and more specifically means a medium for culturing CD8+ cells. This includes components required by cells for cell growth and survival in vitro, or includes components that help cell growth and survival. Specifically, the components may be vitamins, essential or non-essential amino acids, and trace elements.

The cell culture medium according to the present invention is composed of amino acid components, vitamin components, inorganic salt components, other components, and purified water, wherein:

a) the amino acid component is at least one amino acid selected from the group consisting of glycine, L-alanine, L-valine, L-leucine, L-isoleucine, L-threonine, L-serine, L-cysteine, L-methionine, L-aspartic acid, L-asparagine, L-glutamic acid, L-glutamine, L-lysine, L-arginine, L-histidine, L-phenylalanine, L-tyrosine, L-tryptophan, L-proline, β-alanine, γ-aminobutyric acid, ornithine, citrulline, homoserine, triiodothyronine, thyroxine and dioxyphenylalanine, or a combination thereof, and preferably at least one amino acid selected from the group consisting of glycine, L-alanine, L-arginine, L-cysteine, L-glutamine, L-histidine, L-lysine, L-methionine, L-proline, L-serine, L-threonine and L-valine, or a combination thereof;

b) the vitamin component is at least one vitamin selected from the group consisting of biotin, calcium D-pantothenate, folic acid, niacinamide, pyridoxine hydrochloride, riboflavin, thiamine hydrochloride, vitamin B12, choline chloride, i-inositol and ascorbic acid, or a combination thereof, and preferably at least one vitamin selected from the group consisting of i-inositol, thiamine hydrochloride, niacinamide and pyridoxine hydrochloride, or a combination thereof;

c) the inorganic salt component is at least one inorganic salt selected from the group consisting of calcium chloride (CaCl$_2$))(anhydrous), copper sulfate pentahydrate (CuSO$_4$-5H$_2$O), iron (II) sulfate heptahydrate (FeSO$_4$-7H$_2$O), magnesium chloride (anhydrous), magnesium sulfate (MgSO$_4$)(anhydrous), potassium chloride (KCl), sodium chloride (NaCl), disodium hydrogen phosphate (Na$_2$HPO$_4$), sodium dihydrogen phosphate monohydrate (NaH$_2$PO$_4$—H$_2$O), zinc sulfate heptahydrate (ZnSO$_4$-7H$_2$O), iron(III) nitrate nonahydrate (Fe(NO$_3$)$_3$·9H$_2$O), and sodium hydrogen carbonate (NaHCO$_3$), or a combination thereof, and preferably at least one inorganic salt selected from the group consisting of sodium chloride (NaCl), sodium hydrogen carbonate (NaHCO$_3$), potassium chloride (KCl), calcium chloride (CaCl$_2$))(anhydrous) and sodium dihydrogen phosphate monohydrate (NaH$_2$PO$_4$—H$_2$O), or a combination thereof;

d) the other component is at least one other component selected from the group consisting of D-glucose (dextrose), sodium pyruvate, hypoxanthine Na, thymidine, linoleic acid, lipoic acid, adenosine, cytidine, guanosine, uridine, 2'-deoxyadenosine, 2'-deoxycytidine HCl and 2'-deoxyguanosine, or a combination thereof, and it may preferably be sodium pyruvate; and e) the purified water is used to dissolve the amino acids, vitamins, inorganic salts, and other components, and may be obtained by one or more processes of distillation, or purified through a filter.

In addition, the cell culture medium according to the present invention may further include growth factors or cytokines. The growth factor may be IGF, bFGF, TGF, HGF, EGF, VEGF, PDGF, or the like alone or at least two thereof, but is not limited thereto. The cytokine may be IL-1, IL-4, IL-6, IFN-γ, IL-10 or IL-17, or the like alone or at least two thereof, but is not limited thereto.

As used herein, the term "T cell" refers to one of lymphocytes responsible for antigen-specific adaptive immunity. T cells are classified into naive T cells that have not yet met an antigen, mature T cells that have met an antigen and memory T cells. At this time, the mature effector T cells include helper T cells, cytotoxic T cells, and natural killer T cells. Preferably, the T cells may be CD8+ T cells.

As used herein, the term "helper T cell or Th cell" refers to a cell that promotes humoral immunity by regulating differentiation and activation of other white blood cells. It is also called a CD4+ T cell because it has a CD4 protein on the cell surface. Helper T cells may be further classified into Th1, Th2, Th17, and Treg cells according to their detailed functions. Th1 cells secrete interferon-gamma (IFN-γ) and tumor necrosis factor beta (TNF-β), thereby inducing endosomes and lysosomes to fuse to form endolysosomes in macrophages. Meanwhile, Th2 cells secrete several types of interleukin (IL), allowing B cells to differentiate into plasma cells. Th17 cells secrete interleukin-17 (IL-17) to recruit neutrophils.

As used herein, the term "regulatory T cell (Treg)" includes natural regulatory T cells (nTreg) or induced regulatory T cells (iTreg). The regulatory T cells herein include CD4+CD25+ T cells, CD4+CD25+CD127low/− T cells, or CD4+CD25+Foxp3+ T cells. The regulatory T cells maintain immune homeostasis and block an autoimmune response, and the like by inhibiting an immune response.

As used herein, the term "cytotoxic T cell" refers to a cell that kills virus-infected cells or tumor cells, or the like by secreting cytotoxic substances such as granzyme or perforin. It is also called a CD8 T cell because it has a CD8 protein on the cell surface. In contrast to helper T cells, it eliminates virus and cancer cells by mediating cellular immunity.

As used herein, the term "natural killer T cell" refers to one of effector T cells that is distributed in a small proportion as compared with helper T cells and cytotoxic T cells. Natural killer T cells have the same T cell receptors (TCR) on the cell surface as T cells, but also have natural killer cell-specific molecules such as NK1.1. Natural killer T cells secrete gamma interferon, interleukin-4, or the like to regulate an immune response.

As used herein, the term "memory T cell" refers to a T cell that has potential ability as the T cell has recognized an antigen and survived long-time following differentiation and selection processes, and later when the antigen re-invades, is quickly activated to function as an effector T cell. The activated naïve T cells contacted with an antigen or the effector T cells influenced by interleukin-7 and interleukin-15 differentiate into long-term viable memory T cells.

In this case, a fusion protein dimer comprising an IL-2 protein or a variant thereof and a CD80 protein or a fragment thereof may be included in the culture medium in an amount of 1 nM to 2,000 nM. In addition, the dimer may be included in an amount of 1 nM to 1,000 nM or 1 nM to 500 nM. Further, the dimer may be included in an amount of 2 nM to 300 nM, 5 nM to 100 nM, 10 nM to 80 nM, 20 nM to 70 nM, or 40 nM to 50 nM. Specifically, the fusion protein dimer may be included in the medium in an amount of 1 nM, 3.2 nM, 10 nM, or 50 nM.

A Fusion Protein Dimer Comprising an IL-2 Protein or a Variant Thereof and a CD80 Protein or a Fragment Thereof As used herein, the term "IL-2" or "interleukin-2", unless otherwise stated, refers to any wild-type IL-2 obtained from any vertebrate source, including mammals, for example, primates (such as humans) and rodents (such as mice and rats). IL-2 may be obtained from animal cells, and also includes one obtained from recombinant cells capable of producing IL-2. In addition, IL-2 may be wild-type IL-2 or a variant thereof.

In the present specification, IL-2 or a variant thereof may be collectively expressed by the term "IL-2 protein" or "IL-2 polypeptide." IL-2, an IL-2 protein, an IL-2 polypeptide, and an IL-2 variant specifically bind to, for example, an IL-2 receptor. This specific binding may be identified by methods known to those skilled in the art.

An embodiment of IL-2 may have the amino acid sequence of SEQ ID NO: 35 or SEQ ID NO: 36. Here, IL-2 may also be in a mature form. Specifically, the mature IL-2 may not comprise a signal sequence, and may have the amino acid sequence of SEQ ID NO: 10. Here, IL-2 may be used under a concept encompassing a fragment of wild-type IL-2 in which a portion of N-terminus or C-terminus of the wild-type IL-2 is truncated.

In addition, the fragment of IL-2 may be in a form in which 1, 2, 3, 4, 5, 6, 7, 8, 9, 10, 11, 12, 13, 14, 15, 16, 17, 18, 19, 20, 21, 22, 23, 24, or 25 continuous amino acids are truncated from N-terminus of a protein having the amino acid sequence of SEQ ID NO: 35 or SEQ ID NO: 36. In addition, the fragment of IL-2 may be in a form in which 1, 2, 3, 4, 5, 6, 7, 8, 9, 10, 11, 12, 13, 14, 15, 16, 17, 18, 19, 20, 21, 22, 23, 24, or 25 continuous amino acids are truncated from C-terminus of a protein having the amino acid sequence of SEQ ID NO: 35 or SEQ ID NO: 36.

As used herein, the term "IL-2 variant" refers to a form in which a portion of amino acids in the full-length IL-2 or the above-described fragment of IL-2 is substituted. That is, an IL-2 variant may have an amino acid sequence different from wild-type IL-2 or a fragment thereof. However, an IL-2 variant may have activity equivalent or similar to the wild-type IL-2. Here, "IL-2 activity" may, for example, refer to specific binding to an IL-2 receptor, which specific binding can be measured by methods known to those skilled in the art.

Specifically, an IL-2 variant may be obtained by substitution of a portion of amino acids in the wild-type IL-2. An embodiment of the IL-2 variant obtained by amino acid substitution may be obtained by substitution of at least one of the $38^{th}$, $42^{nd}$, $45^{th}$, $61^{st}$, and $72^{nd}$ amino acids in the amino acid sequence of SEQ ID NO: 10.

Specifically, the IL-2 variant may be obtained by substitution of at least one of the $38^{th}$, $42^{nd}$, $45^{th}$, $61^{st}$, or $72^{nd}$ amino acid in the amino acid sequence of SEQ ID NO: 10 with another amino acid. In addition, when IL-2 is in a form in which a portion of N-terminus in the amino acid sequence of SEQ ID NO: 35 is truncated, the amino acid at a position complementarily corresponding to that in the amino acid sequence of SEQ ID NO: 10 may be substituted with another amino acid. For example, when IL-2 has the amino acid sequence of SEQ ID NO: 35, its IL-2 variant may be obtained by substitution of at least one of $58^{th}$, $62^{nd}$, $65^{th}$, $81^{st}$, or $92^{nd}$ amino acid in the amino acid sequence of SEQ ID NO: 35 with another amino acid. These amino acid residues correspond to the $38^{th}$, $42^{nd}$, $45^{th}$, $61^{st}$, and $72^{nd}$ amino acid residues in the amino acid sequence of SEQ ID NO: 10, respectively. According to an embodiment, one, two, three, four, five, six, seven, eight, nine, or ten amino acids may be substituted as long as such IL-2 variant maintains IL-2 activity. According to another embodiment, one to five amino acids may be substituted.

In an embodiment, an IL-2 variant may be in a form in which two amino acids are substituted. Specifically, the IL-2 variant may be obtained by substitution of the $38^{th}$ and $42^{nd}$ amino acids in the amino acid sequence of SEQ ID NO: 10. In addition, in an embodiment, the IL-2 variant may be obtained by substitution of the $38^{th}$ and $45^{th}$ amino acids in the amino acid sequence of SEQ ID NO: 10. In addition, in an embodiment, the IL-2 variant may be obtained by substitution of the $38^{th}$ and $61^{st}$ amino acids in the amino acid sequence of SEQ ID NO: 10. In addition, in an embodiment, the IL-2 variant may be obtained by substitution of the $38^{th}$ and $72^{nd}$ amino acids in the amino acid sequence of SEQ ID NO: 10. In addition, in an embodiment, the IL-2 variant may be obtained by substitution of the $42^{nd}$ and $45^{th}$ amino acids in the amino acid sequence of SEQ ID NO: 10. In addition, in an embodiment, the IL-2 variant may be obtained by substitution of the $42^{nd}$ and $61^{st}$ amino acids in the amino acid sequence of SEQ ID NO: 10. In addition, in an embodiment, the IL-2 variant may be obtained by substitution of the $42^{nd}$ and $72^{nd}$ amino acids in the amino acid sequence of SEQ ID NO: 10. In addition, in an embodiment, the IL-2 variant may be obtained by substitution of the $45^{th}$ and $61^{st}$ amino acids in the amino acid sequence of SEQ ID NO: 10. In addition, in an embodiment, the IL-2 variant may be obtained by substitution of the $45^{th}$ and $72^{nd}$ amino acids in the amino acid sequence of SEQ ID NO: 10. In addition, in an embodiment, the IL-2 variant may be obtained by substitution of the $61^{st}$ and $72^{nd}$ amino acids in the amino acid sequence of SEQ ID NO: 10.

Furthermore, an IL-2 variant may be in a form in which three amino acids are substituted. Specifically, the IL-2 variant may be obtained by substitution of the $38^{th}$, $42^{nd}$, and $45^{th}$ amino acids in the amino acid sequence of SEQ ID NO: 10. In addition, in an embodiment, the IL-2 variant may be obtained by substitution of the $38^{th}$, $42^{nd}$, and $61^{st}$ amino acids in the amino acid sequence of SEQ ID NO: 10. In addition, in an embodiment, the IL-2 variant may be obtained by substitution of the $38^{th}$, $42^{nd}$, and $72^{nd}$ amino acids in the amino acid sequence of SEQ ID NO: 10. In addition, in an embodiment, the IL-2 variant may be obtained by substitution of the $38^{th}$, $45^{th}$, and $61^{st}$ amino acids in the amino acid sequence of SEQ ID NO: 10. In addition, in an embodiment, the IL-2 variant may be obtained by substitution of the $38^{th}$, $45^{th}$, and $72^{nd}$ amino acids in the amino acid sequence of SEQ ID NO: 10. In addition, in an embodiment, the IL-2 variant may be obtained by substitution of the $38^{th}$, $61^{th}$, and $72^{nd}$ amino acids in the amino acid sequence of SEQ ID NO: 10. In addition, in an embodiment, the IL-2 variant may be obtained by substitution of the $42^{nd}$, $45^{th}$, and $61^{st}$ amino acids in the amino acid sequence of SEQ ID NO: 10. In addition, in an embodiment, the IL-2 variant may be obtained by substitution of the $42^{nd}$, $45^{th}$, and $72^{nd}$ amino acids in the amino acid sequence of SEQ ID NO: 10. In addition, in an embodiment, the IL-2 variant may be obtained by substitution of the $45^{th}$, $61^{st}$, and $72^{nd}$ amino acids in the amino acid sequence of SEQ ID NO: 10.

In addition, an IL-2 variant may be in a form in which four amino acids are substituted. Specifically, the IL-2 variant may be obtained by substitution of the $38^{th}$, $42^{nd}$, $45^{th}$, and $61^{st}$ amino acids in the amino acid sequence of SEQ ID NO: 10. In addition, in an embodiment, the IL-2 variant may be obtained by substitution of the $38^{th}$, $42^{nd}$, $45^{th}$, and $72^{nd}$ amino acids in the amino acid sequence of SEQ ID NO: 10. In addition, in an embodiment, the IL-2 variant may be obtained by substitution of the $38^{th}$, $45^{th}$, $61^{st}$, and $72^{nd}$ amino acids in the amino acid sequence of SEQ ID NO: 10. In addition, in an embodiment, the IL-2 variant may be obtained by substitution of the $38^{th}$, $42^{nd}$ $61^{st}$ and $72^{nd}$ amino acids in the amino acid sequence of SEQ ID NO: 10. In addition, in an embodiment, the IL-2 variant may be obtained by substitution of $42^{nd}$, $45^{th}$, $61^{st}$, and $72^{nd}$ amino acids in the amino acid sequence of SEQ ID NO: 10.

Furthermore, an IL-2 variant may be in a form in which five amino acids are substituted. Specifically, the IL-2 variant may be obtained by substitution of each of the $38^{th}$, $42^{nd}$, $45^{th}$, $61^{st}$, and $72^{nd}$ amino acids in the amino acid sequence of SEQ ID NO: 10 with another amino acid.

Here, the "another amino acid" introduced by the substitution may be any one selected from the group consisting of alanine, arginine, asparagine, aspartic acid, cysteine, glutamic acid, glutamine, histidine, isoleucine, leucine, lysine, methionine, phenylalanine, proline, serine, threonine, tryptophan, tyrosine, and valine. However, regarding amino acid substitution for the IL-2 variant, in the amino acid sequence of SEQ ID NO: 10, the $38^{th}$ amino acid cannot be substituted with arginine, the $42^{nd}$ amino acid cannot be substituted with phenylalanine, the $45^{th}$ amino acid cannot be substituted with tyrosine, the $61^{st}$ amino acid cannot be substituted with glutamic acid, and the $72^{nd}$ amino acid cannot be substituted with leucine.

Regarding amino acid substitution for an IL-2 variant, in the amino acid sequence of SEQ ID NO: 10, the $38^{th}$ amino acid, arginine, may be substituted with an amino acid other than arginine. Preferably, regarding amino acid substitution for an IL-2 variant, in the amino acid sequence of SEQ ID NO: 10, the $38^{th}$ amino acid, arginine, may be substituted with alanine (R38A).

Regarding amino acid substitution for an IL-2 variant, in the amino acid sequence of SEQ ID NO: 10, the 42' amino acid, phenylalanine, may be substituted with an amino acid other than phenylalanine. Preferably, regarding amino acid substitution for an IL-2 variant, in the amino acid sequence of SEQ ID NO: 10, the 42 amino acid, phenylalanine, may be substituted with alanine (F42A).

Regarding amino acid substitution for an IL-2 variant, in the amino acid sequence of SEQ ID NO: 10, the 45$^{th}$ amino acid, tyrosine, may be substituted with an amino acid other than tyrosine. Preferably, regarding amino acid substitution for an IL-2 variant, in the amino acid sequence of SEQ ID NO: 10, the 45$^{th}$ amino acid, tyrosine, may be substituted with alanine (Y45A).

Regarding amino acid substitution for an IL-2 variant, in the amino acid sequence of SEQ ID NO: 10, the 61$^{st}$ amino acid, glutamic acid, may be substituted with an amino acid other than glutamic acid. Preferably, regarding amino acid substitution for an IL-2 variant, in the amino acid sequence of SEQ ID NO: 10, the 61$^{st}$ amino acid, glutamic acid, may be substituted with arginine (E61R).

Regarding amino acid substitution for an IL-2 variant, in the amino acid sequence of SEQ ID NO: 10, the 72$^{nd}$ amino acid, leucine, may be substituted with an amino acid other than leucine. Preferably, regarding amino acid substitution for an IL-2 variant, in the amino acid sequence of SEQ ID NO: 10, the 72$^{nd}$ amino acid, leucine, may be substituted with glycine (L72G).

Specifically, an IL-2 variant may be obtained by at least one substitution selected from the group consisting of R38A, F42A, Y45A, E61R, and L72G, in the amino acid sequence of SEQ ID NO: 10.

Specifically, an IL-2 variant may be obtained by amino acid substitutions at two, three, four, or five positions among the positions selected from the group consisting of R38A, F42A, Y45A, E61R, and L72G.

In addition, an IL-2 variant may be in a form in which two amino acids are substituted. Specifically, an IL-2 variant may be obtained by the substitutions, R38A and F42A. In addition, in an embodiment, an IL-2 variant may be obtained by the substitutions, R38A and Y45A. In addition, in an embodiment, an IL-2 variant may be obtained by the substitutions, R38A and E61R. In addition, in an embodiment, an IL-2 variant may be obtained by the substitutions, R38A and L72G. In addition, in an embodiment, an IL-2 variant may be obtained by the substitutions, F42A and Y45A. In addition, in an embodiment, an IL-2 variant may be obtained by the substitutions, F42A and E61R. In addition, in an embodiment, an IL-2 variant may be obtained by the substitutions, F42A and L72G. In addition, in an embodiment, an IL-2 variant may be obtained by the substitutions, E61R and L72G.

Furthermore, an IL-2 variant may be in a form in which three amino acids are substituted. Specifically, an IL-2 variant may be obtained by the substitutions, R38A, F42A, and Y45A. In addition, in an embodiment, an IL-2 variant may be obtained by the substitutions, R38A, F42A, and E61R. In addition, in an embodiment, an IL-2 variant may be obtained by the substitutions, R38A, F42A, and L72G. In addition, in an embodiment, an IL-2 variant may be obtained by the substitutions, R38A, Y45A, and E61R. In addition, in an embodiment, an IL-2 variant may be obtained by the substitutions, R38A, Y45A, and L72G. In addition, in an embodiment, an IL-2 variant may be obtained by the substitutions, F42A, Y45A, and E61R. In addition, in an embodiment, an IL-2 variant may be obtained by the substitutions, F42A, Y45A, and L72G. In addition, in an embodiment, an IL-2 variant may be obtained by the substitutions, F42A, E61R, and L72G. In addition, in an embodiment, an IL-2 variant may be obtained by the substitutions, Y45A, E61R, and L72G.

In addition, an IL-2 variant may be in a form in which four amino acids are substituted. Specifically, an IL-2 variant may be obtained by the substitutions, R38A, F42A, Y45A, and E61R. In addition, in an embodiment, an IL-2 variant may be obtained by the substitutions, R38A, F42A, Y45A, and L72G. In addition, in an embodiment, an IL-2 variant may be obtained by the substitutions, R38A, F42A, E61R, and L72G. In addition, in an embodiment, an IL-2 variant may be obtained by the substitutions, R38A, Y45A, E61R, and L72G. In addition, in an embodiment, an IL-2 variant may be obtained by the substitutions, F42A, Y45A, E61R, and L72G.

Furthermore, an IL-2 variant may be obtained by the substitutions, R38A, F42A, Y45A, E61R, and L72G.

Preferably, an embodiment of the IL-2 variant may comprise which are any one selected from the following substitution combinations (a) to (d) in the amino acid sequence of SEQ ID NO: 10:

(a) R38A/F42A
(b) R38A/F42A/Y45A
(c) R38A/F42A/E61R
(d) R38A/F42A/L72G

Here, when IL-2 has the amino acid sequence of SEQ ID NO: 35, an amino acid substitution may be present at a position complementarily corresponding to that in the amino acid sequence of SEQ ID NO: 10. In addition, even when IL-2 is a fragment of the amino acid sequence of SEQ ID NO: 35, an amino acid substitution may be present at a position complementarily corresponding to that in the amino acid sequence of SEQ ID NO: 10.

Specifically, an IL-2 variant may have the amino acid sequence of SEQ ID NO: 6, 22, 23, or 24.

In addition, an IL-2 variant may be characterized by having low in vivo toxicity. Here, the low in vivo toxicity may be a side effect caused by binding of IL-2 to the IL-2 receptor alpha chain (IL-2Rα). Various IL-2 variants have been developed to ameliorate the side effect caused by binding of IL-2 to IL-2Rα, and such IL-2 variants may be those disclosed in U.S. Pat. No. 5,229,109 and Korean Patent No. 1667096. In particular, IL-2 variants described in the present application have low binding affinity for the IL-2 receptor alpha chain (IL-2Rα) and thus have lower in vivo toxicity than the wild-type IL-2.

As used herein, the term "CD80", also called "B7-1", is a membrane protein present in dendritic cells, activated B cells, and monocytes. CD80 provides co-stimulatory signals essential for activation and survival of T cells. CD80 is known as a ligand for the two different proteins, CD28 and CTLA-4, present on the surface of T cells. CD80 consists of 288 amino acids, and may specifically have the amino acid sequence of SEQ ID NO: 11. In addition, as used herein, the term "CD80 protein" refers to the full-length CD80 or a CD80 fragment.

As used herein, the term "CD80 fragment" refers to a truncated form of CD80. In addition, the CD80 fragment may be an extracellular domain of CD80. An embodiment of the CD80 fragment may be obtained by deletion of the 1$^{st}$ to 34$^{th}$ amino acids from N-terminus which are a signal sequence of CD80. Specifically, an embodiment of the CD80 fragment may be a protein consisting of the 35$^{th}$ to 288$^{th}$ amino acids in SEQ ID NO: 11. In addition, an embodiment of the CD80 fragment may be a protein consisting of the 35$^{th}$ to 242$^{nd}$ amino acids in SEQ ID NO: 11. In addition, an embodiment of the CD80 fragment may be a protein consisting of the 35$^{th}$ to 232$^{nd}$ amino acids in SEQ ID NO: 11. In addition, an embodiment of the CD80 fragment may be a protein consisting of the 35$^{th}$ to 139$^{th}$ amino acids in SEQ ID NO: 11. In addition, an embodiment of the CD80 fragment may be a protein consisting of the 142$^{nd}$ to 242$^{nd}$ amino acids in SEQ ID NO: 11. In an embodiment, a CD80 fragment may have the amino acid sequence of SEQ ID NO: 2.

In addition, the IL-2 protein and the CD80 protein may be attached to each other via a linker or a carrier. Specifically, the IL-2 or a variant thereof and the CD80 (B7-1) or a fragment thereof may be attached to each other via a linker or a carrier. In the present description, the linker and the carrier may be used interchangeably.

The linker links two proteins. An embodiment of the linker may include 1 to 50 amino acids, albumin or a fragment thereof, an Fc domain of an immunoglobulin, or the like. Here, the Fc domain of immunoglobulin refers to a protein that comprises heavy chain constant region 2 (CH2) and heavy chain constant region 3 (CH3) of an immunoglobulin, and does not comprise heavy and light chain variable regions, and light chain constant region 1 (CH1) of an immunoglobulin. The immunoglobulin may be IgG, IgA, IgE, IgD, or IgM, and may preferably be IgG4. Here, Fc domain of wild-type immunoglobulin G4 may have the amino acid sequence of SEQ ID NO: 4.

In addition, the Fc domain of an immunoglobulin may be an Fc domain variant as well as wild-type Fc domain. In addition, as used herein, the term "Fc domain variant" may refer to a form which is different from the wild-type Fc domain in terms of glycosylation pattern, has a high glycosylation as compared with the wild-type Fc domain, has a low glycosylation as compared with the wild-type Fc domain, or has a deglycosylated form. In addition, an aglycosylated Fc domain is included therein. The Fc domain or a variant thereof may be adapted to have an adjusted number of sialic acids, fucosylations, or glycosylations, through culture conditions or genetic manipulation of a host.

In addition, glycosylation of the Fc domain of an immunoglobulin may be modified by conventional methods such as chemical methods, enzymatic methods, and genetic engineering methods using microorganisms. In addition, the Fc domain variant may be in a mixed form of respective Fc regions of immunoglobulins, IgG, IgA, IgE, IgD, and IgM. In addition, the Fc domain variant may be in a form in which some amino acids of the Fc domain are substituted with other amino acids. An embodiment of the Fc domain variant may have the amino acid sequence of SEQ ID NO: 12.

The fusion protein may have a structure in which, using an Fc domain as a linker (or carrier), a CD80 protein and an IL-2 protein, or an IL-2 protein and a CD80 protein are linked to N-terminus and C-terminus of the linker or carrier, respectively (FIG. 1). Linkage between N-terminus or C-terminus of the Fc domain and CD80 or IL-2 may optionally be achieved by a linker peptide.

Specifically, a fusion protein may consist of the following structural formula (I) or (II):

  (I)

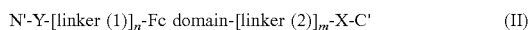  (II)

Here, in the structural formulas (I) and (II),
N' is the N-terminus of the fusion protein,
C' is the C-terminus of the fusion protein,
X is a CD80 protein,
Y is an IL-2 protein,
the linkers (1) and (2) are peptide linkers, and
n and m are each independently 0 or 1.

Preferably, the fusion protein may consist of the structural formula (I). The IL-2 protein is as described above. In addition, the CD80 protein is as described above. According to an embodiment, the IL-2 protein may be an IL-2 variant with one to five amino acid substitutions as compared with the wild-type IL-2. The CD80 protein may be a fragment obtained by truncation of up to about 34 continuous amino acid residues from the N-terminus or C-terminus of the wild-type CD80. Alternatively, the CD protein may be an extracellular immunoglobulin-like domain having the activity of binding to the T cell surface receptors CTLA-4 and CD28.

Specifically, the fusion protein may have the amino acid sequence of SEQ ID NO: 9, 26, 28, or 30. According to another embodiment, the fusion protein includes a polypeptide having a sequence identity of 85%, 86%, 87%, 88%, 89%, 90%, 91%, 92%, 93%, 94%, 95%, 96%, 97%, 98%, 99%, or 100% to the amino acid sequence of SEQ ID NO: 9, 26, 28, or 30. Here, the identity is, for example, percent homology, and may be determined by homology comparison software such as BlastN software of the National Center of Biotechnology Information (NCBI).

The peptide linker (1) may be included between the CD80 protein and the Fc domain. The peptide linker (1) may consist of 5 to 80 continuous amino acids, 20 to 60 continuous amino acids, 25 to 50 continuous amino acids, or 30 to 40 continuous amino acids. In an embodiment, the peptide linker (1) may consist of 30 amino acids. In addition, the peptide linker (1) may comprise at least one cysteine. Specifically, the peptide linker (1) may comprise one, two, or three cysteines. In addition, the peptide linker (1) may be derived from the hinge of an immunoglobulin. In an embodiment, the peptide linker (1) may be a peptide linker consisting of the amino acid sequence of SEQ ID NO: 3.

The peptide linker (2) may consist of 1 to 50 continuous amino acids, 3 to 30 continuous amino acids, or 5 to 15 continuous amino acids. In an embodiment, the peptide linker (2) may be (G4S)$_n$ (where n is an integer of 1 to 10). Here, in (G4S)$_n$, n may be 1, 2, 3, 4, 5, 6, 7, 8, 9, or 10. In an embodiment, the peptide linker (2) may be a peptide linker consisting of the amino acid sequence of SEQ ID NO: 5.

In another aspect of the present invention, there is provided a dimer obtained by binding of two fusion proteins, each of which includes an IL-2 protein and a CD80 protein. The fusion protein comprising IL-2 or a variant thereof and CD80 or a fragment thereof is as described above.

Here, the binding between the fusion proteins comprising the dimer may be achieved by, but is not limited to, a disulfide bond formed by cysteines present in the linker. The fusion proteins comprising the dimer may be the same or different fusion proteins from each other. Preferably, the dimer may be a homodimer. An embodiment of the fusion protein comprising the dimer may be a protein having the amino acid sequence of SEQ ID NO: 9.

T Cell Culture Method

In another aspect, the present invention relates to a culture method for culturing a T cell including culturing a cell in a medium composition for proliferation a T cell. In the present invention, the cells may be characterized by being peripheral blood mononuclear cells (PBMC). In addition, the cells may be CD8+ T cells or CD8+ T cells derived from PBMCs.

In the present invention, the culture medium composition for culturing T cell may be characterized by containing 0.1 nM to 1,000,000 nM of a fusion protein dimer, and more preferably, 1 nM to 1,000 nM or 1.6 nM to 100 nM of a fusion protein. Specifically, the fusion protein dimer may be included in the T cell culture medium in an amount of 1 nM, 1.6 nM, 2 nM, 5 nM, 10 nM, 20 nM, 30 nM or 50 nM.

In a specific embodiment of the present invention, PBMCs were cultured by using a cell culture medium composition including 1.6 nM of the fusion protein dimer comprising an IL-2 protein or a variant thereof and a CD80 protein or a fragment thereof, or 50 nM of the fusion protein dimer comprising an IL-2 protein or a variant thereof and a CD80 protein or fragment thereof. In addition, a cell culture medium composition including 1.6 nM of the fusion protein dimer comprising an IL-2 protein or a variant thereof and a CD80 protein or a fragment thereof was used when cultured CD8+ T cell.

In the present invention, the step of culturing the cells may be characterized in that it is performed for 7 to 21 days. More specifically, the step of culturing the cells may be performed for 9 to 15 days.

In a specific embodiment of the present invention, the step of culturing PBMCs was performed for 14 days. As used herein, the term "PBMC" is a peripheral blood mononuclear cell (PBMC) and includes T cells, B cells, NK cells, and monocytes.

As used herein, the term "CD4-PBMC" refers to a peripheral blood mononuclear cell that does not include immune cells expressing a cluster of differentiation 4 (CD4) glycoprotein, and preferably refers to a cell that does not include CD4+ helper T cells.

As used herein, the term "T cell" includes CD4+ or CD8+ T cells.

As used herein, the term "CD8+ T cell" includes cytotoxic T cells (CD8+) or memory T cells.

As used herein, the term "memory T cell" includes Effector Memory T cell, central memory T cell, Tissue-resident memory T cell, Peripheral memory T cell, or CD25+ memory T cell.

In an embodiment of the present invention, it was confirmed that T cells, which are cultured by a culture method including culturing in the medium composition including the fusion protein dimer comprising an IL-2 protein or a variant thereof and a CD80 protein or a fragment thereof, had significant increase in the number of cells and the amount of IFN-γ secreted in CD4+ or CD8+ T cells as compared with T cells cultured in a medium composition containing Fc-IL2v2, Fc-IL2v3, or rhIL-2.

Obtained T Cells and Use Thereof

Figure 45:
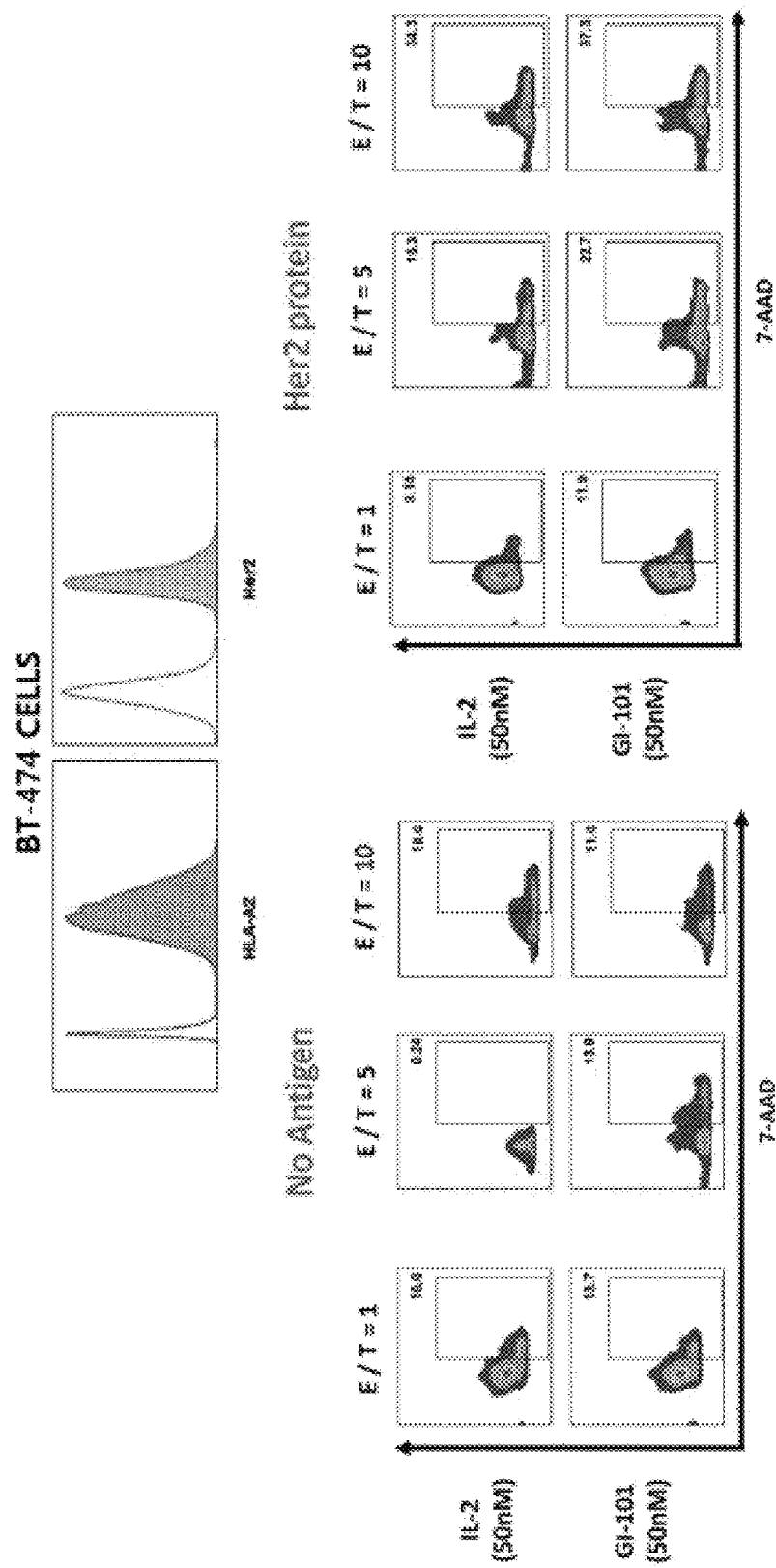
FIG. 45 shows the results of analyzing the killing effect of Her2 protein-recognizing T cells cultured in a culture composition that includes a basal culture medium in Table 1 and is treated with GI-101 additives according to the present invention on BT-474 (ATCC® HTB-20™) cancer cells.
Figure 46:
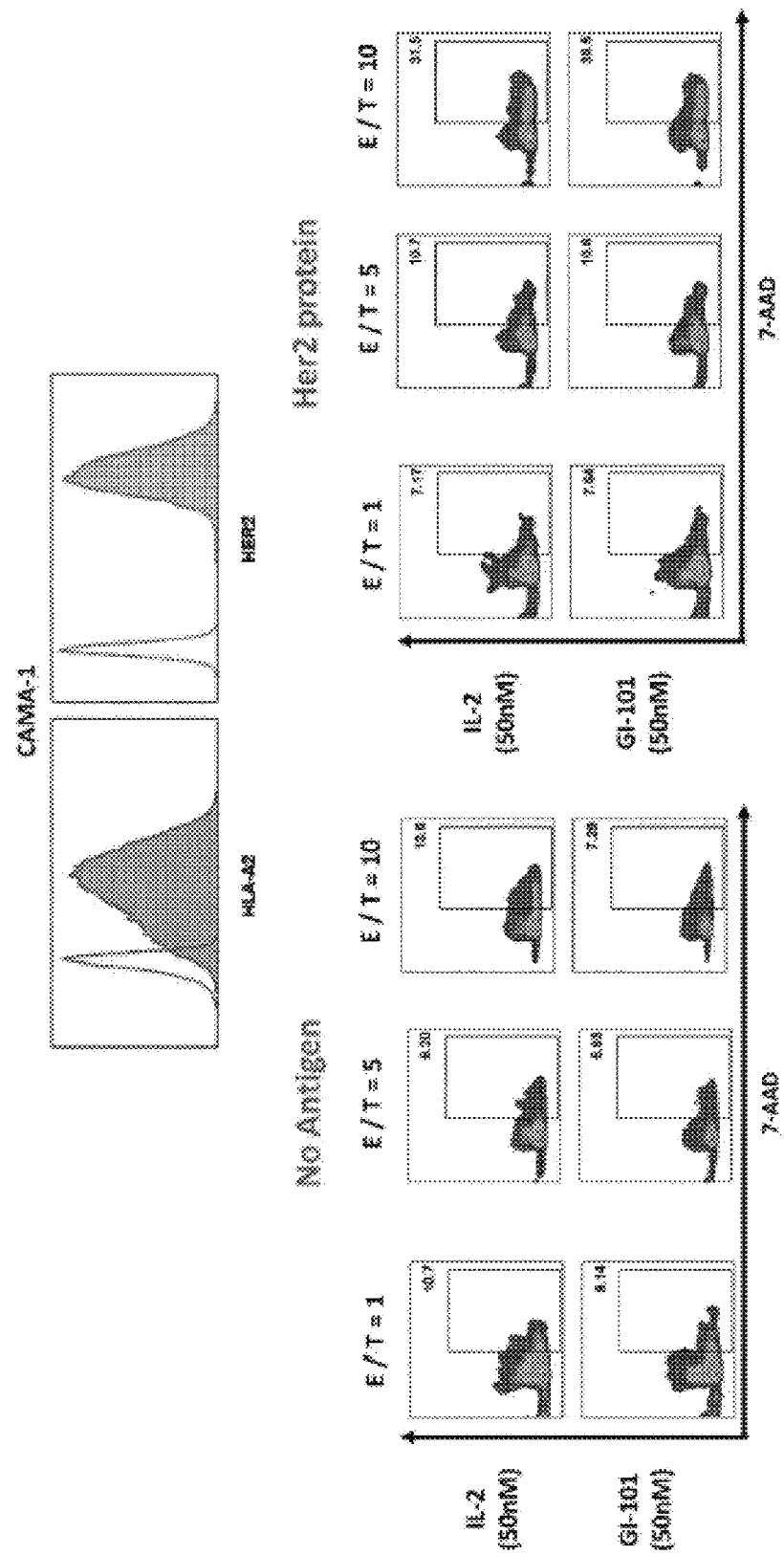
FIG. 46 shows the results of analyzing the killing effect of Her2 protein-recognizing T cells cultured in a culture composition that includes a basal culture medium in Table 1 and is treated with GI-101 additives according to the present invention on CAMA-1 (ATCC® HTB-21™) cancer cells.

Another aspect of the present invention provides T cells obtained by the culture method. At this time, it was confirmed that T cells obtained by the culture method, preferably CD8+ T cells increased in amount of granzyme B, IFN-γ, and perforin secretion as compared with CD8+ T cells obtained by other culture methods. Therefore, it was confirmed that cancer-killing capability of the CD8+ T cells was increased (FIGS. 45 and 46).

Yet another aspect of the present invention provides a pharmaceutical composition for treating cancer including T cells obtained by the above-described method as an active ingredient.

A dosage of the pharmaceutical composition may be adjusted according to various factors including kind of disease, severity of disease, kind and content of active ingredients and other ingredients included in a composition, kind of formulation, and age, weight, general health condition, gender, and diet of a patient, time of administration, route of administration, and secretion rate of a composition, duration of treatment, and simultaneously used drugs.

In addition, the pharmaceutical composition may be administered to an individual by various methods known in the art. The route of administration may be appropriately selected by a person skilled in the art in consideration of the method of administration, volume of body fluid, viscosity, or the like.

The cancer may be any one selected from the group consisting of gastric cancer, liver cancer, lung cancer, colorectal cancer, breast cancer, prostate cancer, ovarian cancer, pancreatic cancer, cervical cancer, thyroid cancer, larynx cancer, acute lymphoblastic leukemia, brain tumor, neuroblastoma, retinoblastoma, head and neck cancer, salivary cancer, and lymphoma.

The composition of the present invention may include a pharmaceutically acceptable carrier and/or an additive, or the like. For example, it may include sterile water, normal saline, a conventional buffer (e.g., phosphoric acid, citric acid, and other organic acid), a stabilizer, a salt, an antioxidant, a surfactant, a suspending agent, an isotonic agent or a preservative. Further, it may, but not be limited thereto, include an organic substance such as a biopolymer and an inorganic substance such as hydroxyapatite, specifically, a collagen matrix, a polylactic acid polymer or its copolymer, a polyethylene glycol polymer or its copolymer, a chemical derivative thereof, and a mixture thereof. Examples of the stabilizer may include dextran 40, methylcellulose, gelatin, sodium sulfite, sodium metasulfate, or the like. Examples of the antioxidant may include a chelating agent such as erythorbic acid, dibutylhydroxytoluene, butylhydroxyanisole, α-tocopherol, tocopheryl acetate, L-ascorbic acid and its salt, L-ascorbic acid palmitate, L-ascorbic acid stearate, sodium hydrogen sulfite, sodium sulfite, gallic acid triamyl, gallic acid propyl or ethylenediaminetetraacetic acid sodium (EDTA), sodium pyrophosphate, and sodium metaphosphate. Examples of the suspending agent may include methylcellulose, polysorbate 80, hydroxyethylcellulose, gum arabic, tragacanth gum, sodium carboxymethyl cellulose, and polyoxyethylene sorbitan monolaurate. Examples of the isotonic agent may include D-mannitol and sorbitol. Examples of the preservative may include methyl paraoxy benzoate, ethyl paraoxy benzoate, sorbic acid, phenol, cresol, chloro-cresol, or the like.

Treatment Method Using the Obtained T Cells

Another aspect of the present invention provides a method for treating cancer including administering the T cells to an individual having cancer. In this case, cancer is as described above.

Yet another aspect of the present invention provides use of the T cells to treat cancer.

T Cell Activation Composition

Another aspect of the present invention provides a composition for enhancing antigen recognition efficiency of T cells including, as an active ingredient, a fusion protein dimer comprising an IL-2 protein or a variant thereof and a CD80 protein or a fragment thereof.

Yet another aspect of the present invention provides a composition for enhancing cancer-killing ability of T cell including, as an active ingredient, a fusion protein dimer comprising an IL-2 protein, or a variant thereof and a CD80 protein or a fragment thereof.

The fusion protein dimer comprising an IL-2 protein or a variant thereof and a CD80 protein or a fragment thereof is same as described above. A composition including the fusion protein dimer synergistically induces T cell activity, thereby enhancing recognition efficiency of T cell against heterologous antigens, and ultimately, effectively enhances cell-killing capability against target cells, cancer cells, and thus may be applied to anticancer immunotherapy.

T Cell Activation Method Using Cancer Antigens

Another aspect of the present invention provides a method for ex vivo activation and proliferation of CD8+ T cells, including simultaneously culturing peripheral blood mononuclear cells (PBMC) or T cells, and cancer antigens in a medium containing a fusion protein dimer comprising an IL-2 protein or a variant thereof and a CD80 protein or a fragment thereof. At this time, the T cells may be CD8+ T cells, as described above.

As used herein, the term "cancer antigen" refers to a cancer cell-specific protein presented on the surface of cancer cells or secreted into blood by cancer cells. These cancer antigens have been used in diagnosis of specific cancer or anticancer vaccines for anticancer therapy. Such cancer antigen includes PSCA (prostate stem cell antigen), HER-2 (human epidermal growth factor receptor 2), MUC1 (mucin 1), CA15-3 (cancer antigen 15-3), CA19-9 (cancer antigen 19-9), CA27-29 (cancer antigen 27-29), CA125 (cancer antigen 125), CA195 (cancer antigen 195), PSA (prostate-specific antigen), CA549 (cancer antigen 549), CEA (carcinoembryonic antigen), ACTH (adrenocorticotropic hormone), AFP (alpha-fetoprotein), bcl-2 (B-cell lymphoma 2), β-2 microglobulin, calcitonin, cathepsin D, chromogranin-A, EFGR (epidermal growth factor receptor), gastrin, human chorionic gonadotropin (hCG), α-hCG (α-subunit of hCG), β-hCG (β-subunit of hCG), LDH (lactic dehydrogenase), NSE (neuron specific enolase), pancreatic polypeptide, proinsulin C-peptide, thyroglobulin, TDT (terminal deoxynucleotidal transferase), TPA (tissue polypeptide antigen), keratin19 (KRT19), ETA (epithelial tumor antigen), tyrosinase, MAGEA1 (melanoma-associated antigen family member A1), MAGEA2 (melanoma-associated antigen family member A2), MAGEA3 (melanoma-associated antigen family member A3), MAGEA4 (melanoma-associated antigen family member A4), MAGEA6 (melanoma-associated antigen family member A6), MAGEA9 (melanoma-associated antigen family member A9), MAGEA10 (melanoma-associated antigen family member A10), MAGEA11 (melanoma-associated antigen family member A11), MAGEA12 (melanoma-associated antigen family member A12), MAGEC1 (melanoma-associated antigen family member C1), MAGEC2 (melanoma-associated antigen family member C2), TRP-2 (tyrosinase related protein 2), EpCAM (epithelial cell adhesion molecule), GPC3 (glypican 3), MSLN (mesothelin), BTA (bladder tumor antigen), ROR1 (Receptor Tyrosine Kinase Like Orphan Receptor 1), cytokeratin fragment 21-1 (CYFRA21-1), CTAG2 (cancer/testis antigen 2), BAGE (B melanoma antigen), LRPAP1 (LDL receptor related protein associated protein 1), LY6K (lymphocyte antigen 6 family member K), SAGE1 (sarcoma antigen 1), SPA17 (sperm surface protein 17), SSX-2 (SSX family member 2), SSX-4 (SSX family member 4), ALDH1A1 (aldehyde dehydrogenase 1 family member A1), CSAG2 (chondrosarcoma-associated gene family member 2), XAGE1B (X antigen family member 1B), CALCA (Calcitonin gene-related peptide 1), CD274 (Programmed cell death 1 ligand 1), CD45 (Receptor-type tyrosine-protein phosphatase C), CPSF1 (Cleavage and polyadenylation specificity factor subunit 1), DKK1 (Dickkopf-related protein 1), ENAH (Protein enabled homolog), EPHA3 (Ephrin type-A receptor 3), EZH2 (Histone-lysine N-methyltransferase EZH2), FGF (fibroblast growth factor), HEPACAM (Hepatocyte cell adhesion molecule), HPN(Serine protease hepsin), IDO1 (indoleamine 2), IMP3 (U3 small nucleolar ribonucleoprotein 3), IL13RA2 (interleukin 13 receptor subunit alpha 2), CES2 (carboxylesterase 2), KLK4 (Kallikrein-4), KIF20A (Kinesin-like protein KIF20A), LGSN (lengsin), CSF1 (Macrophage colony-stimulating factor 1), CSPG4 (chondroitin sulfate proteoglycan 4), MDK (midkine), MMP-2 (matrix metallopeptidase 2), MMP-7 (matrix metallopeptidase 7), MUC5AC (mucin 5AC), MART1 (melanoma antigen recognized by T-cells 1), BCL2L1 (Bcl-2-like protein 1), Nectin-4, PLIN2 (perilipin 2), PAX5 (paired box 5), PLAC1 (Placenta-specific protein 1), ZNF395 (zinc finger protein 395), PRAME (Melanoma antigen preferentially expressed in tumors), FOLH1 (folate hydrolase 1), RGS5 (Regulator of G protein signaling 5), RNF43 (RING finger protein 43), DCDC2 (Doublecortin domain-containing protein 2), SCRN1 (Secernin-1), SOX10 (Transcription factor SOX-10), SCGB2A2 (secretoglobin family 2A member 2), Mammaglobin-A, BIRC5 (Survivin; baculoviral IAP repeat containing 5), Surivin, NYESO1 (New York Esophageal Squamous Cell Carcinoma-1), TROP2 (Trophoblast cell surface antigen 2), TERT (telomerase reverse transcriptase), TPBG (trophoblast glycoprotein), VEGF (vascular endothelia growth factor), WT1 (Wilms tumor protein 1), WDR46 (WD repeat-containing protein 46), PMEL (premelanosome protein), ANKRD30A (ankyrin repeat domain 30A), GPR143 (G protein-coupled receptor 143), ACP3 (Prostatic acid phosphatase), RAB38 (Ras-related protein Rab-38), α-TSH (alpha subunit thyroid stimulating hormone), c-Met (tyrosine-protein kinase Met), CD133, KK-LC-1 (Kita-Kyushu lung cancer antigen-1), CD70, GPNMB (Glycoprotein Nmb), MUC16 (Mucin 16), or the like. Besides, various mutant proteins including specific mutants of tumor suppress genes such as p53 (phosphoprotein 53) may be used as a cancer antigen.

MODE FOR CARRYING OUT THE INVENTION

Hereinafter, the present invention will be described in more detail by way of the following examples. However, the following examples are only for illustrating the present invention, and the scope of the present invention is not limited thereto.

Preparatory Example 1. Preparation of a hCD80-Fc-IL-2 Variant (2M): GI-101

In order to produce a fusion protein comprising a human CD80 fragment, a Fc domain, and an IL-2 variant, a polynucleotide including a nucleotide sequence (SEQ ID NO: 8) encoding a fusion protein comprising a signal peptide (SEQ ID NO: 1), a CD80 fragment (SEQ ID NO: 2), a linker-bound Ig hinge (SEQ ID NO: 3), a Fc domain (SEQ ID NO: 4), a linker (SEQ ID NO: 5), and an IL-2 variant (2M) in which two amino acids are substituted (R38A, F42A) (SEQ ID NO: 6) in this order from N-terminus was synthesized through Invitrogen GeneArt Gene Synthesis service of ThermoFisher Scientific Inc., and cloned into a pcDNA3_4 vector. In addition, the vector was introduced into CHO cells (EXPI-CHO™) to express a fusion protein of SEQ ID NO: 9. After introducing the vector, the culture solution was cultured in an environment of 37° C., 125 RPM, and 8% $CO_2$ for 7 days, and then collected to purify a fusion protein. The purified fusion protein dimer was named as "GI-101."

Purification was performed using chromatography including Mab Select SuRe protein A resin. The fusion protein was bound under the condition of 25 mM Tris, 25 mM NaCl, and pH 7.4. Then, it was eluted with 100 mM NaCl and 100 mM acetic acid at pH 3. After putting 20% of 1M Tris-HCl at pH 9 into the collection tube, the fusion protein was collected. The collected fusion protein was dialyzed into PBS buffer for 16 hours to change.

Figure 2:
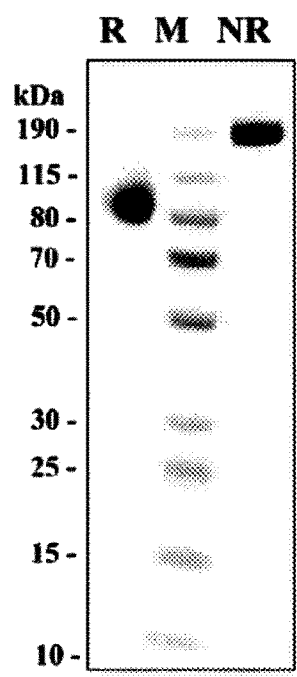
FIG. 2 shows the obtained fusion protein (GI-101) confirmed by SDS-PAGE.
Figure 3:
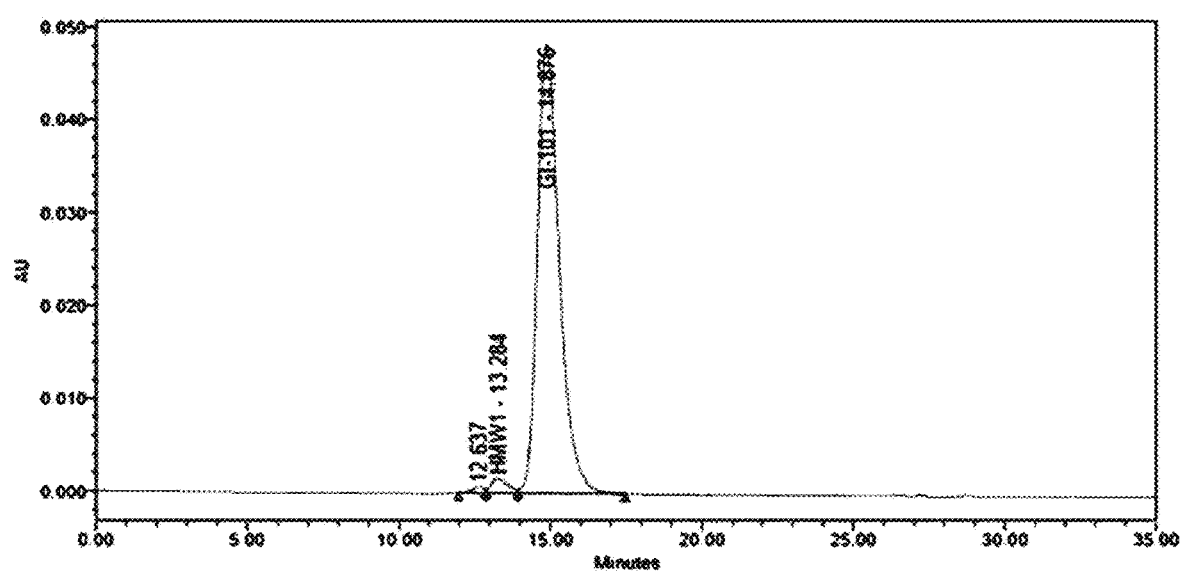
FIG. 3 shows the obtained fusion protein (GI-101) confirmed by size exclusion chromatography (SEC)

Then, absorbance at a wavelength of 280 nm over time was measured by using size exclusion chromatography with TSKgel G3000SWXL column (TOSOH Bioscience) to obtain a high concentration of fusion protein. At this time, the isolated and purified fusion protein was subjected to SDS-PAGE under the reducing (R) or non-reducing (NR) conditions, and stained with coomassie blue to confirm its purity (FIG. 2). It was confirmed that the fusion protein was included at a concentration of 2.78 mg/ml as detected using NanoDrop. Also, the result analyzed using size exclusion chromatography is as shown in FIG. 3.

Preparatory Example 2. Preparation of a Fc-IL-2 Variant (2M) Dimer: Fc-IL-2v2

In order to produce a fusion protein comprising a Fc domain and an IL-2 variant, a polynucleotide including a nucleotide sequence (SEQ ID NO: 45) encoding a fusion protein comprising a signal peptide (SEQ ID NO: 1), an Ig hinge (SEQ ID NO: 38), a Fc domain (SEQ ID NO: 4), a linker (SEQ ID NO: 5), and an IL-2 variant (2M) in which two amino acids are substituted (R38A, F42A) (SEQ ID NO: 6) in this order from N-terminus was synthesized through Invitrogen GeneArt Gene Synthesis service of ThermoFisher Scientific Inc., and cloned into a pcDNA3_4 vector. In addition, the vector was introduced into CHO cells (EXPI-CHO™) to express a fusion protein of SEQ ID NO: 44. After introducing the vector, the culture solution was cultured in an environment of 37° C., 125 RPM, and 8% $CO_2$ for 7 days, and then collected to purify the fusion protein dimer. The purified fusion protein dimer was named as "Fc-IL2v2."

Figure 4:
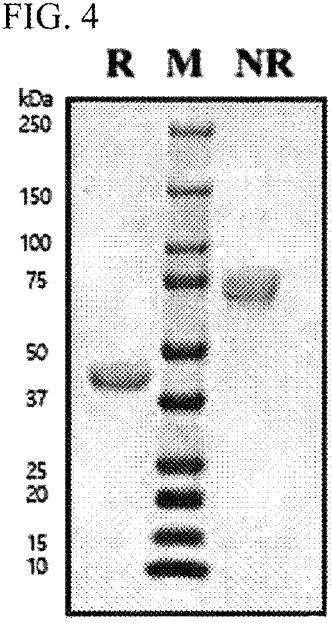
FIG. 4 shows the obtained Fc-IL2v2 fusion protein confirmed by SDS-PAGE.
Figure 5:
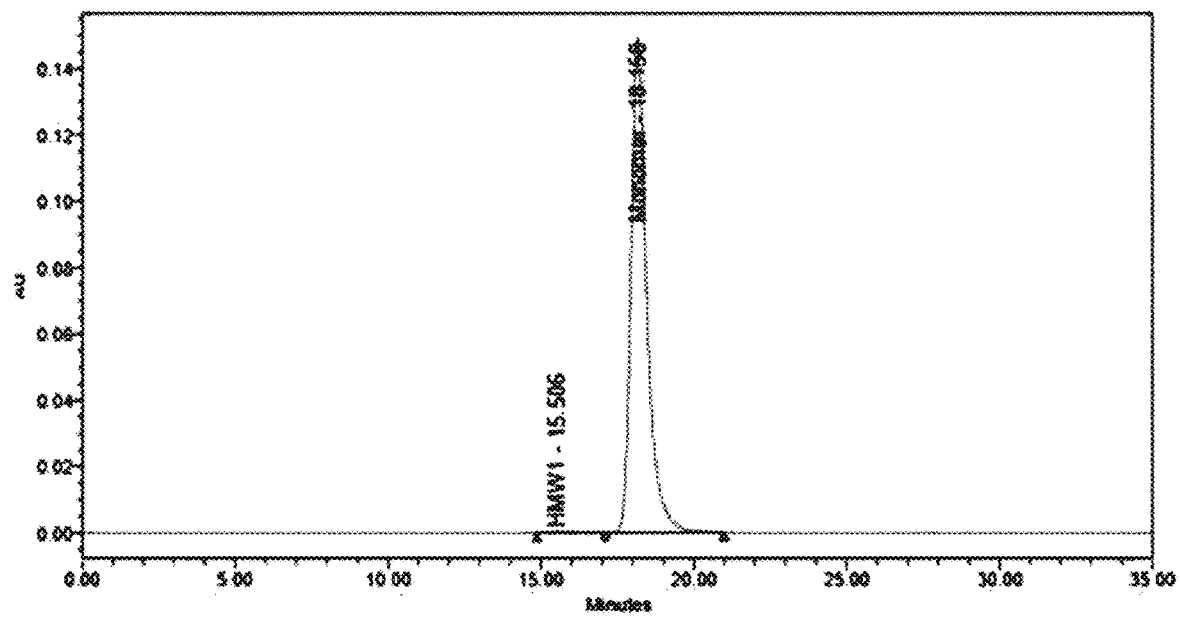
FIG. 5 shows the obtained Fc-IL2v2 fusion protein confirmed by size exclusion chromatography (SEC)

The purification and collection of the fusion protein were performed in the same manner as in the Preparatory Example 1. The isolated and purified fusion protein was subjected to SDS-PAGE under the reducing (R) or non-reducing (NR) conditions, and stained with coomassie blue to confirm its purity (FIG. 4). As a result, it was confirmed that the fusion protein forms a dimer. Also, the result analyzed using size exclusion chromatography is as shown in FIG. 5.

Preparatory Example 3. Preparation of a Fc-IL-2 Dimer: Fc-IL-2 wt

In order to produce a fusion protein comprising a Fc domain and a wild-type IL-2, a polynucleotide including a nucleotide sequence (SEQ ID NO: 43) encoding a fusion protein comprising a signal peptide (SEQ ID NO: 1), an Ig hinge (SEQ ID NO: 38), a Fc domain (SEQ ID NO: 4), a linker (SEQ ID NO: 5), and a wild-type IL-2 (SEQ ID NO: 10) in this order from N-terminus was synthesized through Invitrogen GeneArt Gene Synthesis service of ThermoFisher Scientific Inc., and cloned into a pcDNA3_4 vector. In addition, the vector was introduced into CHO cells (EXPI-CHO™) to express a fusion protein of SEQ ID NO: 42. After introducing the vector, the culture solution was cultured in an environment of 37° C., 125 RPM, and 8% $CO_2$ for 7 days, and then collected to purify the fusion protein dimer. The purified fusion protein dimer was named as "Fc-IL2 wt."

Figure 6:
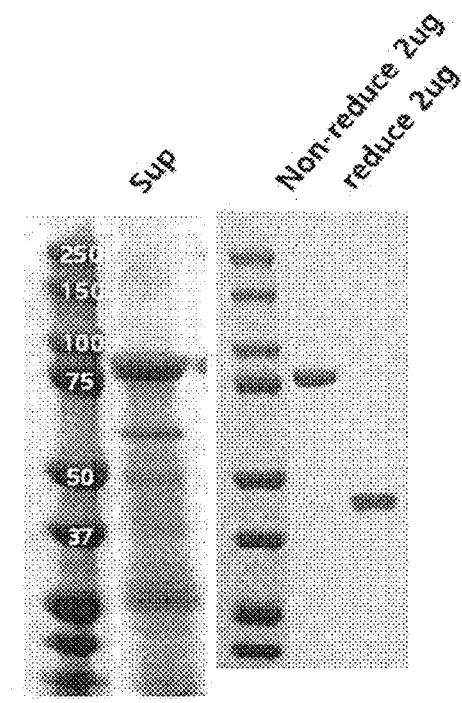
FIG. 6 shows the obtained Fc-IL2 wt fusion protein dimer confirmed by SDS-PAGE.
Figure 7:
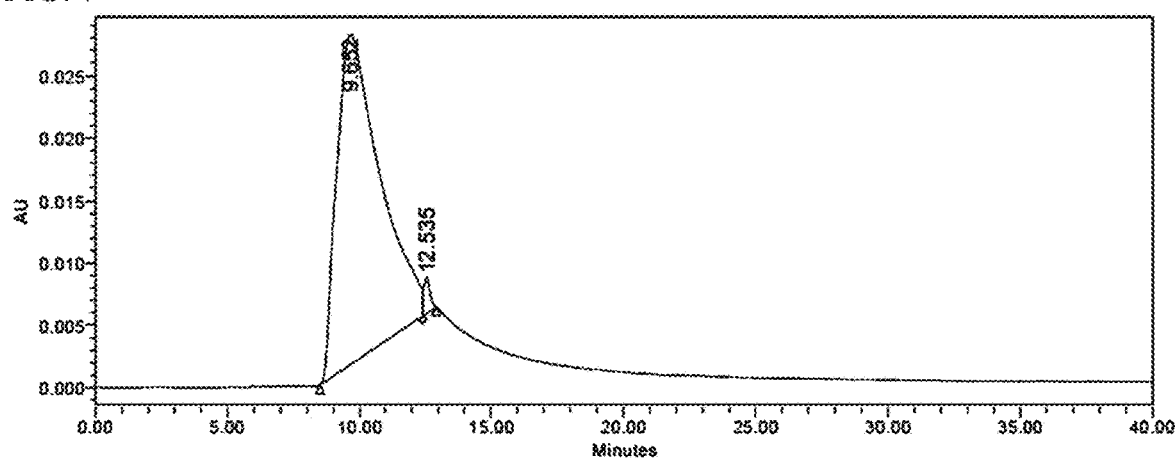
FIG. 7 shows the obtained Fc-IL2 wt fusion protein dimer confirmed by size exclusion chromatography (SEC)

The purification and collection of the fusion protein were performed in the same manner as in the Preparatory Example 1. The isolated and purified fusion protein was subjected to SDS-PAGE under the reducing (R) or non-reducing (NR) conditions, and stained with coomassie blue to confirm its purity (FIG. 6). As a result, it was confirmed that the fusion protein forms a dimer. Also, the result analyzed using size exclusion chromatography is as shown in FIG. 7.

Preparatory Example 4. Preparation of a hCD80-Fc-IL-2 Wild-Type Dimer: hCD80-Fc-IL-2 wt In order to produce a fusion protein comprising a human CD80 fragment, a Fc domain, and an IL-2 wile-type protein, a polynucleotide including a nucleotide sequence (SEQ ID NO: 41) encoding a fusion protein comprising a signal peptide (SEQ ID NO: 1), a CD80 fragment (SEQ ID NO: 2), a linker-bound Ig hinge (SEQ ID NO: 3), a Fc domain (SEQ ID NO: 4), a linker (SEQ ID NO: 5), and IL-2 wild-type (SEQ ID NO: 10) in this order from N-terminus was synthesized through Invitrogen GeneArt Gene Synthesis service of ThermoFisher Scientific Inc., and cloned into a pcDNA3_4 vector. In addition, the vector was introduced into CHO cells (EXPI-CHO™) to express a fusion protein of SEQ ID NO: 46. After introducing the vector, the culture solution was cultured in an environment of 37° C., 125 RPM, and 8% $CO_2$ for 7 days, and then collected to purify a fusion protein dimer. The purified fusion protein dimer was named as "hCD80-Fc-IL2 wt."

Purification was performed using chromatography including Mab Select SuRe protein A resin. The fusion protein was bound under the condition of 25 mM Tris, 25 mM NaCl, and pH 7.4. Then, it was eluted with 100 mM NaCl and 100 mM acetic acid at pH 3. After putting 20% of 1M Tris-HCl at pH 9 into the collection tube, the fusion protein was collected. The collected fusion protein was dialyzed into PBS buffer for 16 hours to change.

Figure 8:
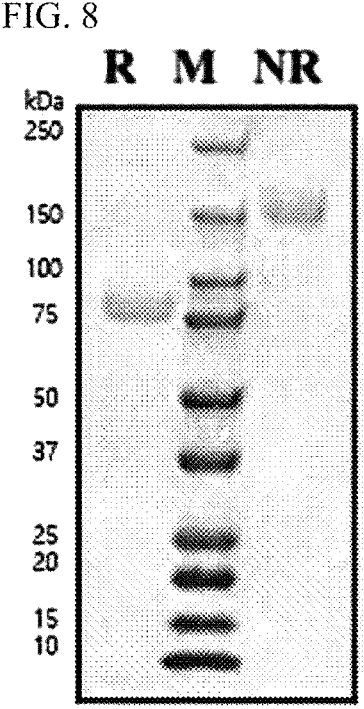
FIG. 8 shows the obtained hCD80-Fc-IL2 wt fusion protein confirmed by SDS-PAGE.
Figure 9:
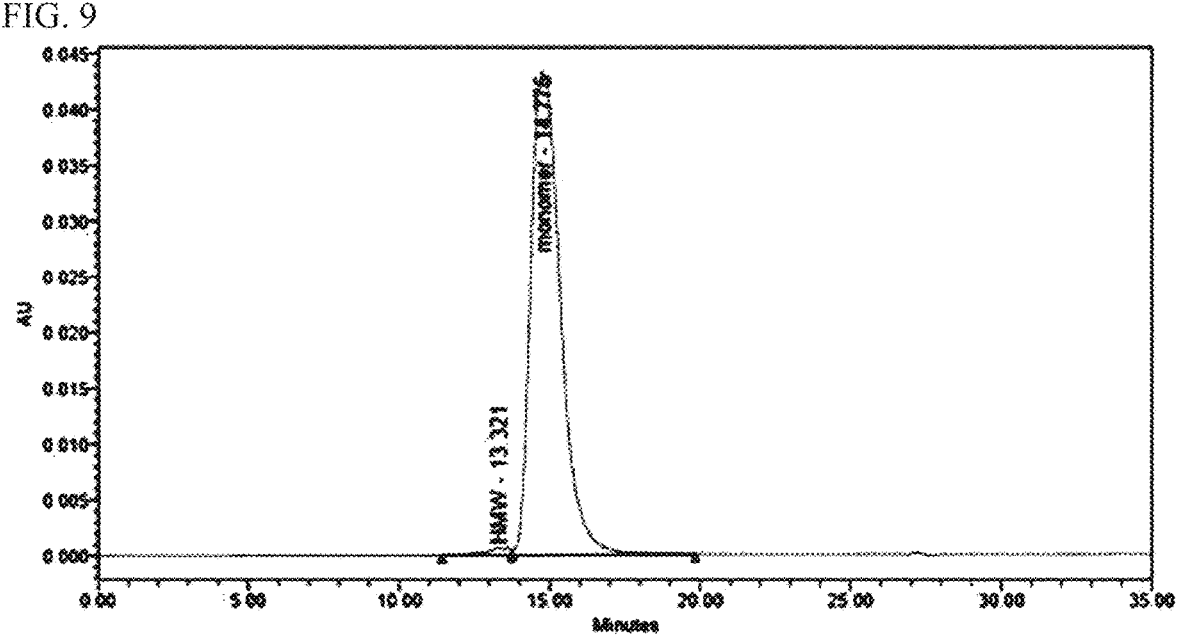
FIG. 9 shows the obtained hCD80-Fc-IL2 wt fusion protein confirmed by size exclusion chromatography (SEC)

Then, absorbance at a wavelength of 280 nm over time was measured by using size exclusion chromatography with TSKgel G3000SWXL column (TOSOH Bioscience) to obtain a high concentration of fusion protein. At this time, the isolated and purified fusion protein was subjected to SDS-PAGE under the reducing (R) or non-reducing (NR) conditions, and stained with coomassie blue to confirm its purity (FIG. 8). As a result, it was confirmed that the fusion protein forms a dimer. Also, the result analyzed using size exclusion chromatography is as shown in FIG. 9.

Preparatory Example 5. Preparation of a hCD80-Fc Dimer: hCD80-Fc

In order to produce a fusion protein comprising a human CD80 fragment and a Fc domain, a polynucleotide (SEQ ID NO: 39) including a nucleotide sequence encoding a fusion protein comprising a signal peptide (SEQ ID NO: 1), a CD80 fragment (SEQ ID NO: 2), a linker-bound Ig hinge (SEQ ID NO: 3), and a Fc domain (SEQ ID NO: 4) in this order from N-terminus was synthesized through Invitrogen GeneArt Gene Synthesis service of ThermoFisher Scientific Inc., and cloned into a pcDNA3_4 vector. In addition, the vector was introduced into CHO cells (EXPI-CHO™) to express a fusion protein of SEQ ID NO: 40. After introducing the vector, the culture solution was cultured in an environment of 37° C., 125 RPM, and 8% $CO_2$ for 7 days, and then collected to purify a fusion protein dimer. The purified fusion protein dimer was named "hCD80-Fc."

Purification was performed using chromatography including Mab Select SuRe protein A resin. The fusion protein was bound under the condition of 25 mM Tris, 25 mM NaCl, and pH 7.4. Then, it was eluted with 100 mM NaCl and 100 mM acetic acid at pH 3. After putting 20% of 1 M Tris-HCl at pH 9 into the collection tube, the fusion protein was collected. The collected fusion protein was dialyzed into PBS buffer for 16 hours to change.

Figure 10:
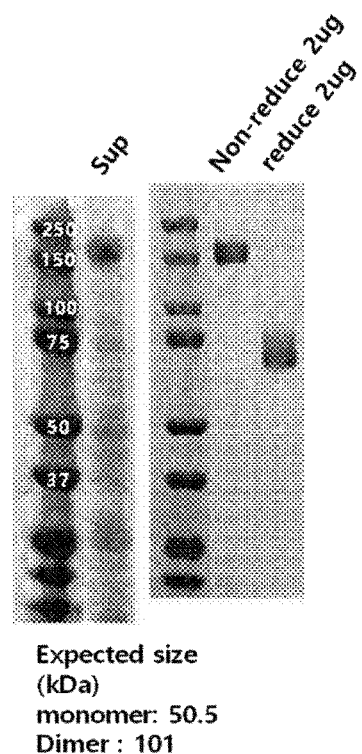
FIG. 10 shows the obtained hCD80-Fc fusion protein confirmed by SDS-PAGE.
Figure 11:
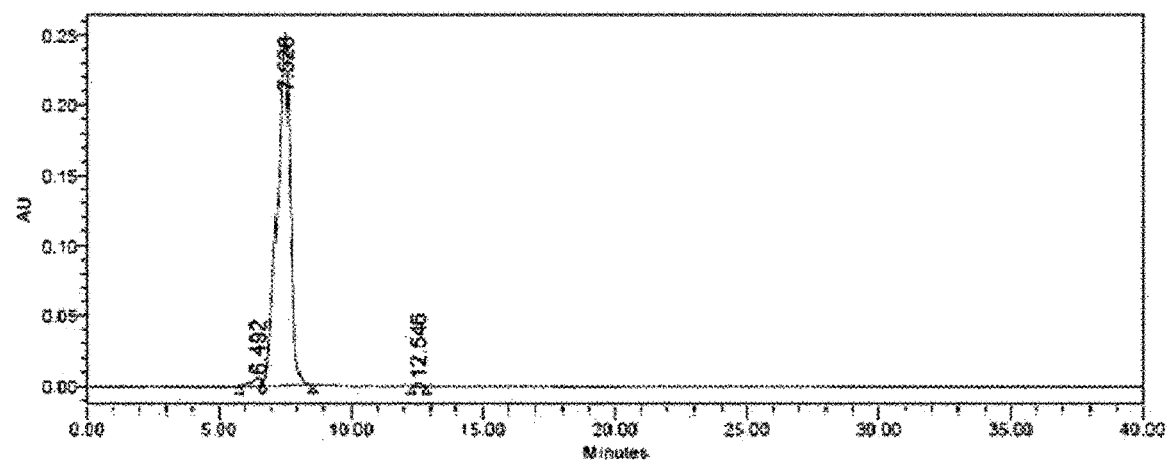
FIG. 11 shows the obtained hCD80-Fc fusion protein confirmed by size exclusion chromatography (SEC)

Then, absorbance at a wavelength of 280 nm over time was measured by using size exclusion chromatography with TSKgel G3000SWXL column (TOSOH Bioscience) to obtain a high concentration of fusion protein. At this time, the isolated and purified fusion protein was subjected to SDS-PAGE under the reducing (R) or non-reducing (NR) conditions, and stained with coomassie blue to confirm its purity (FIG. 10). As a result, it was confirmed that the fusion protein forms a dimer. Also, the result analyzed using size exclusion chromatography is as shown in FIG. 11.

Preparation Example 1. Culture Composition for Culturing T Cells

A T cell culture medium was prepared as the following composition. At this time, basal culture media in Tables 1 and 2 below were prepared, and then GI-101 or hCD80-Fc+Fc-IL-2v was added according to respective addition condition in Table 3 prior to use.

TABLE 1

Basal culture medium 1

| Components | Manufacturer | Cat.# | Dose | Final concentration |
|---|---|---|---|---|
| CTS ™ AIM V ™ SFM | Thermo | 0870112DK | to 1L | — |
| Human Serum | Sigma-Aldrich | H4522-100ML | 5 mL | 5% |
| GlutaMAX | Gibco | A12860-01 | 10 mL | 10% (1×) |

TABLE 2

Basal culture medium 2

| Components | Manufacturer | Cat.# | Dose | Final concentration |
|---|---|---|---|---|
| LM-Xuri T Cell Expansion Medium | Cytiva | 29185231.00 | to 1L | — |
| Human Serum | Sigma-Aldrich | H4522-100ML | 5 mL | 5% |
| Penicillin-Streptomycin | Welgene | LS-202-02 | 10 mL | penicillin 100 U/mL and streptomycin 100 µg/mL |

TABLE 3

Adding material

| Classification | Components | Manufacturer | Dose | Final concentration |
|---|---|---|---|---|
| Adding condition 1 | GI-101 | GI-Innovation | adding immediately before use | 1.6 nM |

TABLE 3-continued

Adding material

| Classification | Components | Manufacturer | Dose | Final concentration |
|---|---|---|---|---|
| Adding condition 2 | CD80-Fc+ Fc-IL2v2 | GI-Cell | adding immediately before use | CD80-Fc (1.6 nM) + Fc-IL2v2 (1.6 nM) |

Example 1. Determination of T Cell Proliferation and Activity According to CD4-PBMC Cell Culture Example 1.1. CD4− PBMC Cell Isolation and Culture Human peripheral blood mononuclear cells (PBMC) (Zen-Bio. Inc, Research Triangle Park, NC, USA, Cat #SER-PBMC-200-F) were thawed and resuspended into 5 mL of the basal culture media in Tables 1 and 2, and then centrifuged at 300×g for 5 minutes to wash the cells. Then, CD4+ cells were removed from PBMCs using human CD4 microbeads (Miltenyi Biotec, Bergisch Gladbach, Germany, Cat #130-045-101) and a magnetic cell isolation system.

CD4+ cells-removed PBMCs (CD4− PBMC) were suspended in a culture solution to $1\times10^6$ cells/mL, and 1 mL of each was dispensed into a 24-well plate. Then, anti-human CD3 antibodies (clone: OKT3, Biolegend, Cat #317326) were added to a concentration of 1 µg/mL to each well in which the cells were dispensed. At the same time, each of additives (Table 3) other than the basal culture media (Tables 1 and 2) was added to be 1.6 nM, and then cultured under the condition of 37° C. and 5% $CO_2$. Then, after 4 days, 1 mL of a cell culture composition including 1.6 nM of anti-human CD3 antibody and 1.6 nM of the additives (Table 3) other than the basic components of the media (Tables 1 and 2) was added to each well, and collected on the day 14 of culture to calculate the number of cells and the cell viability.

Figure 12:
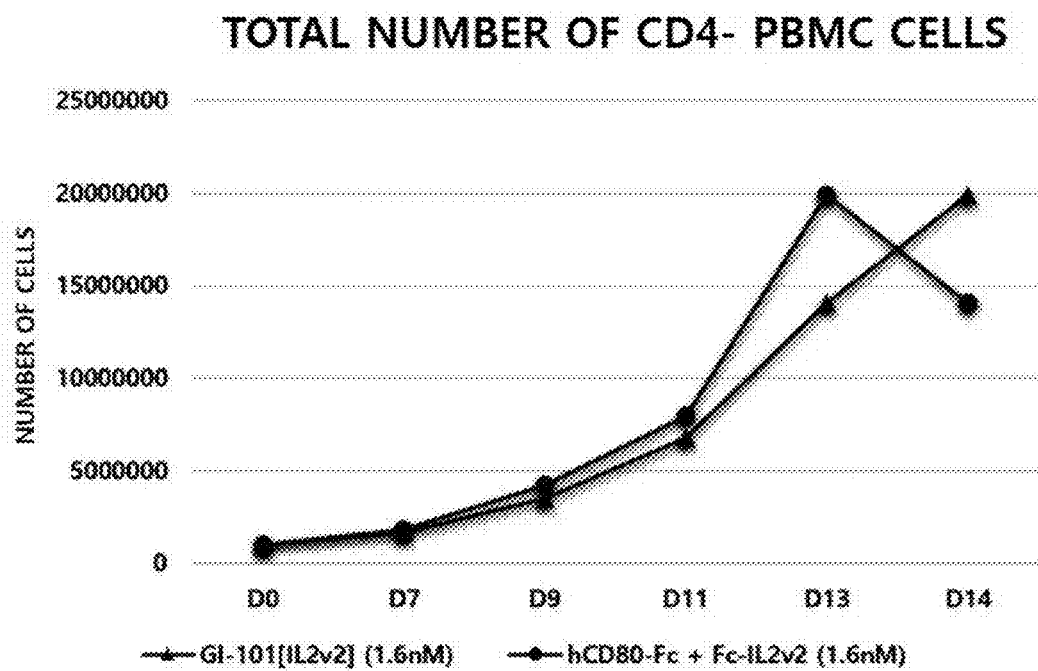
FIG. 12 shows the total number of CD4− PBMC cells when cultured in a culture composition including a basal culture medium in Table 1.
Figure 13:
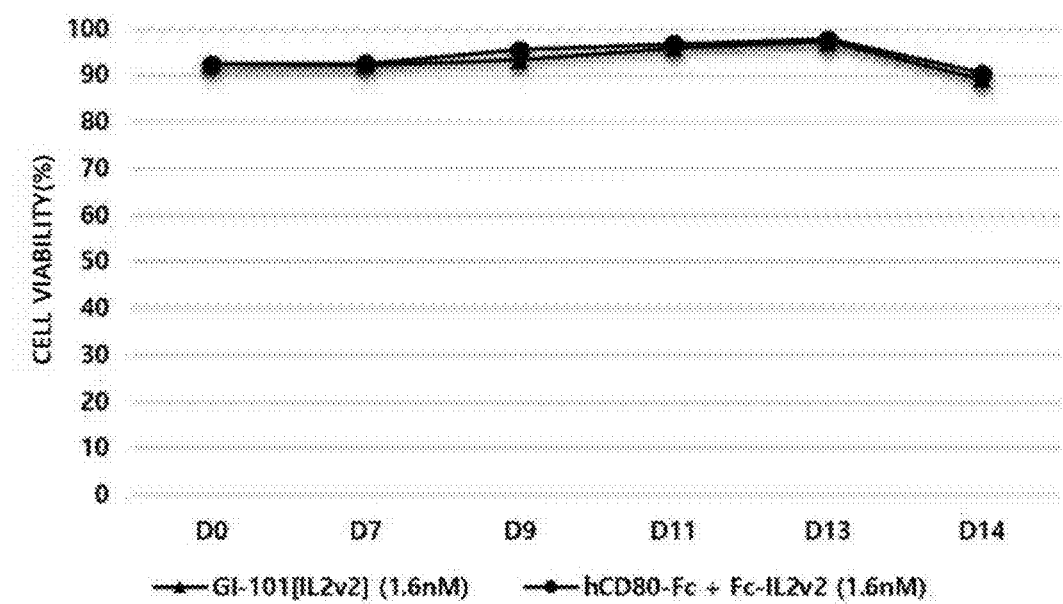
FIG. 13 shows the viability of CD4− PBMC cells when cultured in a culture composition including a basal culture medium in Table 1.
Figure 14:
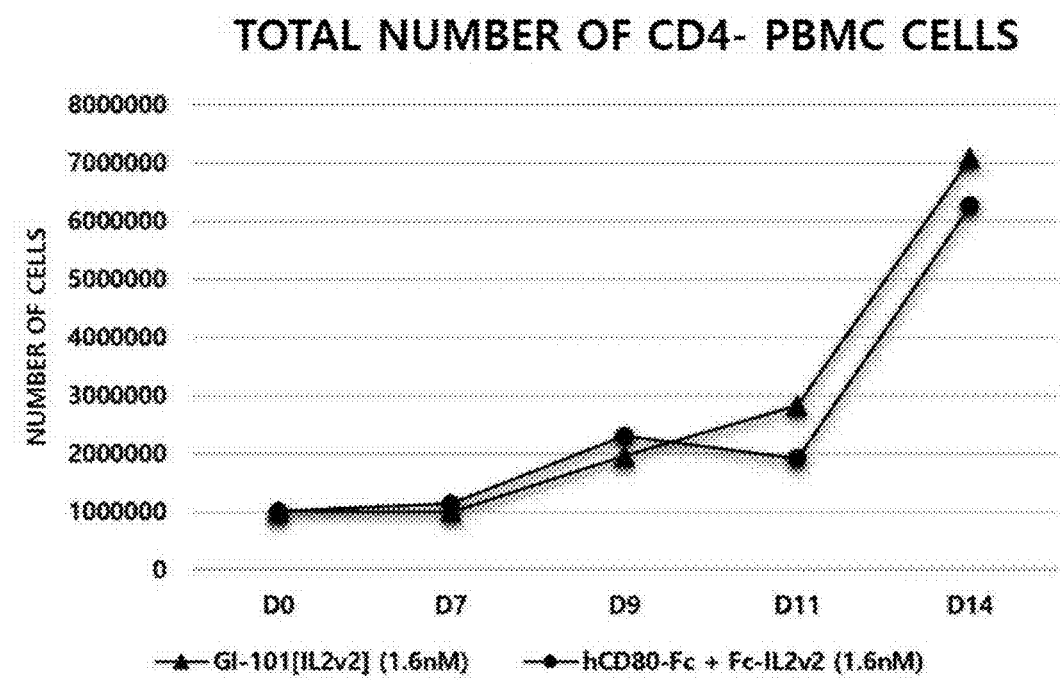
FIG. 14 shows the total number of CD4− PBMC cells when cultured in a culture composition including a basal culture medium in Table 2.
Figure 15:
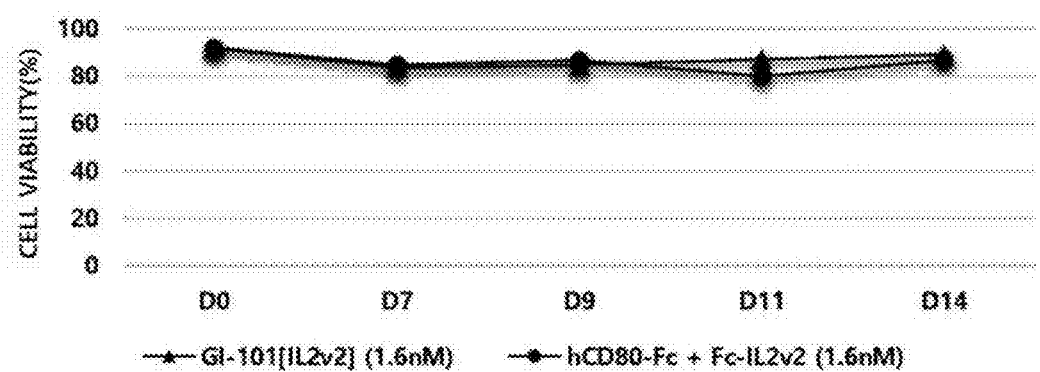
FIG. 15 shows the viability of CD4− PBMC cells when cultured in a culture composition including a basal culture medium in Table 2.

Specifically, the results of proliferation of CD4− PBMC cells in a T cell culture medium composition including the basal culture medium in Table 1 are shown in Table 4 and FIG. 12, and the cell viabilities are as shown in Table 5 and FIG. 13. In addition, the results of proliferation of CD4− PBMC cells in a T cell culture medium composition including the basal culture medium in Table 2 are shown in Table 6 and FIG. 14, and the cell viabilities are as shown in Table 7 and FIG. 15.

TABLE 4

| Classification | Treated material | Culture time | | | | |
|---|---|---|---|---|---|---|
| | | 0 Day | 7 Days | 9 Days | 11 Days | 14 Days |
| CD4-PBMC number total cell | GI-101 (1.6 nM) | 1,000,000 | 1,646,000 | 3,519,000 | 6,791,670 | 14,058,757 |
| | hCD80-Fc + Fc-IL2v (1.6 nM) | 1,000,000 | 1,826,000 | 4,194,000 | 7,968,600 | 19,921,500 |

TABLE 5

| Classification | Treated material | Culture time | | | | |
|---|---|---|---|---|---|---|
| | | 0 Day | 7 Days | 9 Days | 11 Days | 14 Days |
| CD4-PBMC cell viability (%) | GI-101 (1.6 nM) | 92.42 | 92.28 | 93.27 | 95.98 | 97.21 |
| | hCD80-Fc + Fc-IL2v (1.6 nM) | 92.42 | 92.51 | 95.54 | 96.8 | 97.69 |

TABLE 6

| Classification | Treated material | Culture time | | | | |
|---|---|---|---|---|---|---|
| | | 0 Day | 7 Days | 9 Days | 11 Days | 14 Days |
| CD4-PBMC number total cell | GI-101 (1.6 nM) | 1,000,000 | 996,000 | 1,948,000 | 2,820,000 | 7,078,200 |
| | hCD80-Fc + Fc-IL2v (1.6 nM) | 1,000,000 | 1,132,000 | 2,300,000 | 1,912,000 | 6,260,000 |

TABLE 7

| Classification | Treated material | Culture time | | | | |
|---|---|---|---|---|---|---|
| | | 0 Day | 7 Days | 9 Days | 11 Days | 14 Days |
| CD4-PBMC cell viability (%) | GI-101 (1.6 nM) | 91.86 | 83.7 | 84.72 | 87.24 | 89.09 |
| | hCD80-Fc + Fc-IL2v (1.6 nM) | 91.86 | 84.71 | 86.7 | 79.87 | 86.81 |

Example 1.2. Flow Cytometry Through Cell Surface Staining

FACS analysis was performed to confirm the phenotype of CD4-(CD4 depletion) cells cultured for 14 days with the basic components of the medium (Tables 1 and 2) and the additives (Table 3) according to Example 1.1 above. $2 \times 10^5$ to $3 \times 10^5$ cells for each cell group were dispensed into a U-bottomed 96-well plate respectively, and 100 µl of FACS buffer (PBS, 3% FBS, 10 mM EDTA, 20 mM HEPES, 10 µg/mL polymyxin B, 1× antibiotics, and 1 mM sodium pyruvate) were added each, and centrifuged at 300×g for 5 minutes to wash the cells.

Human TruStain FCX™ (BioLegend, Cat #422302) was diluted to 1:200 in FACS buffer, and then added 50 µl per cell pellets of each well, followed by incubation at 4° C. for 10 minutes. For cell surface analysis, 2 µl of the antibodies in Table 8 below were mixed with every 50 µl of FACS buffer, and dispensed 50 µl per each well, followed by incubation at 4° C. for 20 minutes. Then, 100 µl of FACS buffer was added each, and centrifuged at 300×g for 5 minutes to wash the cells. After washing, the cells were resuspended in FACS buffer, and then the phenotypes of cells were confirmed using a BD FACS Celesta flow cytometer (BD science, San Jose, Ca, USA) and FLOWJO™ software.

Figure 16:
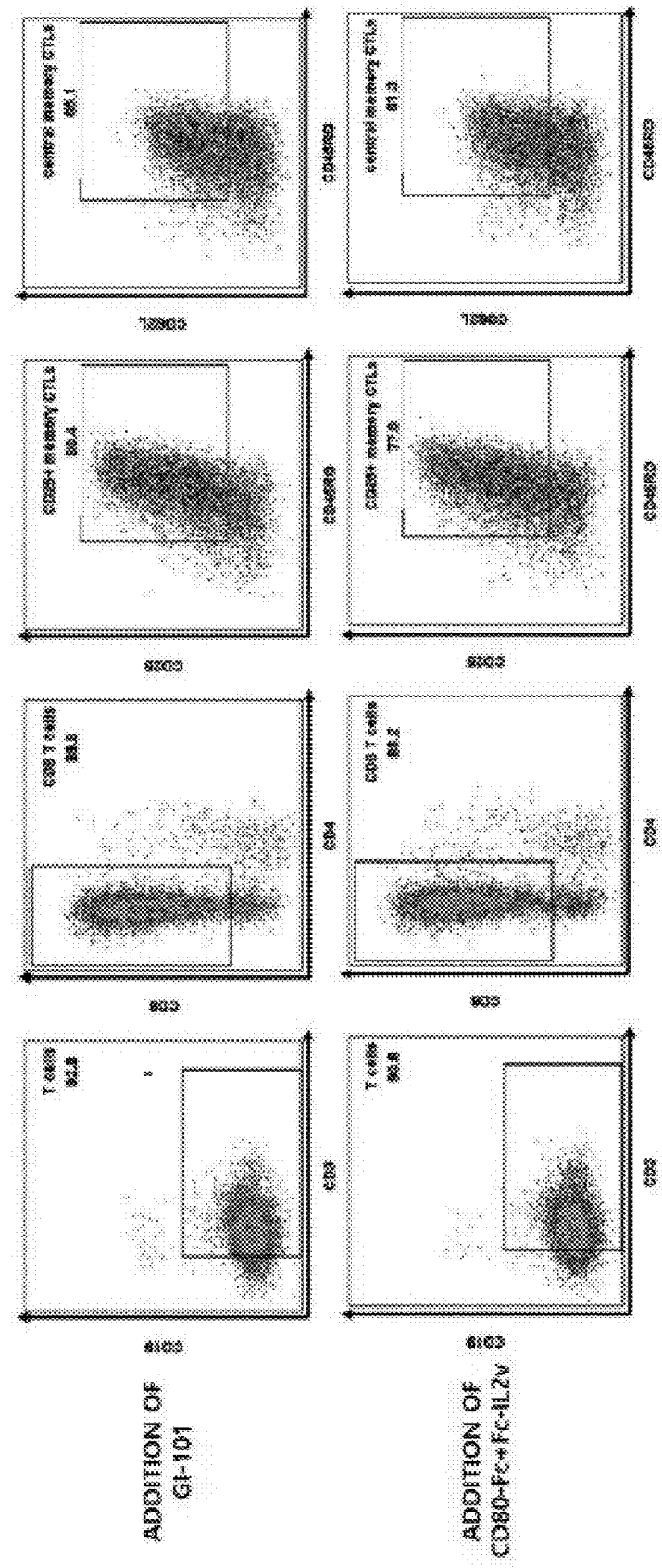
FIG. 16 shows the results of cell surface flow cytometry of CD4− PBMC cells by the treatment of GI-101 according to the present invention, or hCD80-Fc and Fc-IL2v additives in a culture composition that includes a basal culture medium in Table 1.
Figure 17:
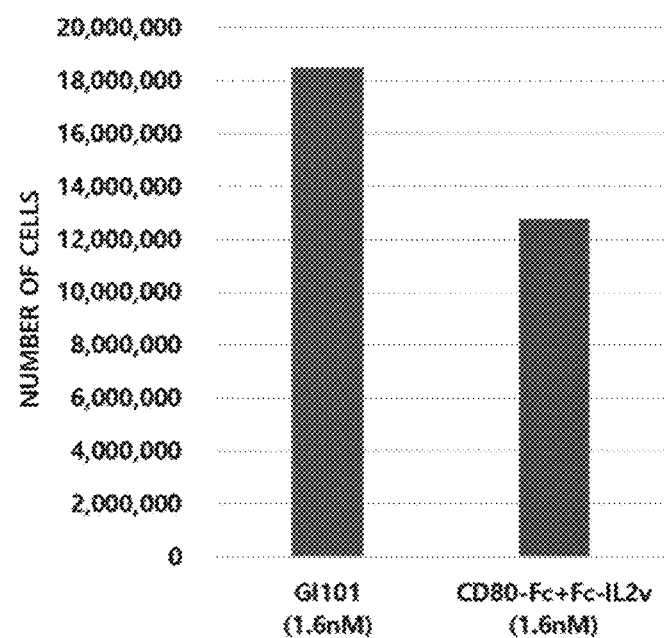
FIG. 17 is a graph in which the total number of T cells (CD3+CD19− cells) was quantified by fluorescence-activated cell sorting (FACS) analysis for CD4-PBMC cells cultured for 14 days in a culture composition that includes a basal culture medium in Table 1 and that is treated with GI-101 of the present invention, or hCD80-Fc and Fc-IL2v additives.
Figure 18:
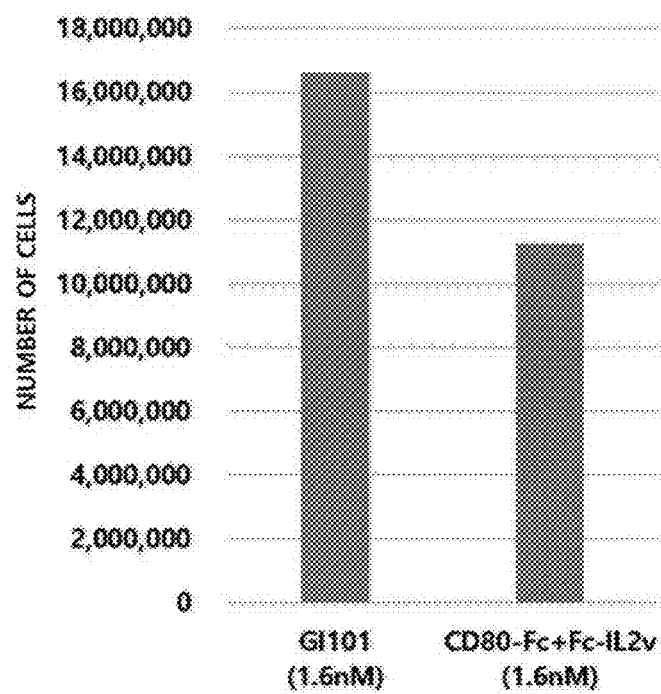
FIG. 18 is a graph in which the number of CD8 T cells was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.
Figure 19:
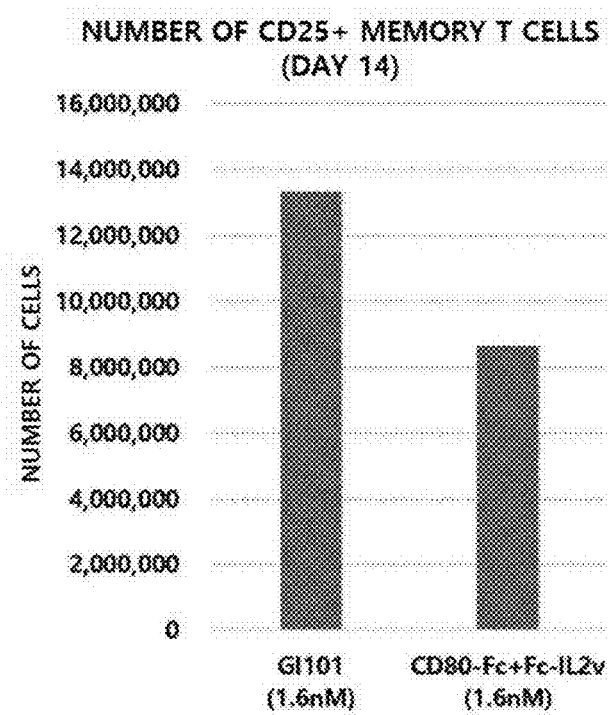
FIG. 19 is a graph in which the number of CD25+ memory T cells was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.
Figure 20:
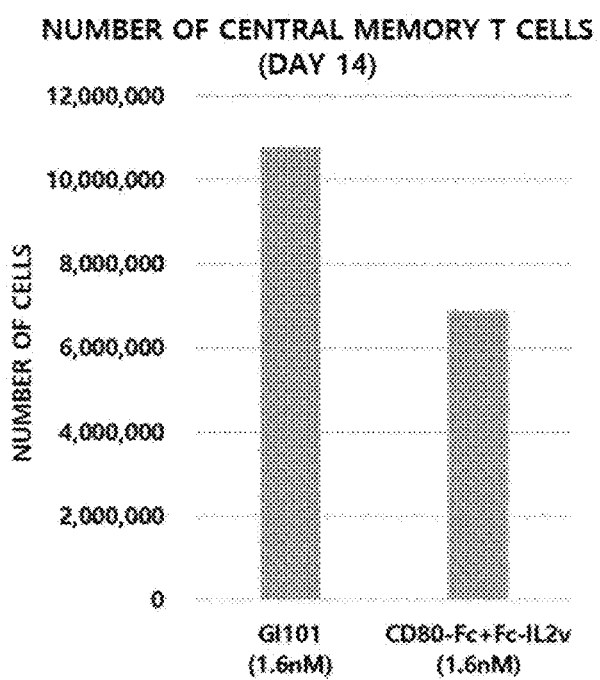
FIG. 20 is a graph in which the number of central memory T cells was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.

As a result, the results of cell surface flow cytometry (FACS plot) of CD4-PBMC cells cultured for 14 days according to the treatment of each additive in the T cell culture medium composition including the basal culture medium in Table 1 are shown in FIG. 16. In addition, the number of T cells, specifically the total number of T cells, the number of CD8 T cells, the number of CD25+ T cells, and the number of central memory T cells are as shown in Table 9 and FIGS. 17 to 20.

Figure 21:
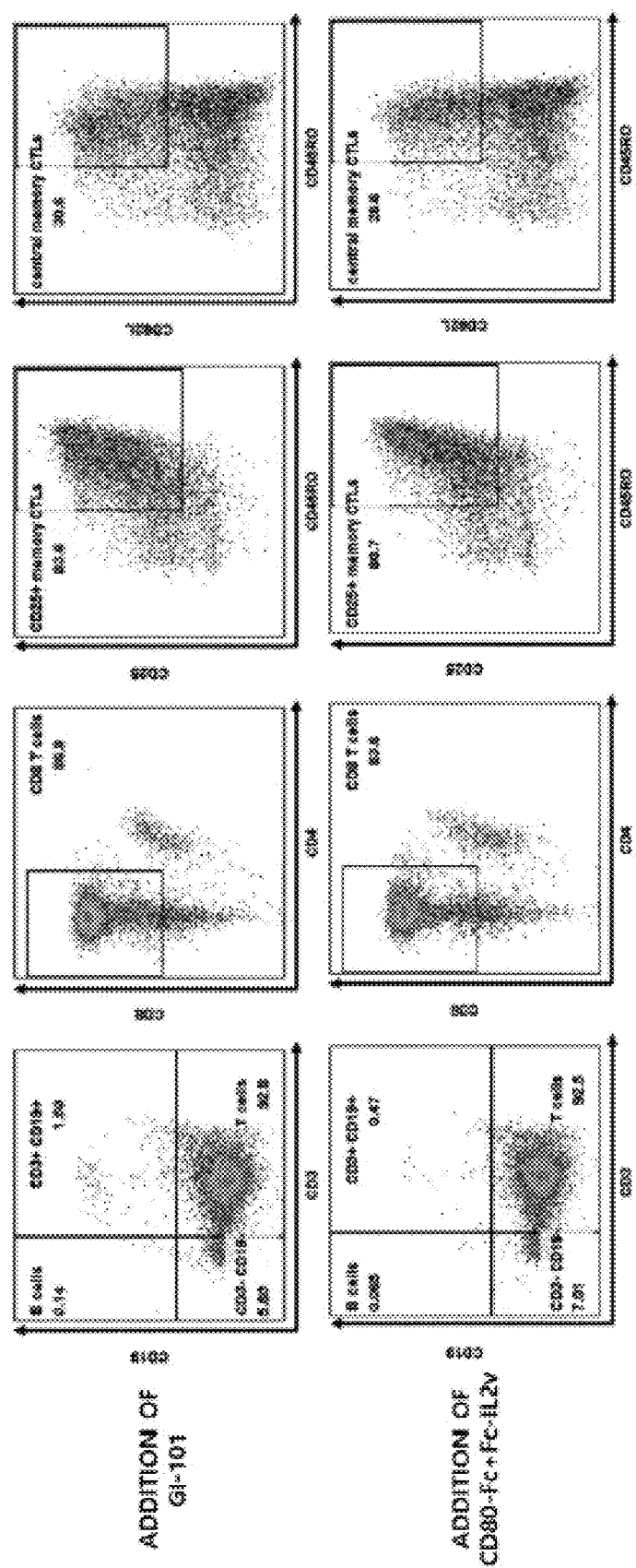
FIG. 21 shows the results of cell surface flow cytometry of CD4− PBMC cells by the treatment of GI-101 of the present invention, or hCD80-Fc and Fc-IL2v additives in a culture composition that includes a basal culture medium in Table 2.
Figure 22:
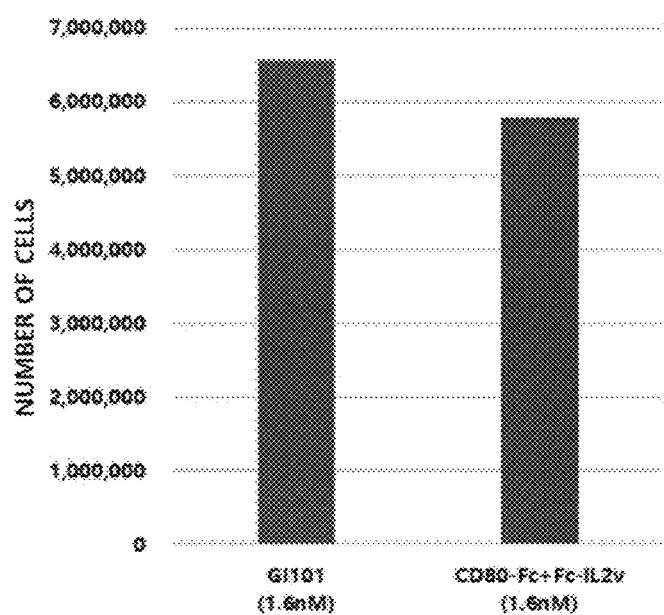
FIG. 22 is a graph in which the total number of T cells (CD3+CD19− cells) was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.
Figure 23:
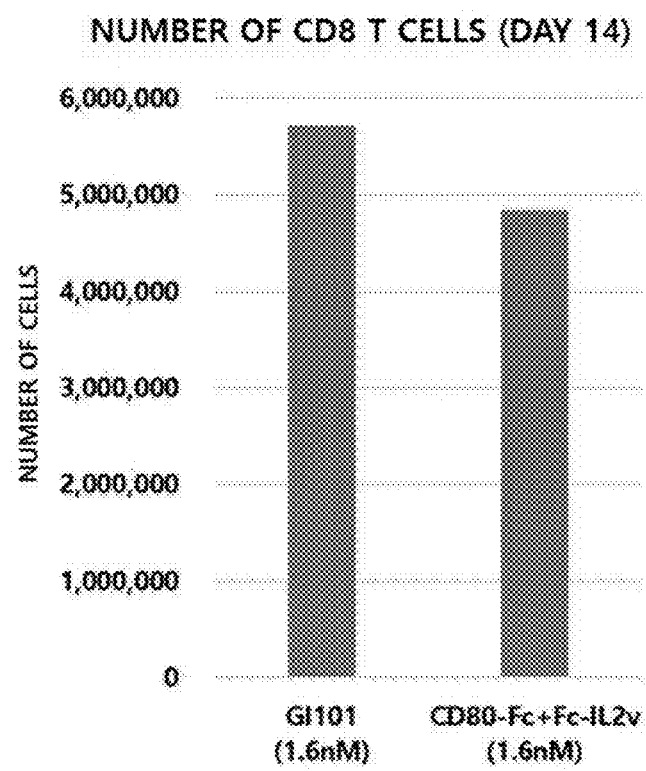
FIG. 23 is a graph in which the number of CD8 T cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.
Figure 24:
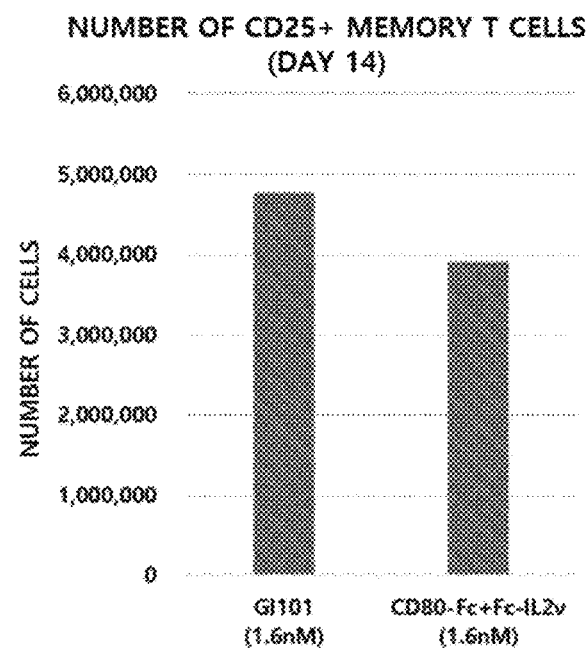
FIG. 24 is a graph in which the number of CD25+ memory T cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.
Figure 25:
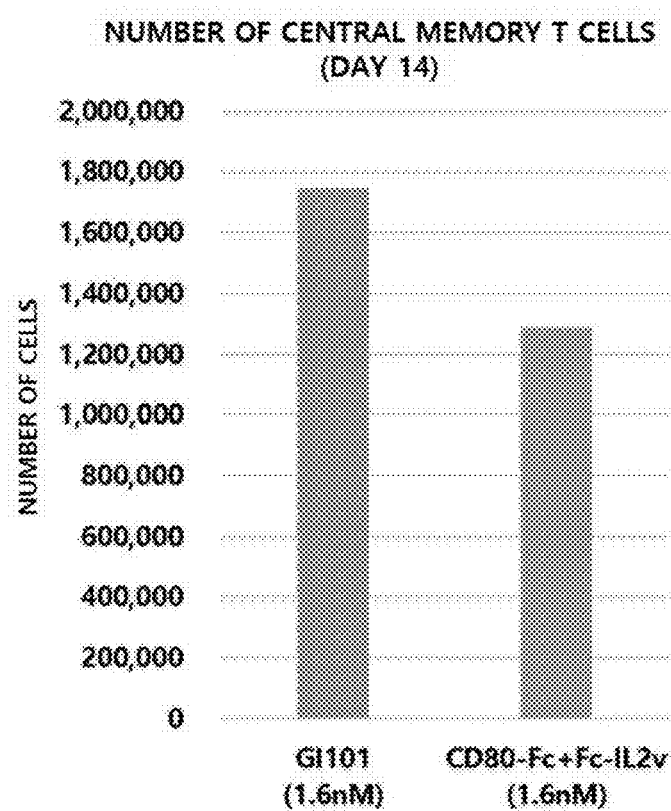
FIG. 25 is a graph in which the number of central memory T cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.

Also, the results of cell surface flow cytometry (FACS plot) of CD4− PBMC cells cultured for 14 days in the T cell culture medium composition that includes the basal culture medium in Table 2 and that is treated with each additive are shown in FIG. 21. In addition, the number of T cells, specifically the total number of T cells, the number of CD8 T cells, the number of CD25+ T cells, and the number of central memory T cells are as shown in Table 10 and FIGS. 22 to 25.

The results of flow cytometry through cell surface staining of Example 1.2 showed that when GI-101 was included as an additive, the total number of T cells, the number of CD8 T cells, the number of CD25+ T cells, and the number of central memory T cells were all highly proliferated, regardless of the basal culture medium.

TABLE 8

| | Components | | | | |
|---|---|---|---|---|---|
| | Products | Color | Clone | Manufacturer | Cat.# |
| Surface staining antibody | anti-human CD3 | PE | UCHT1 | BioLegend | 300428 |
| | anti-human CD4 | PerCP-Cy5.5 | OKT4 | BioLegend | 317428 |
| | anti-human CD8 | APC | SK1 | BioLegend | 344722 |
| | anti-human CD8 | FITC | RPA-T8 | BioLegend | 301006 |
| | anti-human CD14 | FITC | M5E2 | BioLegend | 301804 |
| | anti-human CD19 | BV480 | SJ25C1 | BD Biosciences | 566103 |
| | anti-human CD25 | APC/Cy7 | M-A251 | BD Biosciences | 557753 |
| | anti-human CD45RA | BV711 | HI100 | BioLegend | 304138 |
| | anti-human CD45RO | PE-CF594 | UCHL1 | BD Biosciences | 562299 |
| | anti-human CD56 | PE/Cy7 | HCD56 | BioLegend | 318318 |
| | anti-human CD62L | BV510 | DREG-56 | BioLegend | 304844 |
| | anti-human CD69 | AF700 | FN50 | BioLegend | 310922 |
| | anti-human CD127 | BV650 | A019D5 | BioLegend | 351326 |
| | anti-human CD197 (CCR7) | BV605 | G043H7 | BioLegend | 353224 |
| | anti-human HLA-DR, DP, DQ | BV785 | Tu39 | BD Biosciences | 555557 |
| Intra-cellular staining antibody | anti-human Perforin | APC | dG9 | Biolegend | 308112 |
| | anti-human Granyzme B | PE/Cy7 | QA16A02 | Biolegend | 372214 |
| | anti-human IFN-γ | BV421 | 4S.B3 | Biolegend | 502532 |

TABLE 9

| Treated material | Total T cell number[1] (CD3+ CD19− cells) | CD8 T cell number[2] (CD3+ CD19− CD8+ cells) | CD25+ memory T cell number[3] (CD25+ Memory CTL) | Central memory T cell number[4] (Central Memory CTL) |
|---|---|---|---|---|
| GI-101 (1.6 nM) | 18,487,152 | 16,601,462 | 13,347,576 | 10,807,552 |
| hCD80-Fc + Fc-IL2v (1.6 nM) | 12,765,351 | 11,259,040 | 8,669,461 | 6,901,791 |

[1]Total T cell number: total CD4− PBMC number × the percentage of CD3+CD19− T cells
[2]CD8 T cell number: total T cell number × the percentage of CD8 T cells
[3]CD25+ memory T cell number: CD8 T cell number × the percentage of CD25+ memory T cells
[4]Central memory T cell number: CD8 T cell number × the percentage of central memory T cells

TABLE 10

| Treated material | Total T cell number[1] (CD3+ CD19− cells) | CD8 T cell number[2] (CD3+ CD19− CD8+ cells) | CD25+ memory T cell number[3] (CD25+ Memory CTL) | Central memory T cell number[4] (Central Memory CTL) |
|---|---|---|---|---|
| GI-101 (1.6 nM) | 6,568,570 | 5,708,087 | 4,771,961 | 1,746,675 |
| hCD80-Fc + Fc-IL2v (1.6 nM) | 5,790,500 | 4,840,858 | 3,906,572 | 1,287,668 |

[1]Total T cell number: total CD4− PBMC number × the percentage of CD3+CD19− T cells
[2]CD8 T cell number: total T cell number × the percentage of CD8 T cells
[3]CD25+ memory T cell number: CD8 T cell number × the percentage of CD25+ memory T cells
[4]Central memory T cell number: CD8 T cell number × the percentage of central memory T cells

Example 1.3. Flow Cytometry Through Intracellular Staining $2 \times 10^5$ to $3 \times 10^5$ cells for each cell group were dispensed into a round-bottom 96-well plate respectively, and reacted at 37° C. for 4 hours by treating the medium in Tables 1 and 2 to which 1×Cell Stimulation Cocktail (eBioscience, Cat #00-4970-93) was added, and then washed with FACS buffer including 1×monensin (Biolegend, Cat #420701). FACS buffer including Human TruStain FCX™ (BioLegend, Cat #422302) and 1×monensin was diluted to 1:200, and then 50 μl of each cell group was dispensed, followed by incubation at 4° C. for 10 minutes. 2 μl of the cell surface staining antibodies (CD3, CD4, and CD8) among the antibodies in Table 8 were mixed with every 50 μl of FACS buffer which was mixed with 1×monensin, and 50 μl of each was dispensed to each well respectively, followed by incubation at 4° C. for 20 minutes. Then, it was washed twice with FACS buffer in which 1×monensin was mixed.

After washing, the cells were made to be fixable and permeable according to the manufacturer's protocol using BD CYTOFIX/CYTOPERM' (BD Biosciences, Cat #554714). 2 μl of the intracellular staining antibodies (perforin, granzyme B, and IFN-γ) in Table 8 were mixed with every 50 μl of 1× BD PERM/WASH™ (BD Biosciences, Cat #554723), and 50 μl of each was dispensed to each well respectively, followed by incubation at 4° C. for 20 minutes. Then, the cells were washed once with 1×BD PERM/WASH™ buffer and two more times with FACS buffer. The washed cells were resuspended in FACS buffer, and then sorted using a BD FACS Celesta flow cytometer, and the results were analyzed using FLOWJO' software.

Figure 26:
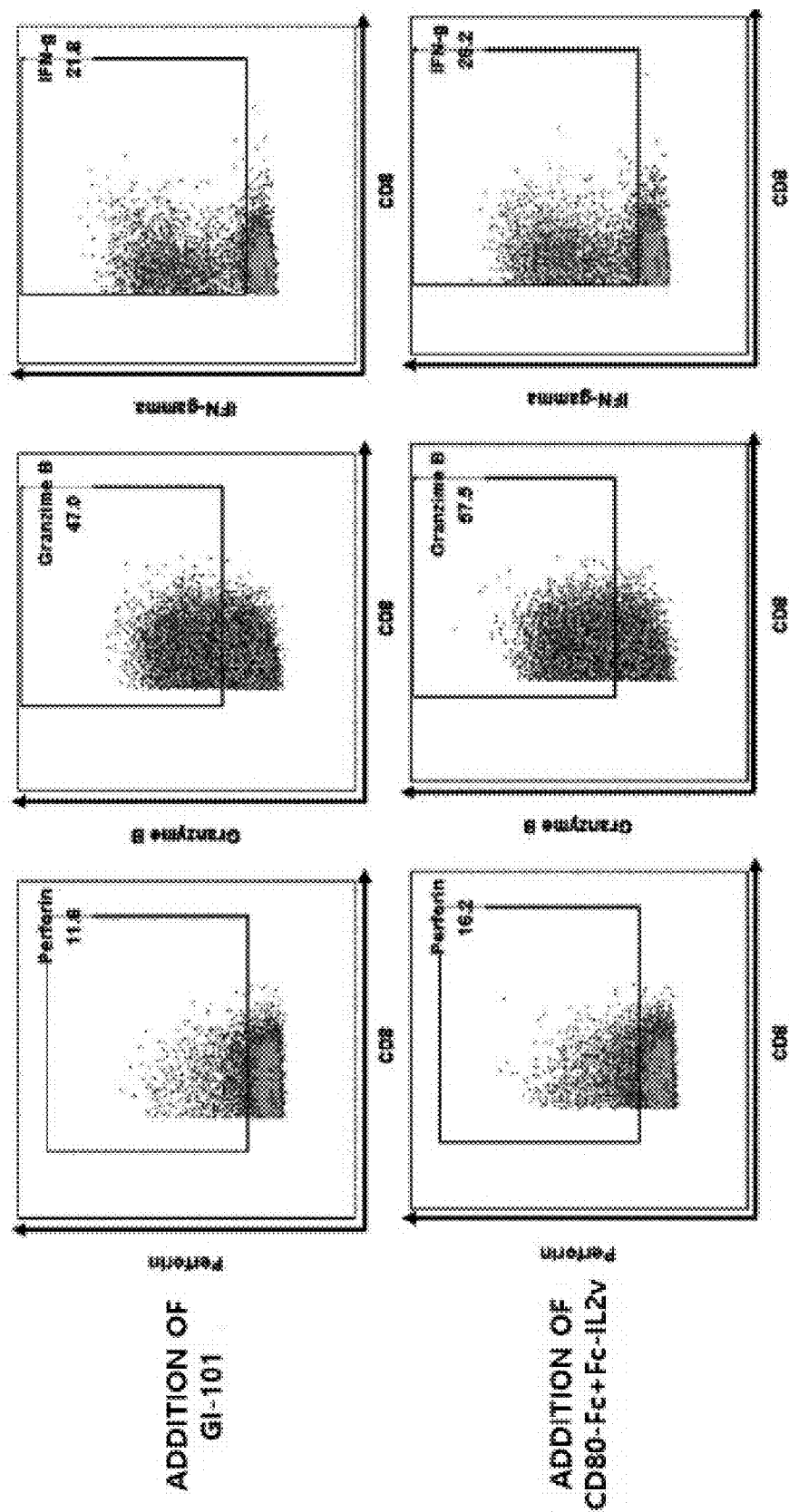
FIG. 26 shows the results of intracellular flow cytometry of CD4− PBMC cells by the treatment of GI-101 of the present invention, or hCD80-Fc and Fc-IL2v additives in a culture composition that includes a basal culture medium in Table 1.
Figure 27:
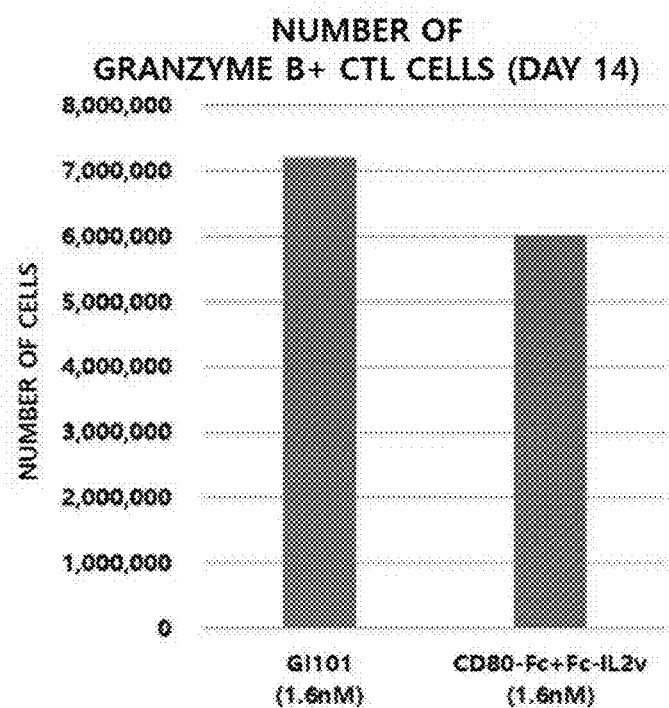
FIG. 27 is a graph in which the number of granzyme B+ CTL (Cytotoxicity T Lymphocyte) was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.
Figure 28:
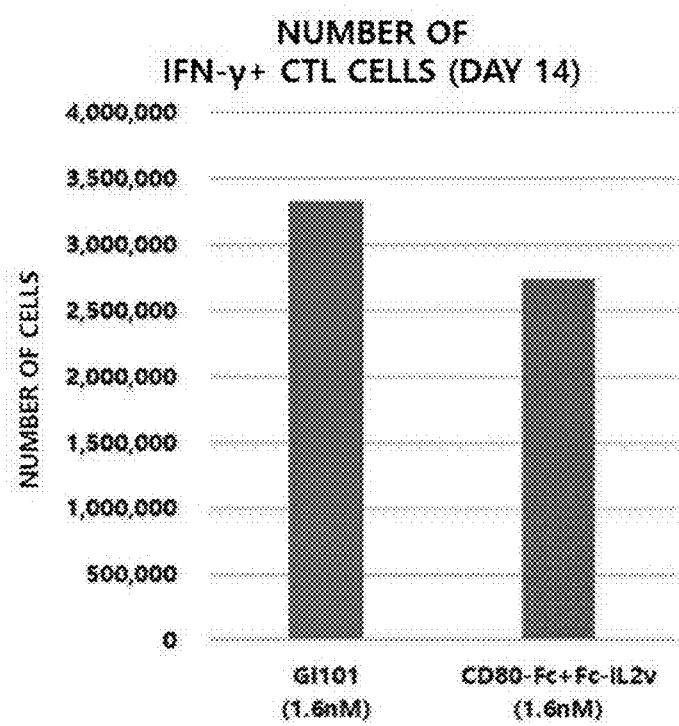
FIG. 28 is a graph in which the number of IFN-γ CTL cells was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.
Figure 29:
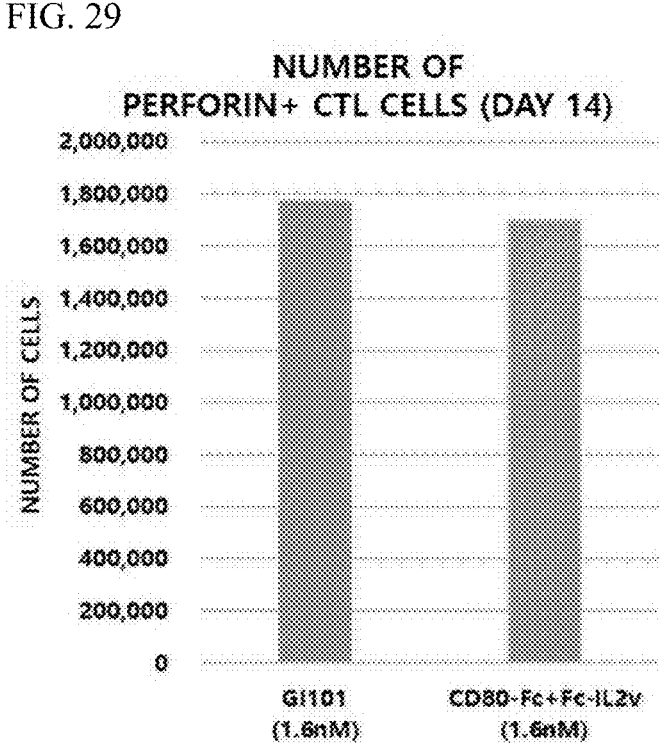
FIG. 29 is a graph in which the number of perforin+ CTL cells was quantified by FACS analysis for CD4− PBMC cells cultured for 14 days in a culture composition that includes a basal culture medium in Table 1 and that is treated with GI-101 of the present invention, or hCD80-Fc and Fc-IL2v additives.

As a result, the results of intracellular flow cytometry (FACS plot) of CD4-PBMC cells, which were cultured in the T cell culture medium composition that includes the basal culture medium in Table 1 and that is treated with each additive, are shown in FIG. 26. In addition, the results of determination of the number of CTL cells expressing granzyme B, IFN-γ, and perforin in the T cell culture medium composition that includes the basal culture medium in Table 1 and that is treated with each additive are as shown in Table 11 and FIGS. 27 to 29.

Figure 30:
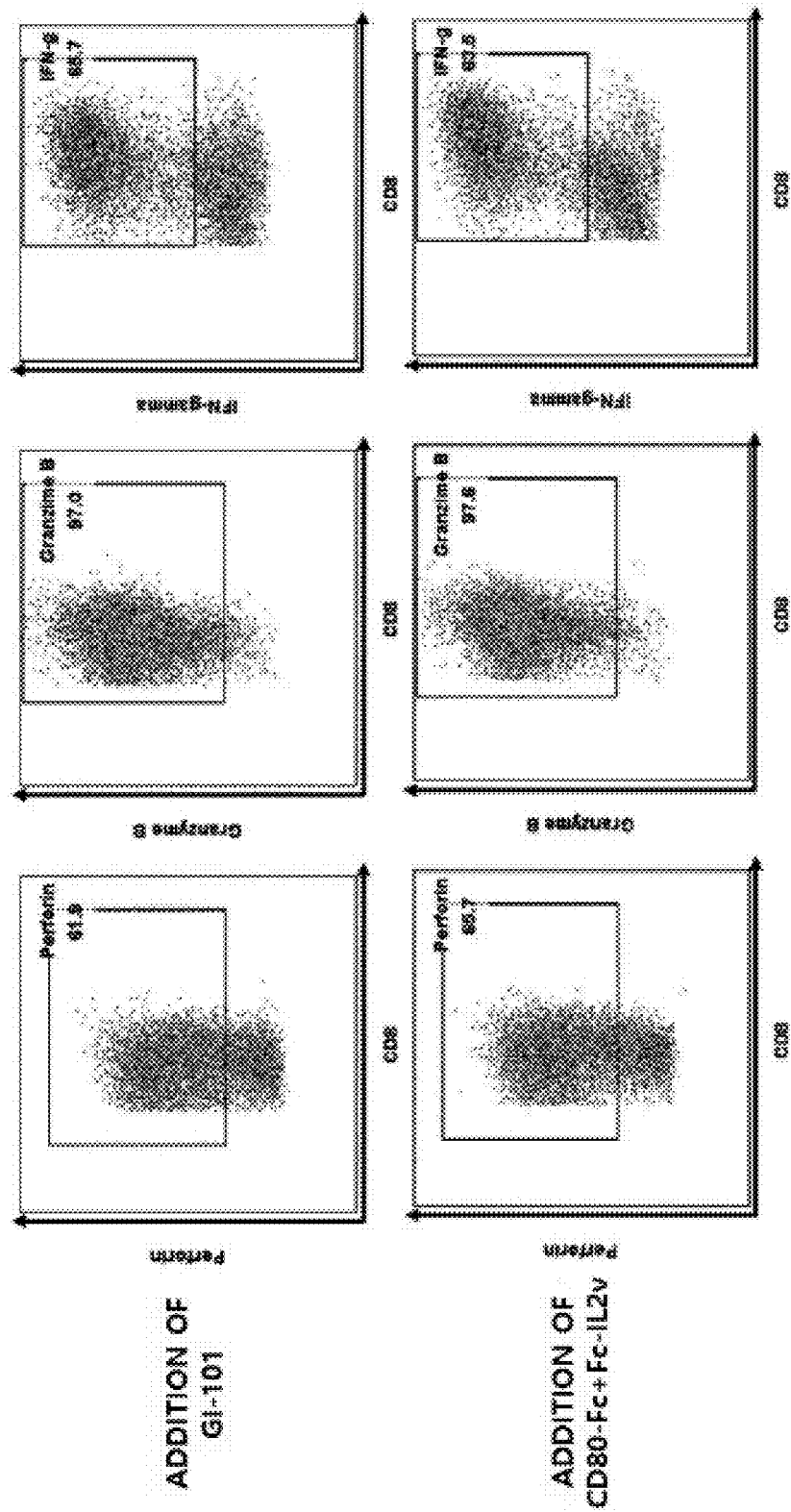
FIG. 30 shows the results of intracellular flow cytometry of CD4− PBMC cells by the treatment of GI-101 of the present invention, or hCD80-Fc and Fc-IL2v additives in a culture composition that includes a basal culture medium in Table 2.
Figure 31:
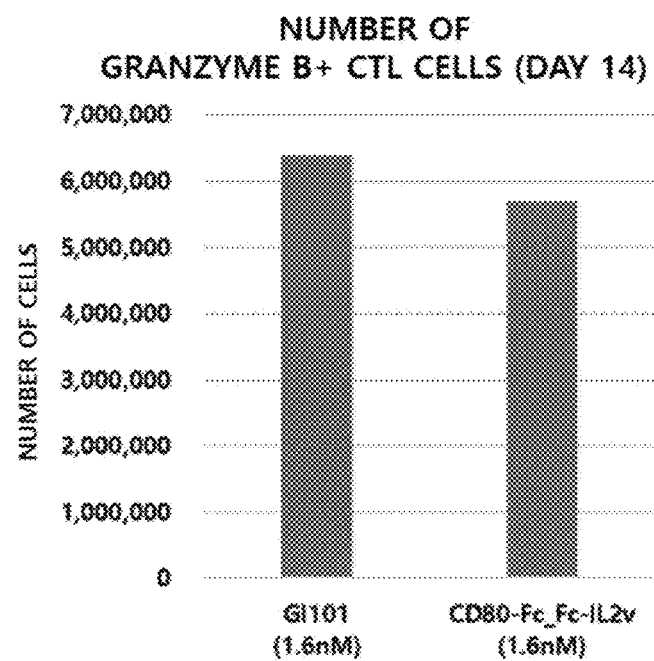
FIG. 31 is a graph in which the number of granzyme B+ CTL cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.
Figure 32:
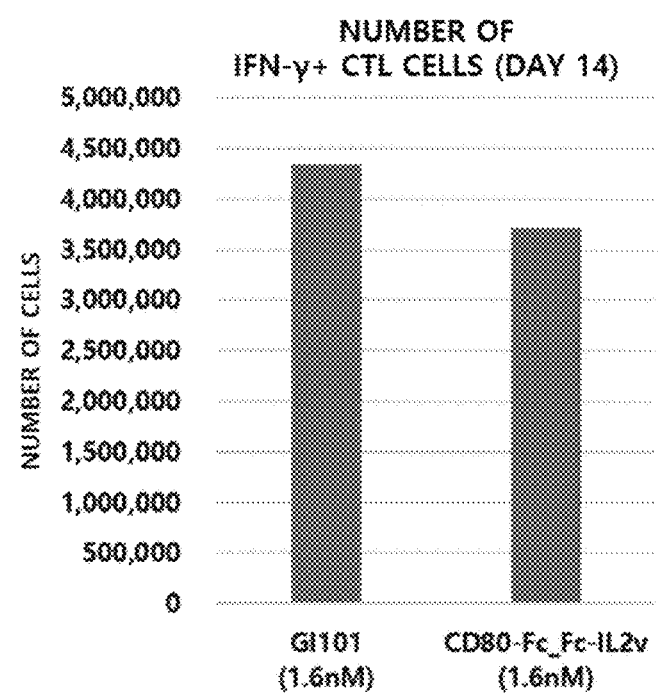
FIG. 32 is a graph in which the number of IFN-γ CTL cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.
Figure 33:
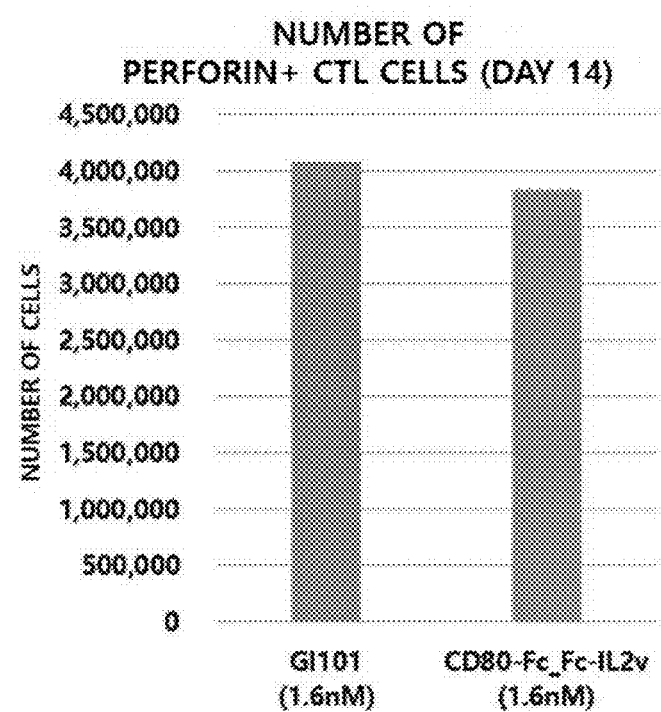
FIG. 33 is a graph in which the number of perforin+ CTL cells was quantified by FACS analysis for CD4− PBMC cells cultured for 14 days in a culture composition that includes a basal culture medium in Table 2 and that is treated with GI-101 of the present invention, or hCD80-Fc and Fc-IL2v additives.

Also, the results of intracellular flow cytometry (FACS plot) of CD4− PBMC cells cultured in the T cell culture medium composition that includes the basal culture medium in Table 2 and that is treated with each additive are shown in FIG. 30. In addition, the results of determination of the number of CTL cells expressing, granzyme B, IFN-γ, and perforin in the T cell culture medium composition that includes the basal culture medium in Table 2 and that is treated with each additive are as shown in Table 12 and FIGS. 31 to 33.

TABLE 11

| Treated material | Granzyme B+ CTL cell number[5] (CD8+ Granzyme B+ cells) | IFN-γ+ CTL cell number[6] (CD8+IFNγ+ cells) | Perforin CTL cell number[7] (CD8+ Perforin+ cells) |
|---|---|---|---|
| GI-101 (1.6 nM) | 7,190,865 | 3,335,337 | 1,774,767 |
| hCD80-Fc + Fc-IL2v (1.6 nM) | 6,022,420 | 2,744,129 | 1,696,751 |

[2]CD8 T cell number: total T cell number × the percentage of CD8 T cells
[5]Granzyme B+ CTL cell number: CD8 T cell number[2] × the percentage of CD8+ granzyme B+ cells
[6]IFN-γ+ CTL cell number: CD8 T cell number[2] × the percentage of CD8+ IFN-γ+ cells
[7]Perforin CTL cell number: CD8 T cell number[2] × the percentage of CD8+ perforin+ cells

TABLE 12

| Treated material | Granzyme B+ CTL cell number[5] (CD8+ Granzyme B+ cells) | IFN-γ+ CTL cell number[6] (CD8+ IFNγ+ cells) | Perforin CTL cell number[7] (CD8+ Perforin+ cells) |
|---|---|---|---|
| GI-101 (1.6 nM) | 6,398,976 | 4,334,152 | 4,083,470 |
| hCD80-Fc + Fc-IL2v (1.6 nM) | 5,700,406 | 3,708,768 | 3,837,261 |

[2]CD8 T cell number: total T cell number × the percentage of CD8 T cells
[5]Granzyme B+ CTL cell number: CD8 T cell number[2] × the percentage of CD8+ granzyme B+ cells
[6]IFN-γ+ CTL cell number: CD8 T cell number[2] × the percentage of CD8+ IFN-γ+ cells
[7]Perforin CTL cell number: CD8 T cell number[2] × the percentage of CD8+ perforin+ cells

Example 2. Determination of T Cell Proliferation and Activity According to CD8+ T Cell Culture

Example 2.1. CD8+ T Cell Isolation and Culture

Human peripheral blood mononuclear cells (PBMC) (Zen-Bio. Inc, Research Triangle Park, NC, USA, Cat #SER-PBMC-200-F) were thawed and resuspended into 5 mL of the basal culture media (in Tables 1 and 2), and then centrifuged at 300×g for 5 minutes to wash the cells. Then, CD8+ cells were obtained from PBMCs using human CD8 microbeads (MiltenyiBiotec, BergischGladbach, Germany Cat #130-045-201) and a magnetic cell isolation system.

The isolated CD8+ T cells were suspended in a culture solution to 1×10⁶ cells/mL and 1 mL of each was dispensed into a 24-well plate. Then, anti-human CD3 antibodies (clone: OKT3, Biolegend, Cat #317326) were added to a concentration of 1 μg/mL to each well in which respective cells were dispensed. At the same time, 1.6 nM of the basal culture media (Tables 1 and 2) and 1.6 nM of additives (Table 3, simultaneous treatment of GI-101, and hCD80-Fc and Fc-IL2 variants) were added respectively, and then cultured under the condition of 37° C. and 5% $CO_2$. On day 4 of culture, 1 mL of a cell culture composition including 1.6 nM of anti-human CD3 antibodies and 1.6 nM of the additives (Table 3, simultaneous treatment of GI-101, and hCD80-Fc and Fc-IL2 variants) other than the basic components of the media (Tables 1 and 2) was added to each well, and collected on the day 12 of culture to calculate the number of cells and the cell viability.

Figure 34:
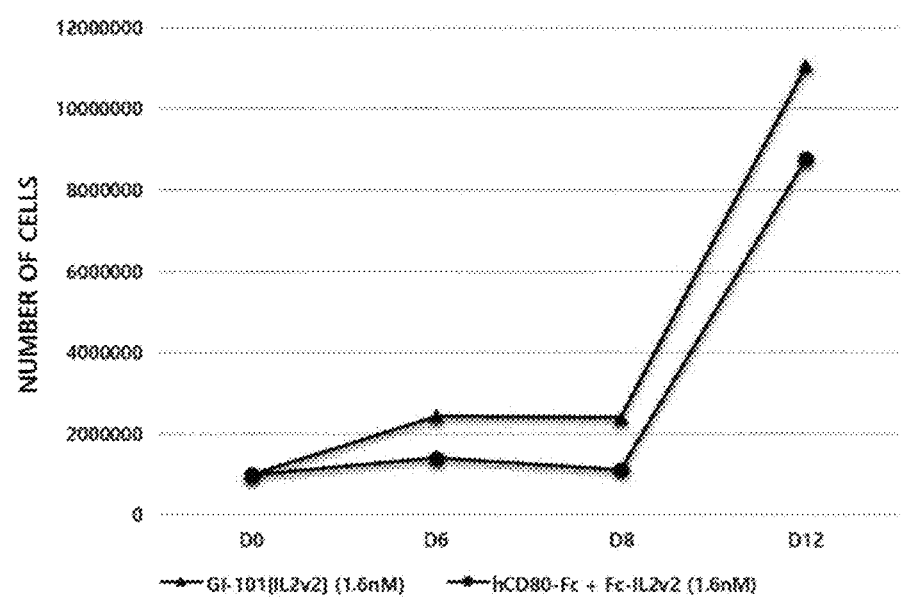
FIG. 34 shows the total number of CD8+ PBMC cells when cultured in a culture composition including a basal culture medium in Table 1.
Figure 35:
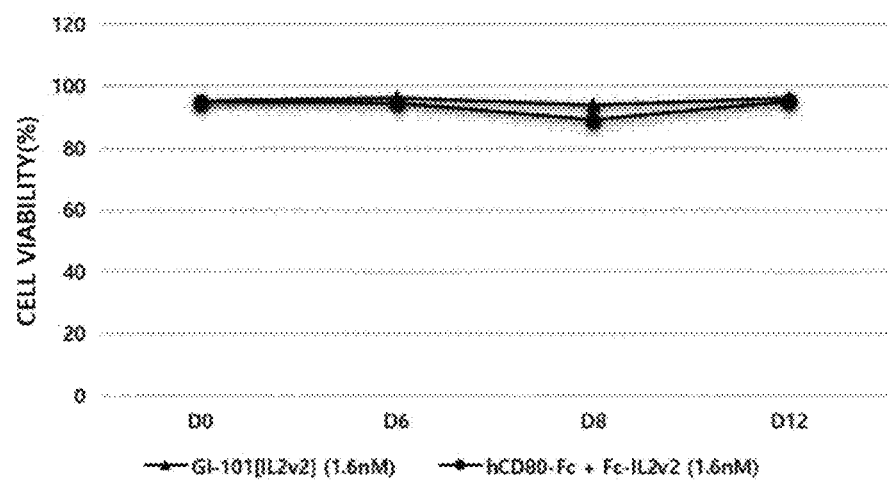
FIG. 35 shows viability of CD8+ PBMC cells when cultured in a culture composition including a basal culture medium in Table 1.

Specifically, the results of proliferation of CD8+ PBMC cells in a T cell culture medium composition including the basal culture medium in Table 1 are shown in Table 13 and FIG. 34, and the cell viabilities are as shown in Table 14 and FIG. 35.

TABLE 13

| Classi-fication | Treated material | Culture time | | | |
|---|---|---|---|---|---|
| | | 0 Day | 6 Days | 8 Days | 12 Days |
| CD8+ PBMC total cell number | GI-101 (1.6 nM) | 1,000,000 | 2,440,000 | 2,394,240 | 11,065,600 |
| | hCD80-Fc + Fc-IL2v (1.6 nM) | 1,000,000 | 1,412,000 | 1,119,000 | 8,775,000 |

TABLE 14

| Classification | Treated material | Culture time | | | |
|---|---|---|---|---|---|
| | | 0 Days | 6 Days | 8 Days | 12 Days |
| CD8+ PBMC cell viability (%) | GI-101 (1.6 nM) | 95.13 | 96.27 | 93.91 | 96.24 |
| | hCD80-Fc + Fc-IL2v (1.6 nM) | 95.13 | 94.7 | 89.07 | 95.34 |

Example 2.2. Flow Cytometry Through Cell Surface Staining

FACS analysis was performed to confirm the phenotypes of CD8+(CD8 isolation) cells cultured for 12 days in the composition including the basic components of the medium in Table 1 and the additives in Table 3 according to Example 2.1 above. 2×10⁵ to 3×10⁵ cells for each cell group were dispensed into a U-bottomed 96-well plate respectively, and 100 μl of FACS buffer (PBS, 3% FBS, 10 mM EDTA, 20 mM HEPES, 10 μg/mL polymyxin B, 1×antibiotics, and 1 mM sodium pyruvate) were added, and centrifuged at 300×g for 5 minutes to wash the cells.

Human TruStain FCX' (BioLegend, Cat #422302) was diluted to 1:200 in FACS buffer, and then added to each well of cell pellets, followed by incubation at 4° C. for 10 minutes. For cell surface analysis, 2 μl of the antibodies in Table 8 above were mixed with every 50 μl of FACS and 50 μl of each was dispensed to each well, followed by incubation at 4° C. for 20 minutes. Then, 100 μl of FACS buffer was added each, and centrifuged at 300×g for 5 minutes to wash the cells. After washing, the cells were resuspended in FACS buffer, and then the phenotypes of cells were confirmed using a BD FACS Celesta flow cytometer (BD science, San Jose, Ca, USA) and FLOWJO™ software.

Figure 36:
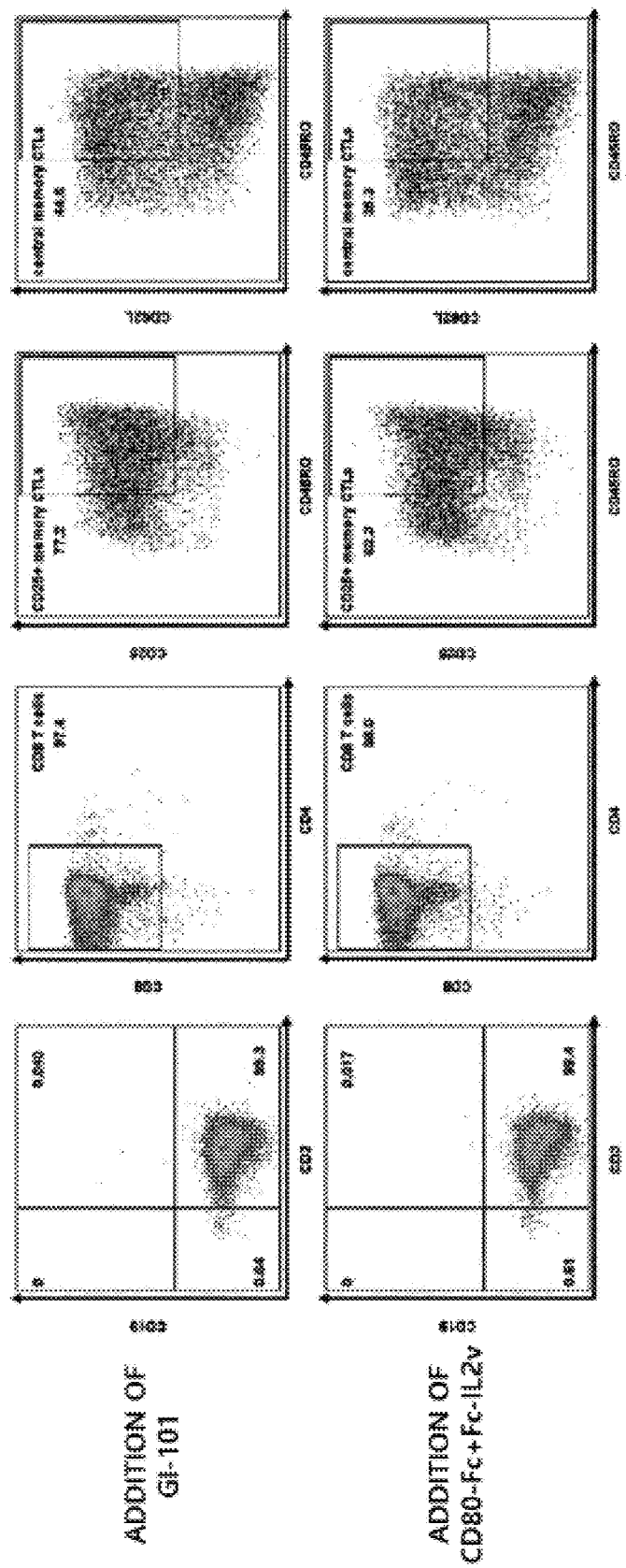
FIG. 36 shows the results of cell surface flow cytometry of CD8+ PBMC cells by the treatment of GI-101 of the present invention, or hCD80-Fc and Fc-IL2v additives in a culture composition that includes a basal culture medium in Table 1.
Figure 37:
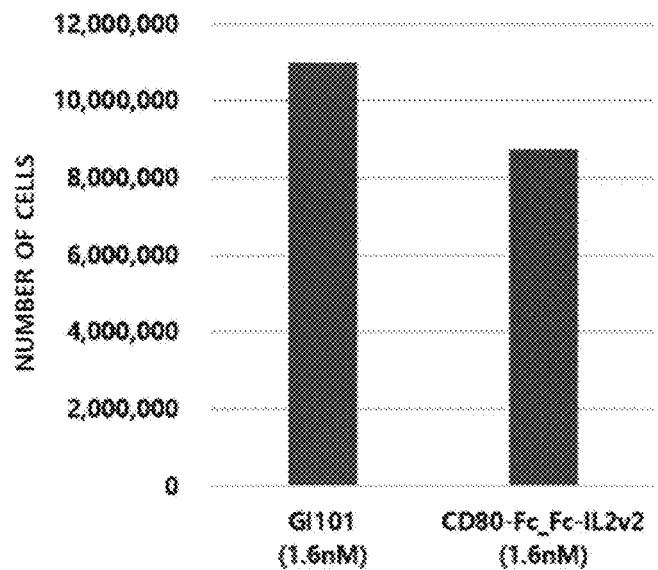
FIG. 37 is a graph in which the total number of T cells (CD3+CD19− cells) was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.
Figure 38:
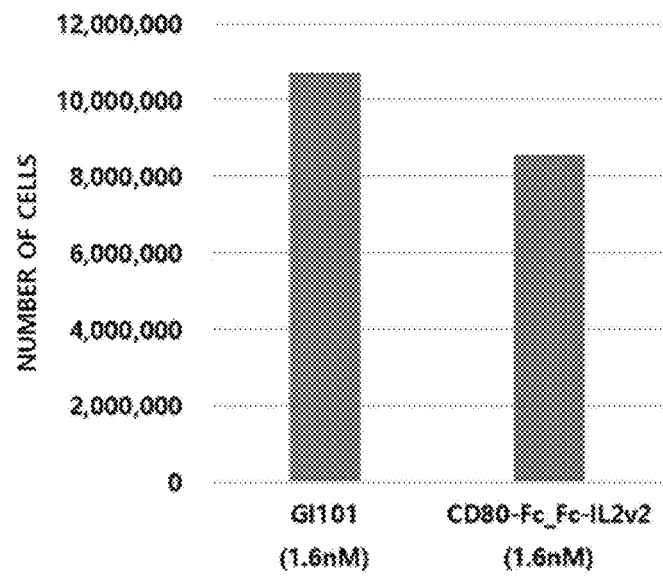
FIG. 38 is a graph in which the number of CD8 T cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.
Figure 39:
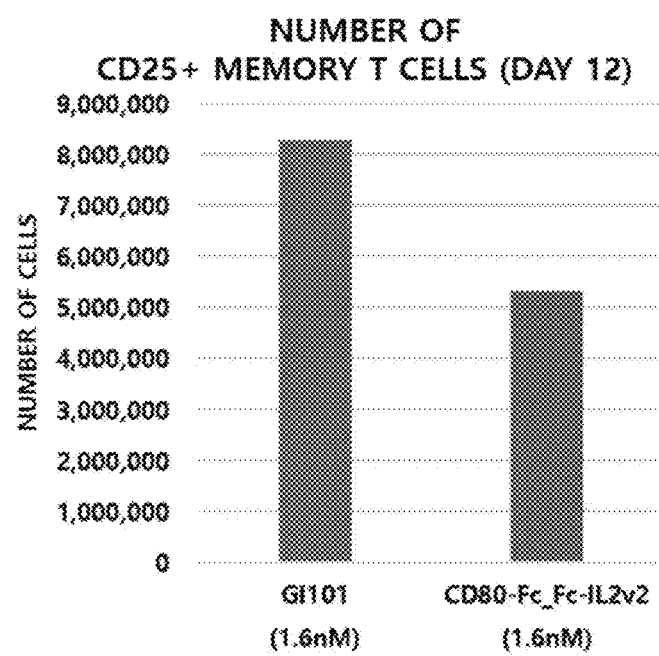
FIG. 39 is a graph in which the number of CD25+ memory T cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.
Figure 40:
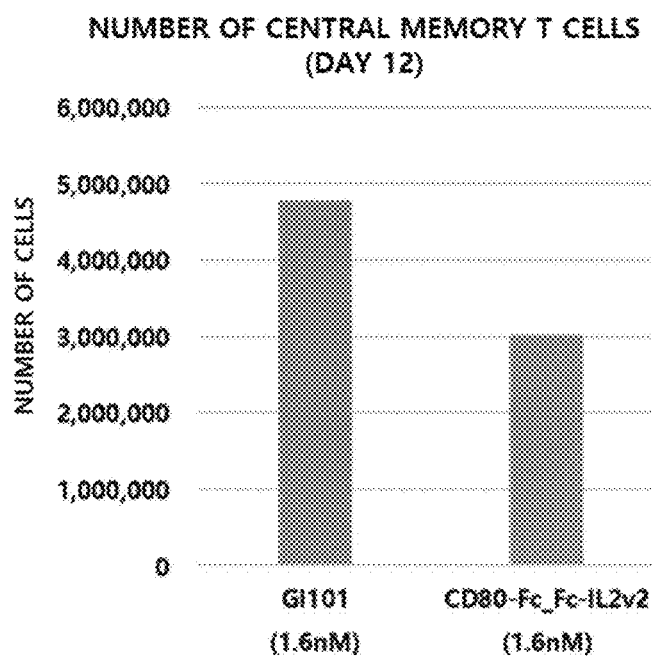
FIG. 40 is a graph in which the number of central memory T cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.

As a result, the results of cell surface flow cytometry (FACS plot) of CD8+ PBMC cells cultured for 12 days in the T cell culture medium composition that includes the basal culture medium in Table 1 and that is treated with each additive are shown in FIG. 36. In addition, the number of T cells, the number of CD8 T cells, the number of CD25+ T cells, and the number of central memory T cells are as shown in Table 15 and FIGS. 37 to 40.

TABLE 15

| Treated material | Total T cell number[8] (CD3+ CD19− cells) | CD8 T cell number[9] (CD3+ CD19− CD8+ cells) | CD25+ memory T cells[10] (CD25+ Memory CTL) | Central memory T cell number[11] (Central Memory CTL) |
|---|---|---|---|---|
| GI-101 (1.6 nM) | 10,988,141 | 10,702,449 | 8,262,291 | 4,773,292 |
| hCD80-Fc + Fc-IL2v (1.6 nM) | 8,722,350 | 8,547,903 | 5,325,344 | 3,017,410 |

[8] Total T cell number: total CD8+ PBMC number × the percentage of CD3+CD19− T cells
[9] CD8 T cell number: total T cell number × the percentage of CD8 T cells
[3] CD25+ memory T cell number: CD8 T cell number × the percentage of CD25+ memory T cells
[4] Central memory T cell number: CD8 T cell number × the percentage of central memory T cells

Example 2.3. Flow Cytometry Through Intracellular Staining

2×10⁵ to 3×10⁵ cells for each cell group were dispensed into a round-bottom 96-well plate respectively, and reacted at 37° C. for 4 hours by treating media in Tables 1 and 2 to which 1×Cell Stimulation Cocktail (eBioscience, Cat #00-4970-93) was added, and then washed with FACS buffer including 1×monensin (Biolegend, Cat #420701). FACS buffer including Human TruStain FCX™ (BioLegend, Cat #422302) and 1×monensin was diluted to 1:200, and then 50 μl of each cell group was dispensed respectively, followed by incubation at 4° C. for 10 minutes. 2 μl of the cell surface staining antibodies (CD3, CD4, and CD8) of the antibodies in Table 8 were mixed with every 50 μl of FACS buffer which is mixed with 1×monensin, and 50 μl of each was dispensed to each well, followed by incubation at 4° C. for 20 minutes. Then, it was washed twice with FACS buffer in which 1×monensin was mixed.

After washing, the cells were made to be fixable and permeable according to the manufacturer's protocol using BD CYTOFIX/CYTOPERM™ (BD Biosciences, Cat #554714). 2 μl of the intracellular staining antibodies (perforin, granzyme B, and IFN-γ) in Table 8 were mixed with every 50 μl of 1×BD PERM/WASH™ (BD Biosciences, Cat #554723), and 50 μl of each was dispensed to each well, followed by incubation at 4° C. for 20 minutes. Then, the cells were washed once with 1×BD PERM/WASH' buffer and two more times with FACS buffer. The washed cells were resuspended in FACS buffer, and then sorted using a BD FACS Celesta flow cytometer, and the results were analyzed using FLOWJO' software.

Figure 41:
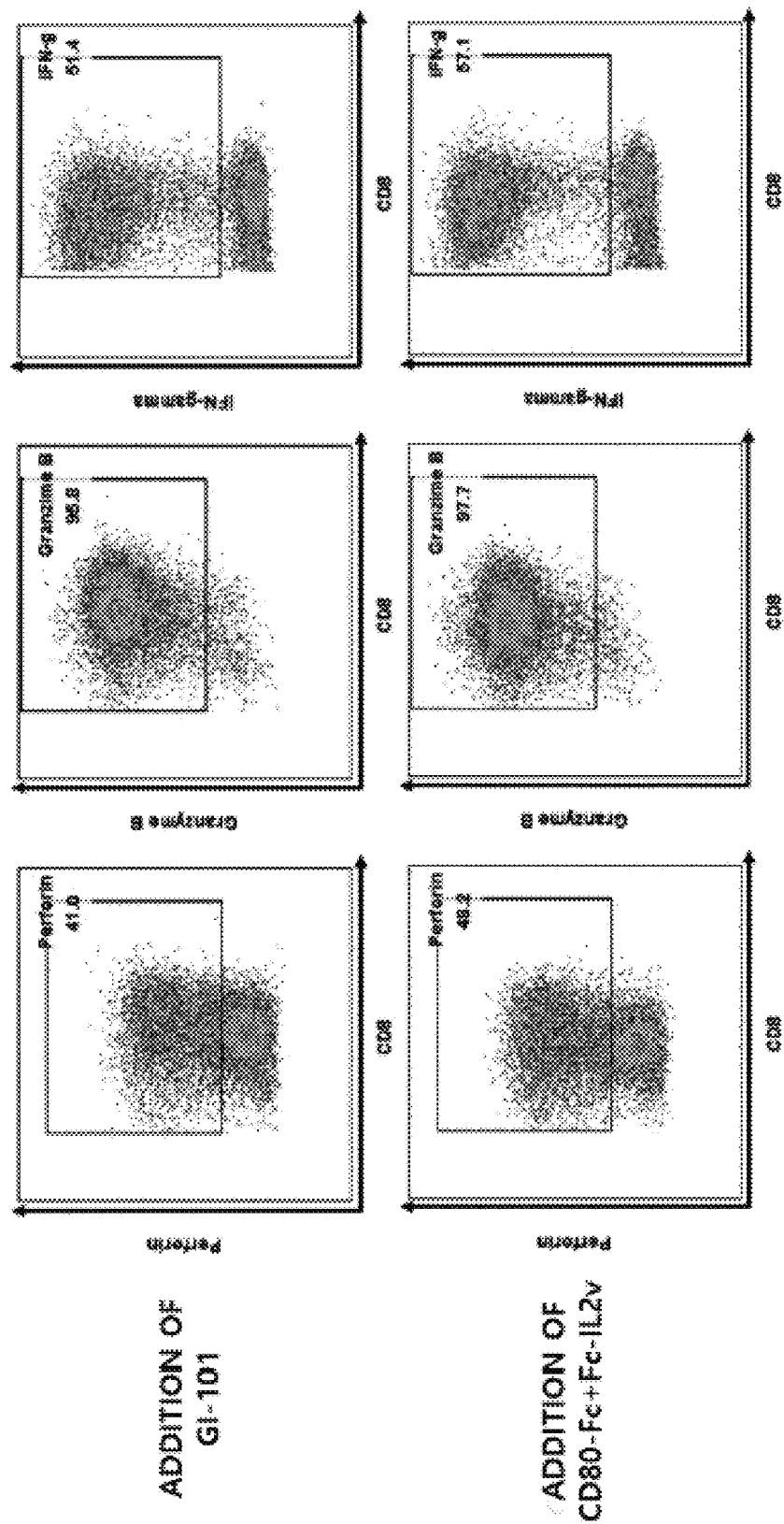
FIG. 41 shows the results of intracellular flow cytometry of CD8+ PBMC cells by the treatment of GI-101 of the present invention, or hCD80-Fc and Fc-IL2v additives in a culture composition that includes a basal culture medium in Table 1.
Figure 42:
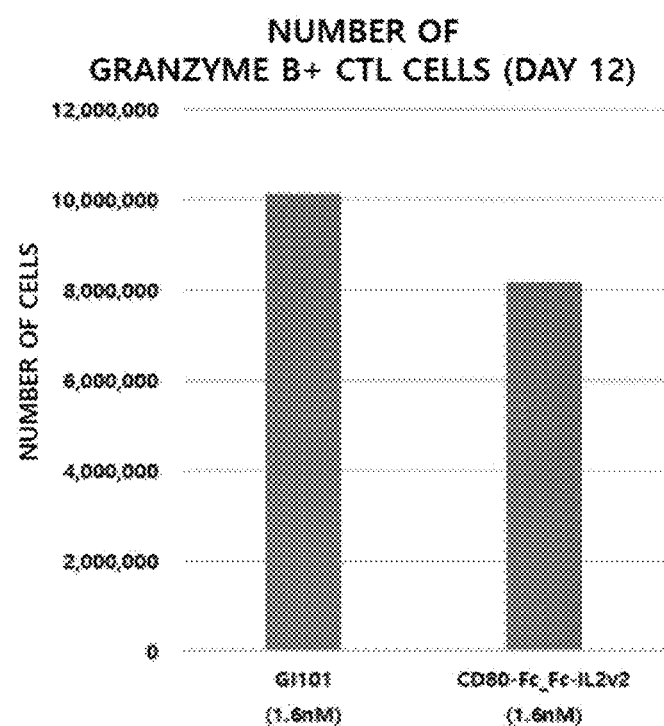
FIG. 42 is a graph in which the number of granzyme B+ CTL cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.
Figure 43:
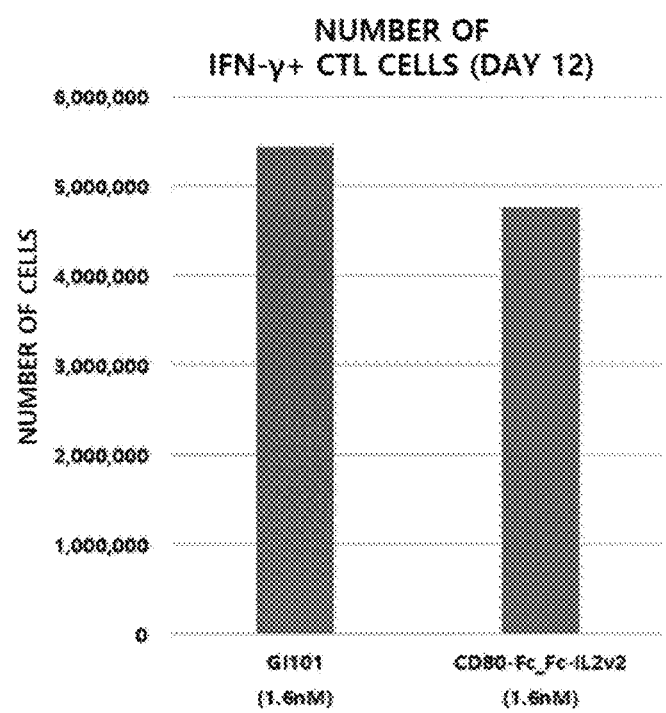
FIG. 43 is a graph in which the number of IFN-γ CTL cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.
Figure 44:
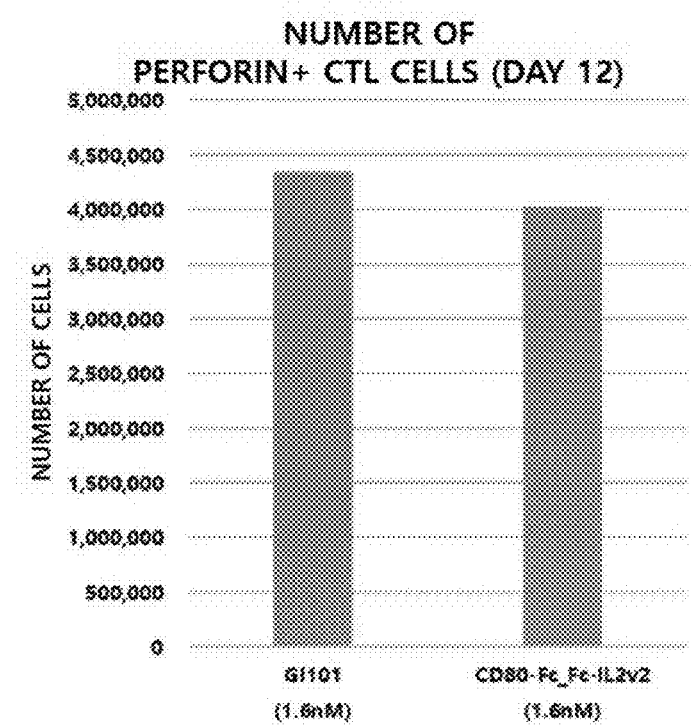
FIG. 44 is a graph in which the number of perforin+ CTL cells was quantified by FACS analysis for CD8+ PBMC cells cultured for 12 days in a culture composition that includes a basal culture medium in Table 1 and that is treated with GI-101 of the present invention, or hCD80-Fc and Fc-IL2v additives.

As a result, the results of cell intracellular flow cytometry (FACS plot) of CD8+ PBMC cells, which were cultured for 12 days in the T cell culture medium composition that includes the basal culture medium in Table 1 and that is treated with each additive, are shown in FIG. 41. In addition, the results of the determination of the number of CTL cells expressing granzyme B, IFN-γ, and perforin in the T cell culture medium composition that includes the basal culture medium in Table 1 and that is treated with each additive are as shown in Table 16 and FIGS. 42 to 44.

TABLE 16

| Treated material | Granzyme B+ CTL cell number[12] (CD8+ Granzyme B+ cells) | IFN-γ+ CTL cell number[13] (CD8+IFNγ+ cells) | Perforin CTL cell number[14] (CD8+ Perforin+ cells) |
|---|---|---|---|
| GI-101 (1.6 nM) | 10,578,714 | 10,134,408 | 5,437,459 |
| hCD80-Fc + Fc-IL2v (1.6 nM) | 8,345,025 | 8,153,089 | 4,765,009 |

[9]CD8 T cell number: total T cell number × the percentage of CD8 T cells
[12]Granzyme B+ CTL cell number: CD8 T cell number[9] × the percentage of CD8+ granzyme B+ cells
[13]IFN-γ+ CTL cell number: CD8 T cell number[9] × the percentage of CD8+ IFN-γ + cells
[14]Perforin CTL cell number: CD8 T cell number[9] × the percentage of CD8+ perforin+ cells

Example 3. Confirmation of Cancer Cells-Killing Effect of Her2-Recognizing T Cells by GI101 Treatment

Example 3.1. T Cell Activation

CD4-deficient (CD4-) PBMC cells obtained in Example 1 above were suspended in the basic components of T cell medium (Table 1) to 1×10$^6$ cells/mL using a cell counter, and then 10 mL of each was seeded into a T75 flask. Then, 1 μg/mL to 10 μg/mL of Her2 protein (Acro, Cat #HE2-H5225-1 mg) was inoculated into the culture medium in which the cells were seeded, and cultured at 37° C. and 5% $CO_2$ for 2 hours.

Example 3.2. Re-Stimulation of Activated T Cells

To the cells cultured with Her2 protein (Acro, Cat #HE2-H5225-1 mg) for 2 hours in Example 3.1, 50 nM of additives (GI-101 and proleukin) (Proleukin, Novartis, USA) other than the basic components in Table 1, and 0.1 μg/mL to 1 μg/mL of OKT3 (Biolegend) were added simultaneously to culture for 7 days.

The cells cultured for 7 days were re-stimulated by co-culturing Her2 protein (Acro, Cat #HE2-H5225-1 mg)-inoculated T cells activated in the same manner as described in Example 3.1 on day 4 of culture to the ratio of 1:1. At this time, the degree of saturation of the cells was not allowed to exceed 1×10$^6$ cells/mL.

Example 3.3. Analysis of Cancer Cell Killing Effect of the Activated T Cells In order to determine cancer cell killing effect of the cultured activated T cells, the cells obtained from Example 3.2 was co-cultured with two types of cancer cells CAMA-1 (ATCC® HTB-21™; breast center cell line); BT-474 (ATCC® HTB-20™; breast center cell line) for 24 hours at various ratios (1:1, 5:1, and 10:1). Then, the cells were stained with Annexin-V and 7-AAD to evaluate cancer cell killing effect by a flow cytometry.

Specifically, the two types of cancer cells were suspended in the basic components of T cell medium (Table 1) to 1×10$^6$ cells/mL, and then seeded in a round bottom 96-well plate. The activated T cells obtained from Example 3.2 were suspended in the basic components of T cell medium (Table 1), and then seeded in a 96-well plate so that the ratio with cancer cells (E:T) was 1:1, 5:1, or 10:1, followed by co-culture under the condition of 37° C. and 5% $CO_2$ for 24 hours. After co-culture for 24 hours, the cells were centrifuged at 1,300 rpm for 5 minutes, and the supernatant was removed.

100 μl of preheated 0.25% trypsin was added to each well containing the co-cultured cells and cultured at 37° C. for 5 minutes. The isolated cells were washed with FACS buffer and stained with anti-human CD45 antibodies (Clone HI30, eBioscience, Cat #25-0459-42), followed by staining with Annexin-V and 7-AAD (BioLegend, USA, Cat #640922) using a FITC Annexin-V apoptosis detection kit including 7-AAD according to the manufacturer's protocol. For staining, the cells were incubated at 4° C. for 20 minutes, 100 μl of FACS buffer was added each, and centrifuged at 300×g for 5 minutes to wash the cells. Then, the cells were resuspended in FACS buffer, and the cancer cell-killing effect was determined using a BD FACS Celesta flow cytometer (BD science, San Jose, Ca, USA) and FLOWJO™ software.

The results of the determination of cancer cells-killing effect were shown in FIGS. 45 and 46.

What is claimed is:

1. A method for culturing a T cell comprising:
culturing CD8+ T cells in a medium comprising a fusion protein dimer comprising an IL-2 variant and a CD80 protein or a fragment thereof,
wherein the fusion protein comprises the following structural formula (I) or (II):

N'-X-[linker (1)]$_n$-Fc domain-[linker (2)]$_m$-Y-C'   formula (I)

N'-Y-[linker (1)]$_n$-Fc domain-[linker (2)]$_m$-X-C'   formula (II)

wherein
N' is the N-terminus of the fusion protein,
C' is the C-terminus of the fusion protein,
X is a CD80 protein or a fragment thereof,
Y is the IL-2 variant,
the linkers (1) and (2) are peptide linkers, and
n and m are each independently 0 or 1,
wherein the IL-2 variant comprises any one selected from the following substitution combinations (a) to (d) in the amino acid sequence of SEQ ID NO: 10;
(a) R38A/F42A
(b) R38A/F42A/Y45A
(c) R38A/F42A/E61R
(d) R38A/F42A/L72G, and
wherein the CD80 protein fragment comprises an extracellular domain of CD80.

2. The method according to claim 1, wherein the CD8+ T cell is obtained from peripheral blood mononuclear cells (PBMCs).

3. The method according to claim 1, wherein the culturing is performed for 7 to 21 days.

4. A method for in vitro activation and proliferation of CD8+ T cells comprising:
simultaneously culturing a cell and a cancer antigen in a medium comprising a fusion protein dimer comprising an IL-2 variant and a CD80 protein or a fragment thereof,
wherein the cell is either a peripheral blood mononuclear cell (PBMC) or a T cell,
wherein the fusion protein comprises the following structural formula (I) or (II):

N'-X-[linker (1)]$_n$-Fc domain-[linker (2)]$_m$-Y-C'   formula (I)

N'-Y-[linker (1)]$_n$-Fc domain-[linker (2)]$_m$-X-C'   formula (II)

wherein
N' is the N-terminus of the fusion protein,
C' is the C-terminus of the fusion protein,
X is a CD80 protein or a fragment thereof,
Y is the IL-2 variant,
the linkers (1) and (2) are peptide linkers, and
n and m are each independently 0 or 1,
wherein the IL-2 variant comprises any one selected from the following substitution combinations (a) to (d) in the amino acid sequence of SEQ ID NO: 10:
(a) R38A/F42A
(b) R38A/F42A/Y45A
(c) R38A/F42A/E61R
(d) R38A/F42A/L72G,
wherein the CD80 protein fragment comprises an extracellular domain of CD80.

5. The method according to claim 4, wherein the T cells are CD8+ T cells.

6. The method according to claim 1, wherein the IL-2 variant comprises the amino acid sequence of SEQ ID NO: 6, 22, 23, or 24.

7. The method according to claim 1, wherein the CD80 protein has the amino acid sequence of SEQ ID NO: 11.

8. The method according to claim 1, wherein the fusion protein comprises the amino acid sequence of SEQ ID NO: 9, 26, 28, or 30.

9. The method according to claim 1, wherein the T cells comprise memory T cells.

* * * * *